(12) United States Patent
Verma

(10) Patent No.: US 11,611,209 B2
(45) Date of Patent: Mar. 21, 2023

(54) SYSTEM AND A METHOD FOR PROTECTING A REGULATOR RECTIFIER DEVICE AND A RESPECTIVE PROTECTION DEVICE

(71) Applicant: FLASH ELECTRONICS (INDIA) PRIVATE LIMITED, Pune (IN)

(72) Inventor: Ramit Verma, Pune (IN)

(73) Assignee: FLASH ELECTRONICS (INDIA) PRIVATE LIMITED, Prune (IN)

( * ) Notice: Subject to any disclaimer, the term of this patent is extended or adjusted under 35 U.S.C. 154(b) by 0 days.

(21) Appl. No.: 17/607,554

(22) PCT Filed: May 1, 2020

(86) PCT No.: PCT/IN2020/050398
§ 371 (c)(1),
(2) Date: Oct. 29, 2021

(87) PCT Pub. No.: WO2020/222261
PCT Pub. Date: Nov. 5, 2020

(65) Prior Publication Data
US 2022/0209526 A1 Jun. 30, 2022

(30) Foreign Application Priority Data
May 2, 2019 (IN) .............................. 201921017604

(51) Int. Cl.
*H02H 7/12* (2006.01)
*H02H 7/125* (2006.01)
*H02H 1/00* (2006.01)

(52) U.S. Cl.
CPC ........ *H02H 7/1257* (2013.01); *H02H 1/0007* (2013.01); *H02H 7/1252* (2013.01)

(58) Field of Classification Search
CPC ... H02H 7/1257; H02H 7/1252; H02H 1/0007
See application file for complete search history.

(56) References Cited

U.S. PATENT DOCUMENTS

| | | | |
|---|---|---|---|
| 3,886,410 A * | 5/1975 | Seer, Jr. .................. | G05F 1/573 |
| | | | 323/276 |
| 5,517,379 A | 5/1996 | Williams et al. | |
| (Continued) | | | |

FOREIGN PATENT DOCUMENTS

| | | |
|---|---|---|
| DE | 196 03 117 A1 | 8/1996 |
| DE | 100 48 592 A1 | 5/2002 |
| (Continued) | | |

OTHER PUBLICATIONS

International Preliminary Report on Patentability, issued in PCT/IN2020/050398, dated Aug. 4, 2021.
(Continued)

*Primary Examiner* — Scott Bauer
(74) *Attorney, Agent, or Firm* — Birch, Stewart, Kolasch & Birch, LLP

(57) ABSTRACT

The problem to be solved is to provide a system and a method to protect the regulator rectifiers from the reverse voltage condition and the short circuit condition, and the problem is solved in the present invention by a system and a method that use a protection device including a control unit that receives an input from the circuit based on the reverse voltage condition and the short circuit condition, and based on the existence of at least one of the condition or a combination thereof, the control unit switches a switching unit from an ON state to an OFF state, thereby breaking the circuit between the regulator rectifier device and the load section, thus protecting the regulator rectifier device.

18 Claims, 62 Drawing Sheets

(56) References Cited

U.S. PATENT DOCUMENTS

| | | | |
|---|---|---|---|
| 5,682,050 A | | 10/1997 | Williams |
| 5,831,416 A | | 11/1998 | Fisher |
| 6,028,755 A | * | 2/2000 | Saeki ................. H02H 7/1213 |
| | | | 361/91.1 |
| 6,288,881 B1 | | 9/2001 | Melvin et al. |
| 6,803,743 B2 | | 10/2004 | George et al. |
| 6,922,322 B2 | | 7/2005 | Strayer et al. |
| 7,400,111 B2 | | 7/2008 | Kishibata et al. |
| 10,205,313 B2 | * | 2/2019 | Creech ................. H02H 3/087 |
| 2015/0062768 A1 | * | 3/2015 | Prescott ............... H02H 9/045 |
| | | | 361/86 |
| 2016/0087422 A1 | * | 3/2016 | Mourrier ............. H02H 7/122 |
| | | | 361/101 |
| 2019/0027945 A1 | | 1/2019 | Gagnon et al. |
| 2019/0207375 A1 | * | 7/2019 | Telefus ............... H02H 1/0015 |

FOREIGN PATENT DOCUMENTS

| | | |
|---|---|---|
| DE | 10 2011 057 002 A1 | 6/2013 |
| EP | 0 854 555 A2 | 7/1998 |
| EP | 2 910 405 A1 | 8/2015 |
| JP | 2015-198572 A | 11/2015 |

OTHER PUBLICATIONS

International Search Report, issued in PCT/IN2020/050398, dated Aug. 11, 2020.

Written Opinion of the International Searching Authority, issued in PCT/IN2020/050398, dated Aug. 11, 2020.

"Active Rectifier Controller with Reverse Protection," Analog Devices, Prior to Oct. 2021, 1 page.

"AN-8039 Using the FDDS100H06_F085 in Automotive Systems," Fairchild Semiconductor, Rev. 1, Feb. 13, 2012, pp. 1-13.

"Automotive Reverse Polarity Protection Reference Design," Texas Instruments, Nov. 2016, pp. 1-32.

"EXtreme Switch Protection Guidelines," Freescale Semiconductor, prior to Dec. 2007, pp. 1-12.

"High-Speed, High-Side MOSFET Driver with Charge Pump and Overcurrent Limit," Microchip Technology Inc., prior to Dec. 2016, pp. 1-24.

"LM74610-Q1 Zero IQ Reverse Polarity Protection Smart Diode Controller," Texas Instruments, Jul. 2015 (Revised Jun. 2016), pp. 1-31.

"LM74700-Q1 Low IQ Reverse Battery Protection Ideal Diode Controller," Texas Instruments, Oct. 2017 (Revised Dec. 2020), pp. 1-36.

"Self-Protected Low Side Driver with Temperature and Current Limit," ON Semiconductor, Rev. 13, Nov. 2019, pp. 1-12.

Grohe, "Reverse Current Protection Using MOSFET and Comparator to Minimize Power Dissipation," Texas Instruments, Feb. 2018, pp. 1-11.

Pürschel, "Reverse Battery Protection," Infineon Technologies, vol. 1, May 2005, pp. 1-5.

Uppuluri et al., "Protecting Vehicle Electronics from Reverse-Battery Connection," Diodes Incorporated, May 2016, pp. 1-7.

* cited by examiner

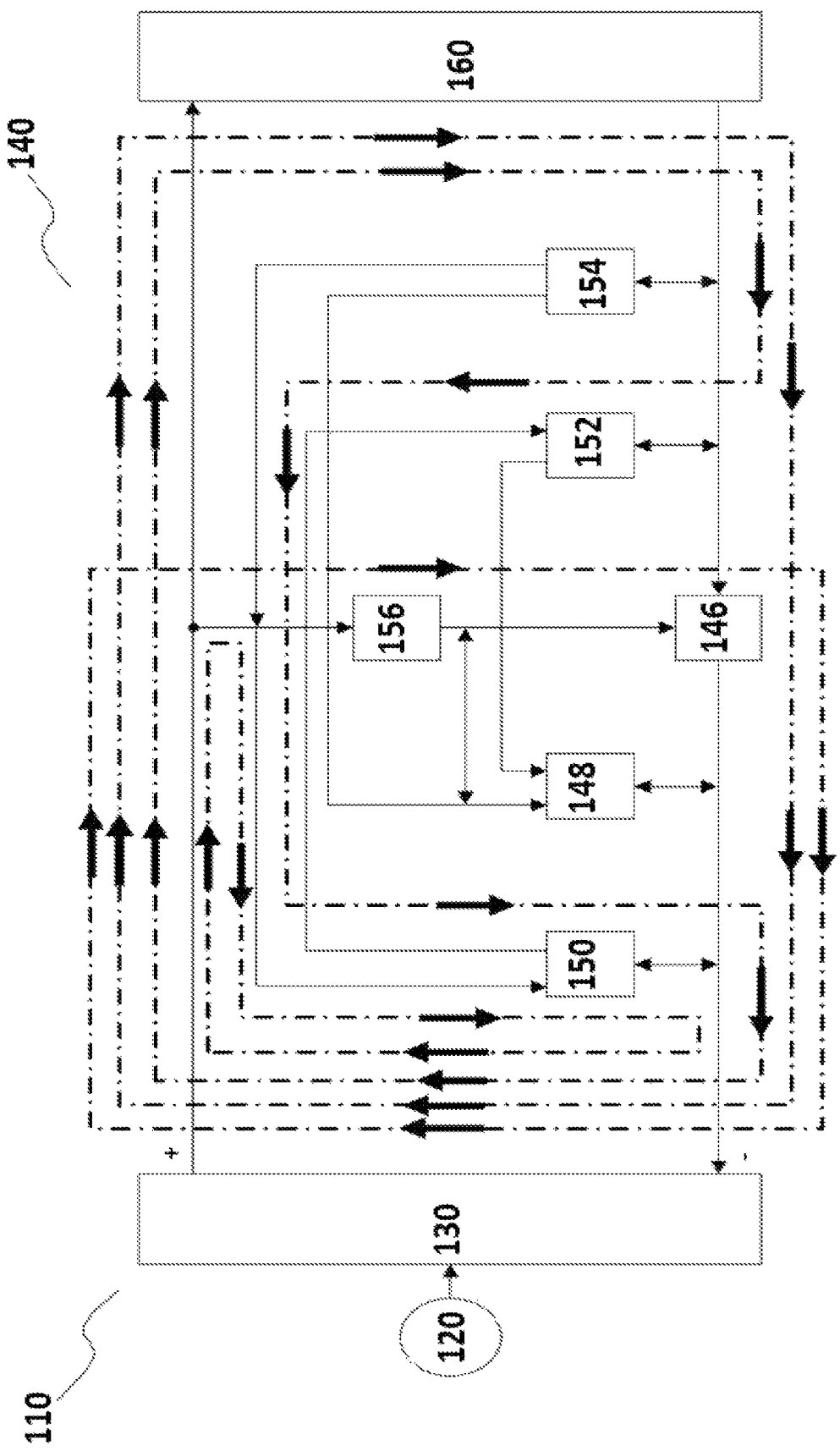

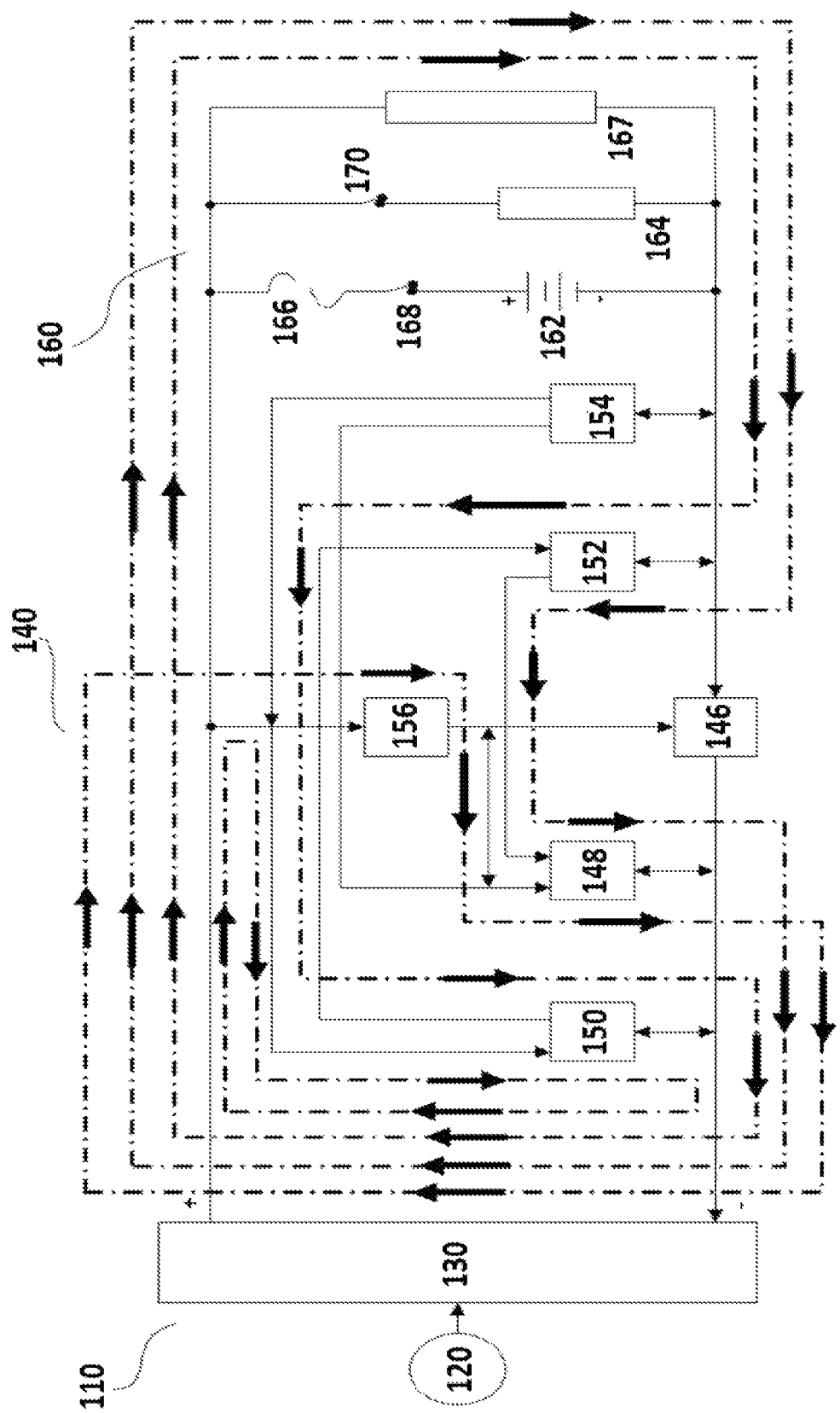

SYSTEM AND A METHOD FOR PROTECTING A REGULATOR RECTIFIER DEVICE AND A RESPECTIVE PROTECTION DEVICE

TECHNICAL FIELD

The present invention relates to a system and a method for protecting a regulator rectifier device, and a protection device. More particularly, this invention relates to the system and the method for protecting regulator rectifier device, any power source or the like by the protection device in a reverse battery condition or in a short circuit condition in automobiles.

BACKGROUND

The electrical devices or the power sources are usually intolerant against incorrect polarity. As a result, when an electrical device is connected with a power source with reverse polarity, the device gets damaged. Similar is the case with regulator rectifier devices. The regulator rectifier devices are used to regulate and rectify an input voltage, such as three phase, a two-phase or a single phase, into a DC output voltage across a bulk capacitor, which is used either with load or for charging batteries or the like. However, it has been observed that many times, in reverse voltage condition, due to reverse voltage generated across the battery because of incorrect polarity, the regulator rectifier device gets damaged, thereby resulting in loss of devices, which is not reparable and needs a replacement.

One of the simplest and most common circuitries to protect the regulator rectifier from such reverse battery connection loss is to connect a diode in series with the battery. In case of reverse battery condition, the diode disconnects the battery from the circuit, thereby protecting the regulator rectifier. However, during normal operation of the circuit, the diode drops its typical ~0.6 V. That could be a significant portion of the supply voltage, and as the battery voltage decreases, the device may stop working prematurely. Further, any component that has a voltage drop across it and current flowing through it, is consuming power. If that dissipated energy comes from the battery, it results in the diode reducing the battery life. This may not be an acceptable trade-off in devices that have very low risk of experiencing reverse polarity.

Another approach could be to use a fuse (166P) in series with the battery (162P) in the load section (160P) to protect the regulator rectifier device (130P), as shown in FIG. 1. FIG. 1 shows no-load condition with battery (162P) connected along with Starter relay (SR) and Starter motor (SM) along with a fuse (166P). The regulator rectifier device (130P) is connected with a generating unit (120P). In case of a reverse voltage the fuse (166P) will blow and thereby disconnecting the circuit to protect the regulator rectifier device (130P) against the reverse voltage condition. However, the use of fuse is may also not a good approach, specifically in automotive industry, due to the connection of bulk capacitors with the most regulator rectifiers manufactured these days. Also, for battery-less application, regulator rectifiers become more vulnerable to the reverse battery connection and can lead to instant blowing of a bulk capacitor even with the fuse protection. Therefore, a diode is connected in parallel to protect the bulk capacitor. However, this arrangement only protects the bulk capacitor momentarily, until the fuse blows leading to flow of reverse current and blowing of the diode and ultimately the bulk capacitor (114P) of the device.

Another approach is the use of P-channel MOSFETs as shown in FIG. 2 or use of two N-channel power MOSFETs connected back to back as shown in FIG. 3. The P-channel MOSFETs however are not available commonly in high current rating, which is the need in case for regulator rectifier devices (130P) and the ones available are expensive as compared to N-channel MOSFETs. Although, N-channel power MOSFETs are less expensive as compared to P-channel MOSFETs but two N-channel power MOSFETs connected back to back and a MOSFET driver along with a charge pump is required for protection of regulator rectifier from reverse current flow due to reverse battery connection, thus, making this solution, expensive. Further, none of the above options resolves the requirement for protection against short circuit conditions.

Therefore, the problem to be solved is to provide protection to the regulator rectifier device from the reverse voltage condition and the short circuit condition, and the problem is solved in the present invention by a system and a method that uses a protection device including a control unit that receives an input from the circuit based on the reverse voltage condition and the short circuit condition, and based on the existence of any one of the conditions, the control unit switches a switching unit from an ON state to OFF state, thereby breaking the circuit between the regulator rectifier device and the load section, and consequently protecting the regulator rectifier device.

SUMMARY

An embodiment of the present invention relates to a system for protecting a regulator rectifier device comprising the regulator rectifier device including an input terminal and an output terminal, said input terminal receives an input voltage from a generating unit, and said output terminal is configured to output a voltage between a positive terminal and a negative terminal; and a protection device coupled with said regulator rectifier device and connected between said positive terminal and said negative of said regulator rectifier device, said protection device includes: a switching unit defined to switch between an ON state and an OFF state, wherein said switching unit completes a circuit between said positive terminal and said negative terminal of said regulator rectifier device in ON state and breaks said circuit in OFF state; and a control unit coupled with said switching unit and configured to detect at least one of a short circuit condition or a reverse battery condition or a combination thereof, based on an input received by said control unit in said circuit, wherein said control unit switches said switching unit from said ON state to said OFF state when at least one of said short circuit condition or said reverse battery condition or a combination thereof is detected by said control unit, thereby breaking said circuit to protect said regulator rectifier device.

An embodiment of the present invention discloses that the protection device includes a first voltage detection unit connected between said positive terminal and said negative terminal of said output terminal of said regulator rectifier device, wherein said first voltage detection unit is configured to detect a voltage between said positive terminal and said negative terminal and compare with a predefined voltage.

An embodiment of the present invention discloses that the protection device includes a short circuit detection unit configured to receive a signal from said first voltage detection unit when the voltage detected by said first voltage detection unit is lower than said predefined voltage.

An embodiment of the present invention discloses that the control unit is configured to receive said input from said short circuit detection unit and confirm said short circuit condition when drop in said voltage is detected by said first voltage detection unit below said predefined voltage, thereby switching said switching unit to said OFF state.

An embodiment of the present invention discloses that the control unit is configured to receive said input from a second voltage detection unit, wherein said second voltage detection unit is defined in said circuit and coupled with a load section across a battery load to detect said reverse battery condition.

An embodiment of the present invention discloses that the control unit switches said switching unit from said ON state to said OFF state when said second voltage detection unit detects a reverse voltage across said battery load thereby confirming said reverse battery condition across the battery load.

An embodiment of the present invention discloses that the control unit is configured to receive said input from a driver unit, wherein said driver unit is defined in said circuit to drive said switching unit in said ON state.

An embodiment of the present invention discloses that the control unit switches said switching unit from said ON state to said OFF state when said input is received from said driver unit along with at least one of said second voltage detection unit or said short circuit detection unit or a combination thereof.

An embodiment of the present invention discloses that the control unit latches to continue said switching unit in said OFF state when said short circuit condition is detected in presence of a load in said load section.

An embodiment of the present invention discloses that the switching unit continues to remain in said OFF state when said short circuit condition ceases to exist in presence of said load in said load section.

An embodiment of the present invention discloses that the switching unit continues in said OFF state until at least one of said generating unit or said load or a combination thereof, is disconnected and reconnected.

An embodiment of the present invention relates to a method for protecting a regulator rectifying device, the method comprising the steps of receiving an input voltage by an input terminal of a regulator rectifier device from a generating unit and generating a voltage at an output terminal between said positive terminal and said negative terminal of said regulator rectifier device; switching a switching unit of a protection device between an ON state and an OFF state, wherein said switching unit completes a circuit between said positive terminal and said negative terminal of said regulator rectifier device in said ON state and breaks said circuit in said OFF state; controlling said switching unit by a control unit coupled with said switching unit to detect at least one of a short circuit condition or a reverse battery condition or a combination thereof, based on an input received by said control unit from said circuit; and protecting said regulator rectifier device by breaking said circuit by switching said switching unit from said ON state to said OFF state by said control unit when at least one of said short circuit condition or said reverse battery condition or a combination thereof, is detected by said control unit.

An embodiment of the present invention discloses that the controlling said switching unit by said control unit includes detecting said voltage by a first voltage detection unit connected between said positive terminal and said negative terminal of the output terminal of said regulator rectifier device, and comparing said voltage with a predefined voltage.

An embodiment of the present invention discloses that the switching unit by said control unit includes receiving a signal by a short circuit detection unit from said first voltage detection unit when said voltage detected by said first voltage detection unit is lower than said predefined voltage.

An embodiment of the present invention discloses that the switching unit by said control unit includes receiving said input from said short circuit detection unit and confirming said short circuit condition when drop in said voltage is detected by said first voltage detection unit below said predefined voltage, thereby switching said switching unit into said OFF state.

An embodiment of the present invention discloses that the switching unit by said control unit includes receiving said input from a second voltage detection unit, said second voltage detection unit is defined in said circuit and coupled with a load section across a battery load to detect said reverse battery condition.

An embodiment of the present invention discloses that the switching unit by said control unit includes detecting a reverse voltage across said battery load by said second voltage detection unit thereby confirming said reverse battery condition across said battery load and switching said switching unit from said ON state to said OFF state.

An embodiment of the present invention discloses that the controlling said switching unit by said control unit includes receiving said input from a driver unit, which is defined in said circuit to drive said switching unit in ON state.

An embodiment of the present invention discloses that the controlling said switching unit by said control unit includes receiving said input from said driver unit along with at least one of said second voltage detection unit or said short circuit detection unit or a combination thereof, to switch said switching unit from said ON state to said OFF state.

An embodiment of the present invention discloses that the controlling said switching unit by said control unit includes latching said control unit to continue said switching unit in said OFF state when said short circuit condition is detected in presence of a load in said load section.

An embodiment of the present invention discloses that the controlling said switching unit by said control unit includes continuing said switching unit in said OFF state when said short circuit condition ceases to exist in presence of said load.

An embodiment of the present invention discloses that the controlling said switching unit by said control unit includes continuing said switching unit in said OFF state until at least one of said generating unit or said load or a combination thereof, is disconnected and reconnected.

An embodiment of the present invention relates to a protection device comprising a first terminal electrically coupled to a power source; a second terminal electrically coupled to a load section to form a circuit; a switching unit defined between said first terminal and said second terminal to function in an ON state and an OFF state, wherein said switching unit completes said circuit between said first terminal and said second terminal in said ON state and breaks said circuit in said OFF state; and a control unit coupled with said switching unit and configured to detect at least one of a short circuit condition or a reverse battery condition or a combination thereof, based on an input received by said control unit in said circuit, wherein said control unit switches said switching unit from said ON state to said OFF state when at least one of said short circuit condition or said reverse battery condition or a combination thereof is detected by said control unit, thereby breaking said circuit to protect said power source.

An embodiment of the present invention discloses that the first terminal is electrically coupled with a first voltage detection unit to detect a voltage across said first terminal with respect to a predefined voltage.

An embodiment of the present invention discloses that the first voltage detection unit outputs a signal to a short circuit detection unit when the voltage detected by said voltage detection unit is lower than said predefined voltage.

An embodiment of the present invention discloses that the control unit is configured to receive said input from said short circuit detection unit and confirms said short circuit condition when drop in said voltage is detected by said first voltage detection unit below said predefined voltage, thereby switching said switching unit to said OFF state.

An embodiment of the present invention discloses that the control unit is configured to receive said input from a second voltage detection unit, said second voltage detection unit is defined in said circuit and coupled with said load section across a battery load to detect said reverse battery condition.

An embodiment of the present invention discloses that the control unit switches said switching unit from said ON state to said OFF state when said second voltage detection unit detects a reverse voltage across said battery load, thereby confirming said reverse battery condition across said battery load.

An embodiment of the present invention discloses that the control unit is configured to receive said input from a driver unit, said driver unit is defined to drive said switching unit in ON state.

An embodiment of the present invention discloses that the control unit switches said switching unit from said ON state to said OFF state when said input is received from said driver unit along with at least one of said second voltage detection unit or said short circuit detection unit or a combination thereof.

An embodiment of the present invention discloses that the control unit latches to continue said switching unit in said OFF state when said short circuit condition is detected in presence of a load in said load section.

An embodiment of the present invention discloses that the switching unit continues to remain in said OFF state when said short circuit condition ceases to exist in presence of said load in said load section.

An embodiment of the present invention discloses that the switching unit continues to remain in said OFF state until at least one of said generating unit or said load or a combination thereof is disconnected and reconnected.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

FIG. 8b shows an embodiment of the present invention depicting a block diagram of another example system showing a current flow in the protection device in condition 1—with battery (battery connected) and no-load condition.

FIG. 23a shows an embodiment of the present invention depicting a block diagram showing a current flow in the protection device and the load section in condition 5—with fuse blown condition same as battery-less and with load in short circuit condition at time when voltage goes below a predefined voltage.

Figure 1:
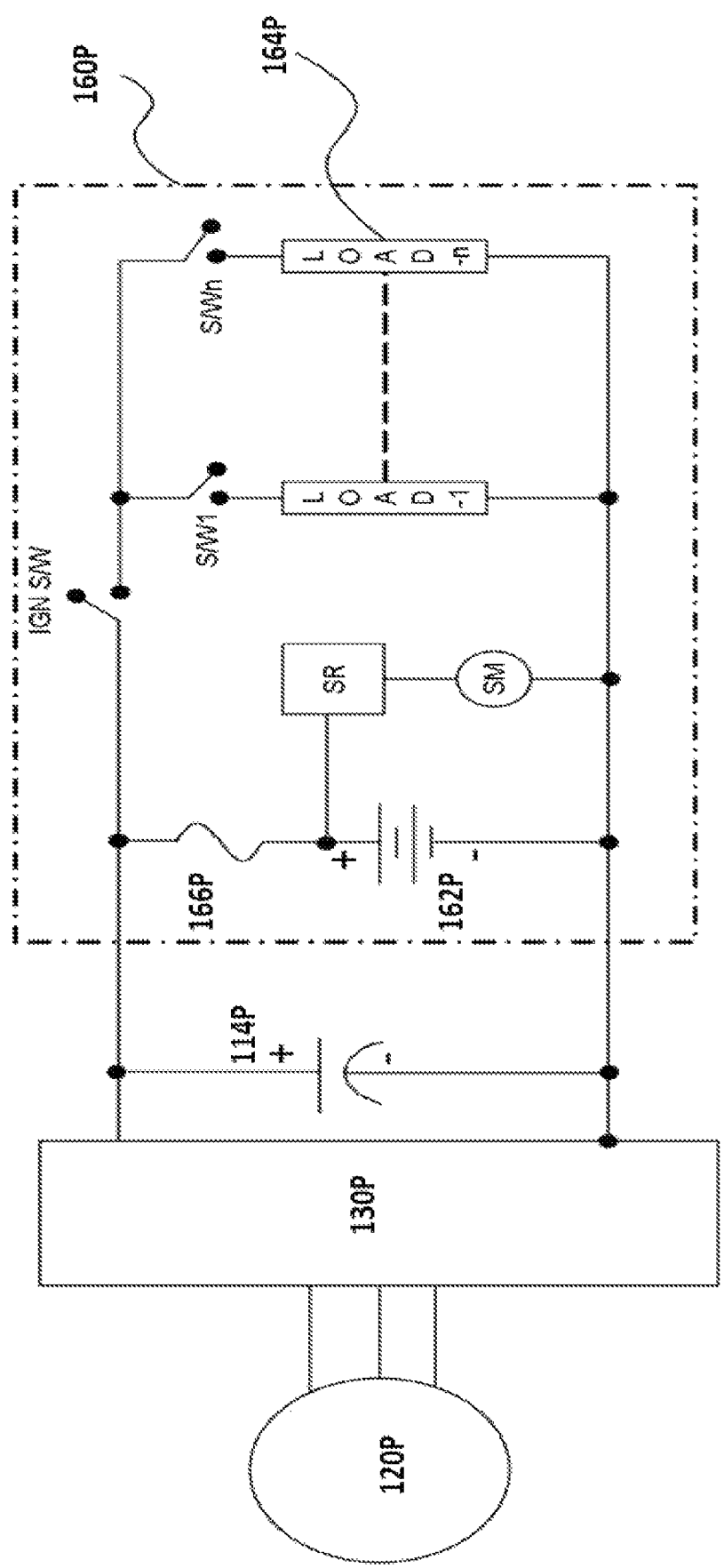
FIG. 1 shows a protection circuit for a regulator rectifier with a fuse, as a prior art.
Figure 2:
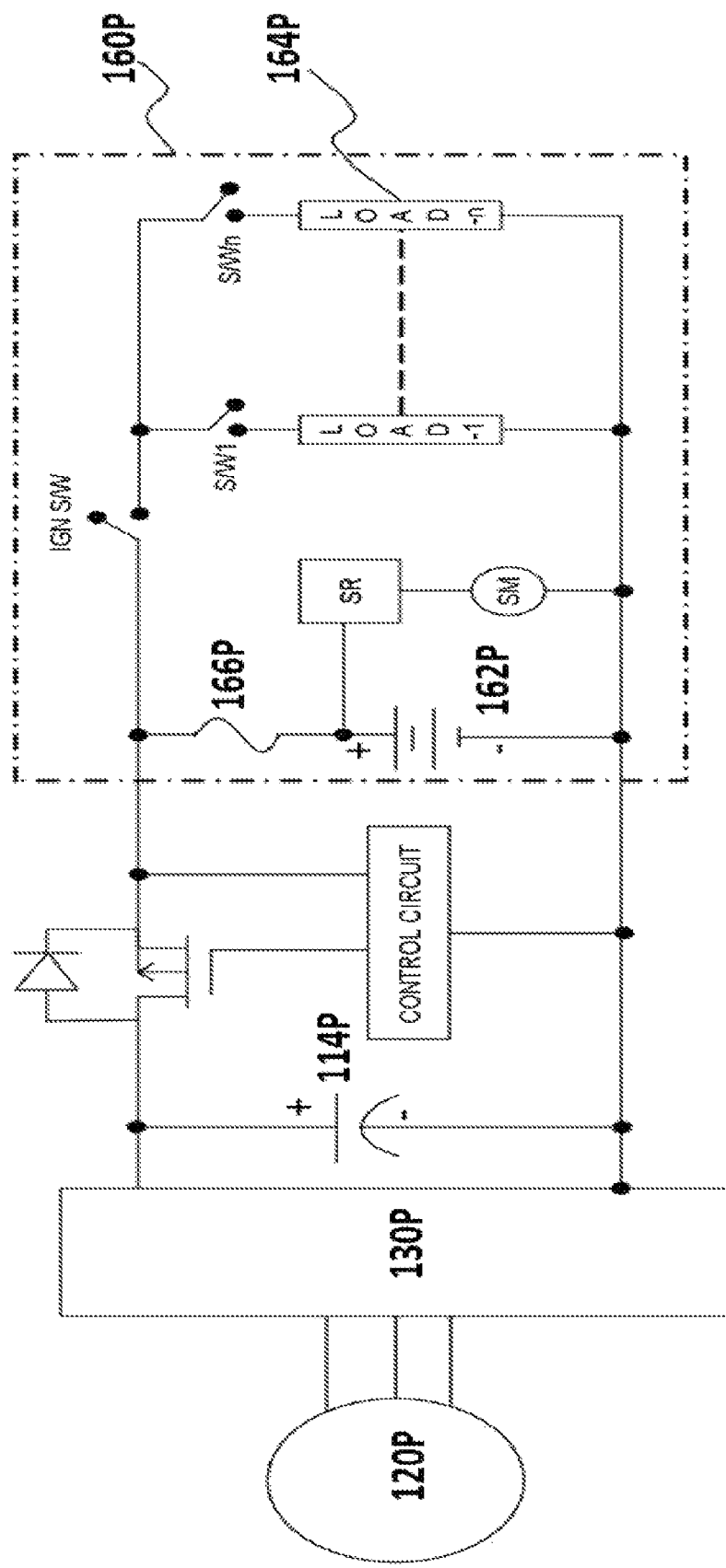
FIG. 2 shows a protection circuit for a regulator rectifier with a P type MOSFET, as a prior art.
Figure 3:
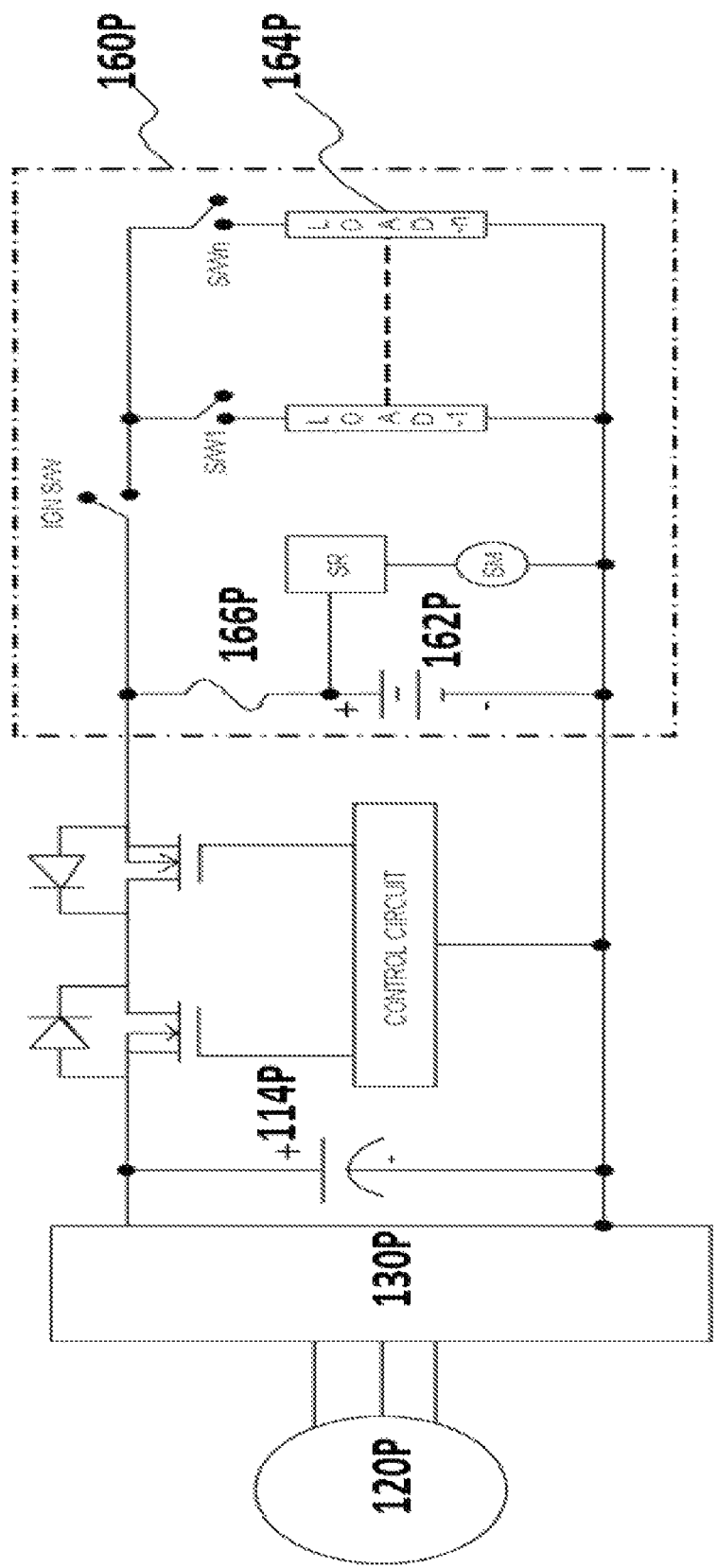
FIG. 3 shows a protection circuit for a regulator rectifier with two N type MOSFET connected back to back, as a prior art.

REFERENCE NUMERALS:

| Reference Numeral | Description |
| --- | --- |
| 120P | Generating unit of prior art |
| 130P | Regulator rectifier device of prior art |
| 114P | Bulk capacitor of prior art |
| 166P | Fuse of prior art |
| 162P | Battery of the prior art |
| 160P | Load section of the prior art |
| 164P | Load of the prior art |
| 12 | Rectifying Section |
| 14 | Controlling section |
| 16 | First Rectifying Unit |
| 18 | Second Rectifying Unit |
| 22 | R Phase |
| 24 | Y Phase |
| 26 | B Phase |
| 30 | MOSFET 1 |
| 32 | MOSFET 2 |
| 34 | MOSFET 3 |
| 50 | MOSFET 4 |
| 52 | MOSFET 5 |
| 54 | MOSFET 6 |
| 60 | Gate control signal for MOSFET 4 |
| 62 | Gate control signal for MOSFET 5 |
| 64 | Gate control signal for MOSFET 6 |
| 70 | Internal power supply |
| 80 | Controlling unit |
| 108 | Peak Voltage Limiting unit |
| 114 | Bulk capacitor |
| 110 | System |
| 120 | Generating unit |
| 130 | Regulator rectifier device |
| 132 | Input terminal of the regulator rectifier device |
| 134 | Output terminal of the regulator rectifier device |
| 136 | Positive terminal of the regulator rectifier device |
| 138 | Negative terminal of the regulator rectifier device |
| 140 | Protection device |
| 142 | First terminal |
| 144 | Second terminal |
| 146 | Switching unit |
| 148 | Control unit |
| 150 | First voltage detection unit |
| 152 | Short circuit detection unit |
| 154 | Second voltage detection unit |
| 156 | Driver unit |
| 160 | Load section |
| 162 | Battery load |
| 164 | Load |
| 166 | Fuse |
| 167 | Short |
| 168 | First switch |
| 170 | Second switch |
| 180 | Power Source |
| SM | Starter Motor |
| SR | Starter Relay |

DETAILED DESCRIPTION

In the following detailed description of the embodiments of the disclosure, reference is made to the accompanying drawings that form a part hereof, and in which are shown by way of illustration specific embodiments in which the disclosure may be practiced. These embodiments are described in sufficient detail, which should enable those skilled in the art to practice the disclosure, and it is to be understood that other embodiments may be utilized and that changes may be made without departing from the scope of the present disclosure. The following description is, therefore, not to be taken in any limiting sense.

An embodiment of the present invention discloses a system (110) and a method for protecting a regulator rectifier device (130) from different conditions that can damage the regulator rectifier device (130) like reverse voltage condition, short circuit condition or the like. The system (110) includes a generating unit (120), which could be any power source for example a magneto that provides an AC voltage, such as a three-phase, a two-phase or a single phase. The AC voltage is rectified into a DC voltage and regulated to a set voltage by the regulator rectifier device (130) and thereafter used with the load or with battery load, as per the case.

Figure 4:
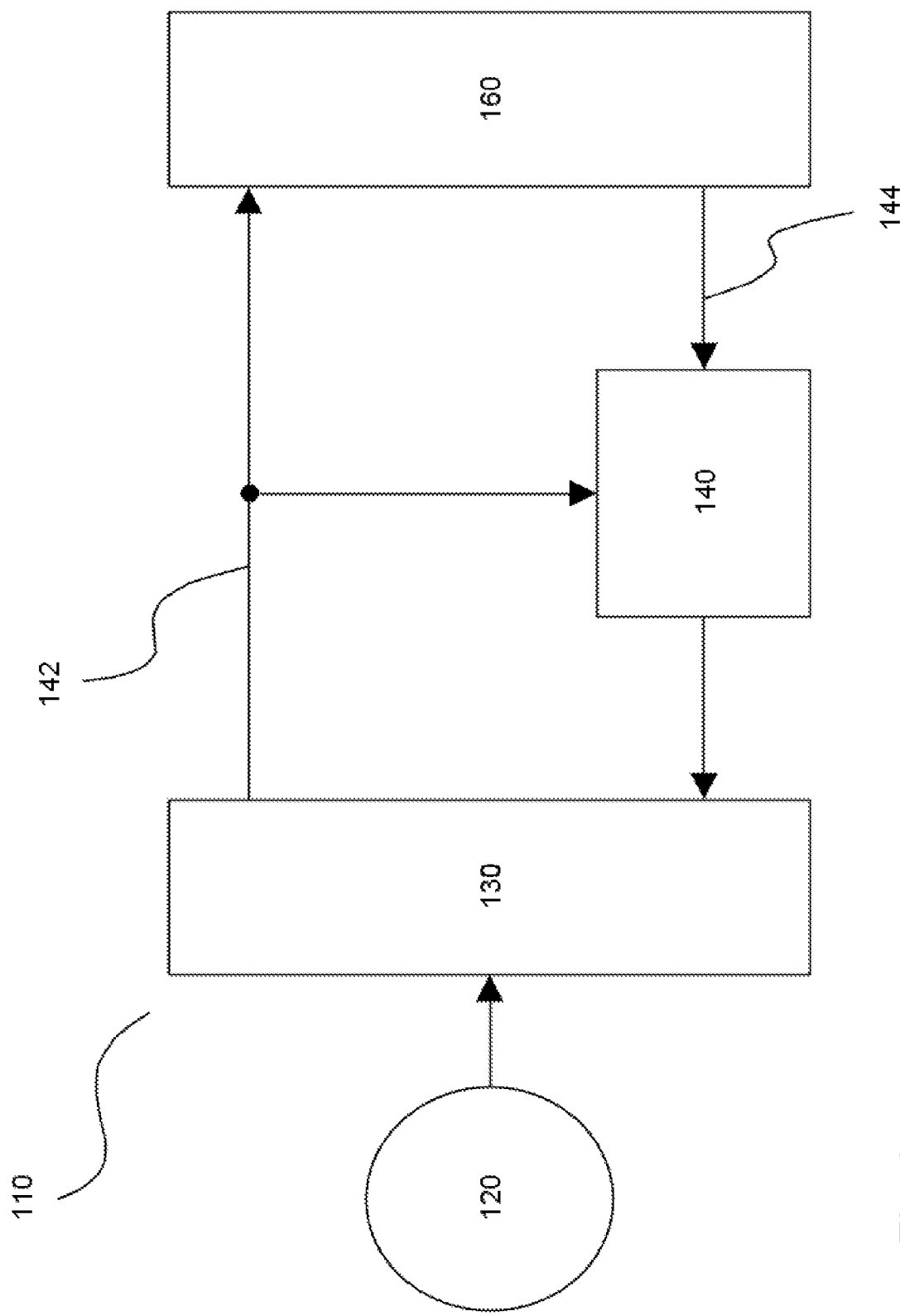
FIG. 4 shows an embodiment of the present invention depicting a block diagram of an example system for protecting the regulator rectifier device, according to the disclosed embodiments.

FIG. 4 shows an embodiment of the present invention depicting a block diagram of an example system (110) for protecting the regulator rectifier device (130) according to the disclosed embodiments. The system (110) includes a generating unit (120), which generates power supply. The power supply can be either a three-phase, a two-phase or a single phase power supply. The power supply is fed to a regulator rectifier device (130) for converting the input voltage at its input terminal (132) to a DC voltage at its output terminal (134). The voltage at the output terminal (134) is fed to a load section (160) as at (142). In between the output terminal (134) of the regulator rectifier device (130) and the load section (160), a protection device (140) is defined. The protection device (140) works normally in case of normal operation of the system (110), i.e. the general conditions as discussed below, however in case of situations like reverse voltage across the battery load (162) or short circuit condition, the protection device (140) acts as an open switch and disconnects the circuit between the regulator rectifier device (130) and the load section (160), thereby protecting the regulator rectifier device (130).

Figure 5:
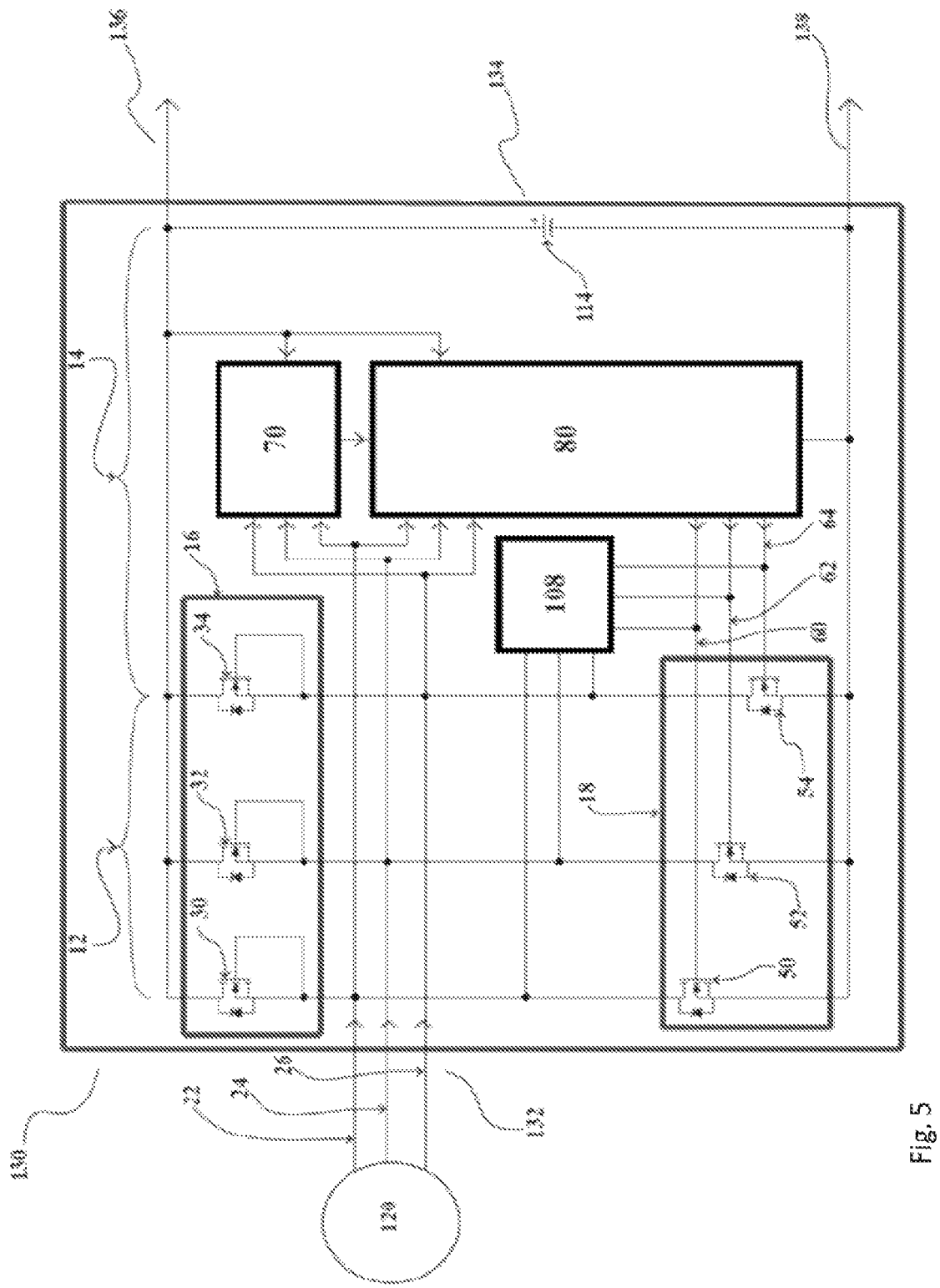
FIG. 5 shows an embodiment of the present invention depicting a circuit diagram of an example regulator rectifier device with a bulk capacitor.

FIG. 5 illustrates an internal working of an example regulator rectifier device (130), which is already known in the domain. The generating unit (120) outputs a three-phase alternating voltage with each phase including a positive cycle and a negative cycle. The three phases include R phase (22), Y phase (24) and B phase (26). Each of these three phases comprises a positive cycle and a negative cycle. The generating unit (120) is connected to the regulator rectifier device (130) for both positive rectification as well as negative rectification in the rectifying section. The regulator rectifier device (130) includes two sets of rectifying units i.e. a first rectifying unit (16) and a second rectifying unit (18). Each of the first rectifying unit (16) has a first gate terminal and comprises of three MOSFETs i.e. MOSFET 1 (30), MOSFET 2 (32) and MOSFET 3 (34). The first rectifying unit (16) is connected to the generating unit (120) in such a way that the source and gate terminals of MOSFET 1 (30) are connected to R phase (22) of generating unit (120), the source and gate terminals of MOSFET 2 (32) are connected to Y phase (24) of generating unit (120), and the source and gate terminals of MOSFET 3 (34) are connected to B phase (26) of the generating unit (120). These three MOSFETs rectify the positive cycle of each phase of the three-phase voltage through its internal diodes.

The second rectifying unit (18) has a second gate terminal. The second rectifying unit also comprises of three MOSFETs i.e. MOSFET 4 (50), MOSFET 5 (52) and MOSFET 6 (54). The second rectifying unit (18) is connected to the generating unit (120) in such a way that the drain of MOSFET 4 (50) is connected to R phase (22) of the generating unit (120), the drain of MOSFET 5 (52) is connected to Y phase (24) of the generating unit (120), and the drain of MOSFET 6 (54) is connected to B phase (26) of the generating unit (120). These three MOSFETs rectify the negative cycle of each phase of the three-phase voltage.

The second rectifying unit (18) i.e. MOSFET 4 (50), MOSFET 5 (52) and MOSFET 6 (56) switch between rectification mode and shunt mode depending on the load condition. These rectifying units i.e. MOSFETs as said above comprise of a source, a drain and a gate terminal and also comprise of an internal diode. The second gate terminal for the second rectification unit (18) receives a gate control signal from a controlling unit (80). The controlling unit (80) controls the second rectifying unit (18) i.e. MOSFET 4 (50), MOSFET 5 (52) and MOSFET 6 (54) through their respective gate control signal i.e. through gate control signal (60) for MOSFET 4, gate control signal (62) for MOSFET 5 and gate control signal (64) for MOSFET 6 respectively. The controlling unit (80) of the controlling section outputs these gate control signals based on an output voltage received at the output terminal of the regulator rectifier device (130) with respect to a first predefined voltage, and the positive cycle and the negative cycle of each phase of the three phase voltage. The first predefined voltage is the same voltage at which regulator rectifier device (130) regulates. Further, output voltage goes above or below to determine the mode of regulation, i.e. when it goes high or above then the device goes in shunting mode and when it goes low or below then the device goes in rectification mode.

The gate control signal enables these MOSFETs of the second rectifying unit (18) to switch between rectification mode and shunt mode by controlling the second gate terminal of their respective MOSFETs. The gate control signal controlling each gate of the MOSFETs in second rectifying unit (18) triggers the second gate terminal of their respective MOSFETs to switch into the shunt mode only when the output voltage becomes greater than first predefined voltage. The shunt mode of the second rectifying unit (18) once switched, continues as long as the third signal during positive cycle of the corresponding phase of the three-phase voltage exists. The output voltage of the regulator rectifier device (130) is taken across the bulk capacitor (114) defined at the output terminal of the regulator rectifier device. The second rectification unit (18) is connected to a peak voltage limiting unit (108) which is configured to minimize the peak voltage during crossing of the positive cycle to negative cycle or crossing of the negative cycle to positive cycle i.e. during the crossing of second predefined voltage in each phase of the three phase alternating current voltage. The peak voltage limiting unit (108) is connected between each drain of the MOSFETs in the second rectifying unit (18) i.e. MOSFET 4 (50), MOSFET 5 (52) and MOSFET 6 (54) and their respective second gate terminals of MOSFETs. This peak voltage limiting unit (108) controls or reduces the spike voltages which are generated while switching of MOSFETs in the second rectifying unit (18).

Figure 6:
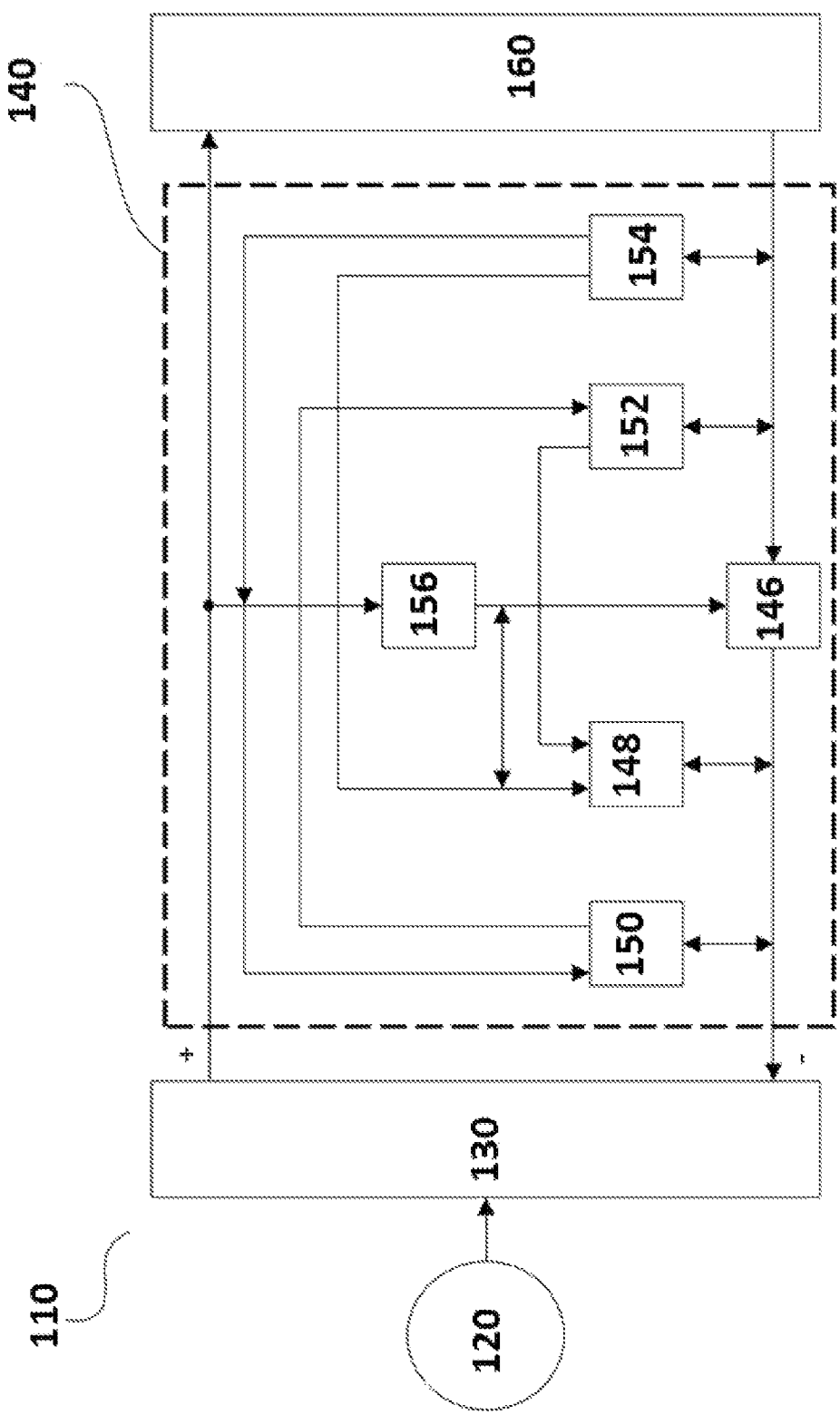
FIG. 6 shows an embodiment of the present invention depicting a block diagram of another example system with the protection device.

FIG. 6 shows a block diagram of another example system (110) including the protection device (140) connected between the output terminal (134) of the regulator rectifier device (130) and the load section (160). The protection device (140) includes a first terminal (142) which is connected with the regulator rectifier device (130), and a second terminal (144), which is connected with the load section (160). The protection device (140) comprises of switching unit (146), control unit (148), first voltage detection unit (150), second voltage detection unit (154), short circuit detection unit (152) and a driver unit (156).

First voltage detection unit (150): The first voltage detection unit (150) includes a circuit to detect the output voltage of the regulator rectifier device (130) across the bulk capacitor (114). The first voltage detection unit (150) is connected across the output terminal (134), having a positive terminal (136) and a negative terminal (138) of the regulator rectifier device (130). The first voltage detection unit (150) outputs a voltage based on the voltage it receives from the positive and negative terminals of the regulator rectifier device (130). The output voltage of the first voltage detection unit (150) is an open collector output. An open collector is a common type of output found on integrated circuits which behaves like a switch that is either connected to the ground or disconnected. The output connection of the first voltage detection unit (150) goes to a short circuit detection unit (152). The first voltage detection unit (150) detects certain voltage level (for example 9V) across the bulk capacitor (114) in a battery-less and with a battery connected condition, i.e. the first voltage detection unit (150) detects the voltage across the bulk capacitor (114) and compares the detected voltage with a predefined voltage, which for example can be 9V.

Switching unit (146): The switching unit (146) includes a semiconductor device like N-Channel MOSFET or the like, which is used as a switch to protect the regulator rectifier device (130) in reverse voltage condition, short circuit condition or the like conditions that can harm the regulator rectifier device (130). The switching unit (146) is defined to switch between an ON state and an OFF state. The switching unit (146) when in ON state completes a circuit between the positive terminal (136) and the negative terminal (138) of the regulator rectifier device (130) and breaks the circuit in OFF state. In general conditions like with battery (battery connected) and no-load condition; with battery (battery connected) and with load condition; battery-less and with load condition; and battery-less and no-load condition, the switching unit operates in ON state such that the whole current passes through the switching unit (146).

Control unit (148): The control unit (148) includes a protector circuit for switching unit (146) and a controller circuit for switching the switching unit (146) from ON state to OFF state in adverse conditions such as reverse battery condition, short circuit condition or the like. The control unit (148) receives inputs from short circuit detection unit (152), driver unit (156) and second voltage detection unit (154). Based on the inputs received from the short circuit detection unit (152), the driver unit (156) and the second voltage detection unit (154), the control unit (148) switches the switching unit (146) between ON state & OFF state.

Driver unit (156): The driver unit (156) includes a driving circuit i.e. a discrete driver circuit for driving the switching unit (146) in ON state and OFF state. The driver unit (156) is directly connected to the switching unit (146) to drive the switching unit (146) in ON state in case of general conditions as mentioned above and to ensure completion of the circuit for normal operation of the regulator rectifier device (130). In adverse conditions like short circuit condition and the reverse voltage condition or the like, the switching unit (146) is not driven by the driver unit (156) directly and instead is controlled by the control unit (148). The driver unit is connected across the positive terminal (136) of the regulator rectifier device (130).

Short circuit detection unit (152): The short circuit detection unit (152) includes a circuit which detects the short circuit condition. This short circuit detection unit (152) gives the output signal to the control unit (148). The short circuit detection unit (152) receives input from first voltage detection unit (150) based on the voltage detected across the bulk capacitor (114) of the regulator rectifier device (130). The short circuit detection unit (152) is connected across the negative terminal of the load section (160). The short circuit detection unit (152) also differentiates the short circuit condition and very low resistance condition in a with load condition.

The second voltage detection unit (154): The second voltage detection unit (154) includes detectors for reverse battery and battery-less conditions. The second voltage detection unit (154) gives the output to the control unit (148) for controlling operation of the switching unit (146) according to reverse battery & battery-less detection. The second voltage detection unit (154) is connected across the battery load (162) to detect the voltage across the battery load (162) to confirm reverse battery condition in case there is a voltage with reverse polarity. The battery-less condition is detected when no voltage is detected at the battery load (162) terminal.

Figure 7:
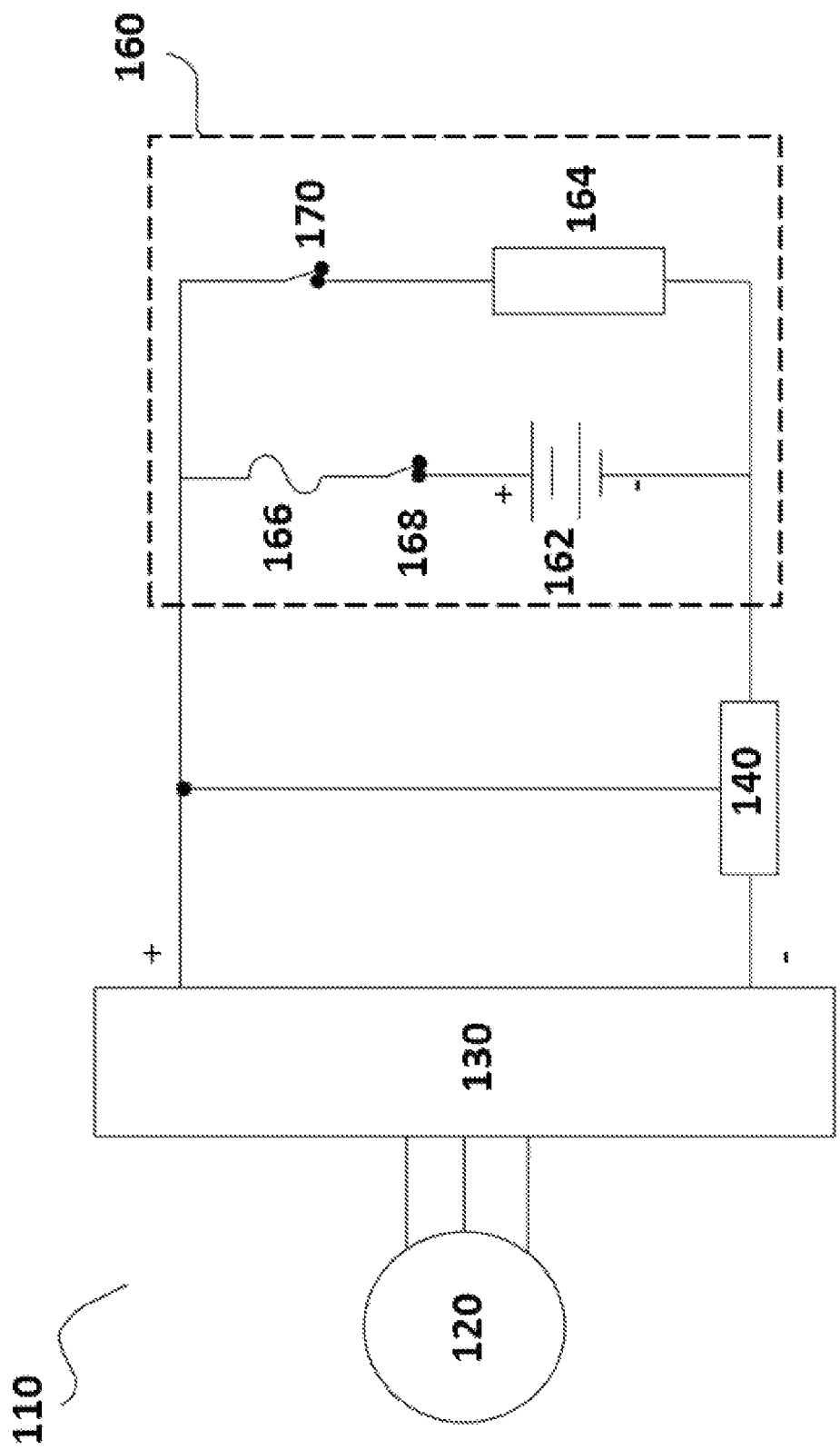
FIG. 7 shows an embodiment of the present invention depicting a block diagram of another example system with a load section including a battery load and other load connected through switches.

FIG. 7 shows a block diagram of another example system (110) with the load section (160). The load section (160) includes a battery load (162) and a load (164). The battery load (162) is connected with a first switch (168) and a fuse (166). The fuse (166) acts as a normal fuse i.e. to protect the regulator rectifier device (130) in case of reverse voltage from the battery load (162). The first switch (168) acts as a switch for achieving different conditions like battery connected and battery-less condition when the first switch (168) is connected and disconnected, respectively. The load (164) can be any load including inductive load, capacitive load etc. In an automobile, the load (164) can be a head light or a taillight etc. The load (164) is connected with a second switch (170) which when connected provides a with load condition, and when disconnected provides a no-load condition. As an example, FIG. 7 shows a with battery and with load condition.

The system (110) is further explained in detail with 6 working conditions as mentioned earlier, which includes with battery (battery connected) and no-load condition; with battery (battery connected) and with load condition; battery-less and with load condition; battery-less and no-load condition; with short circuit condition; and with reverse battery condition.

Figure 8A:
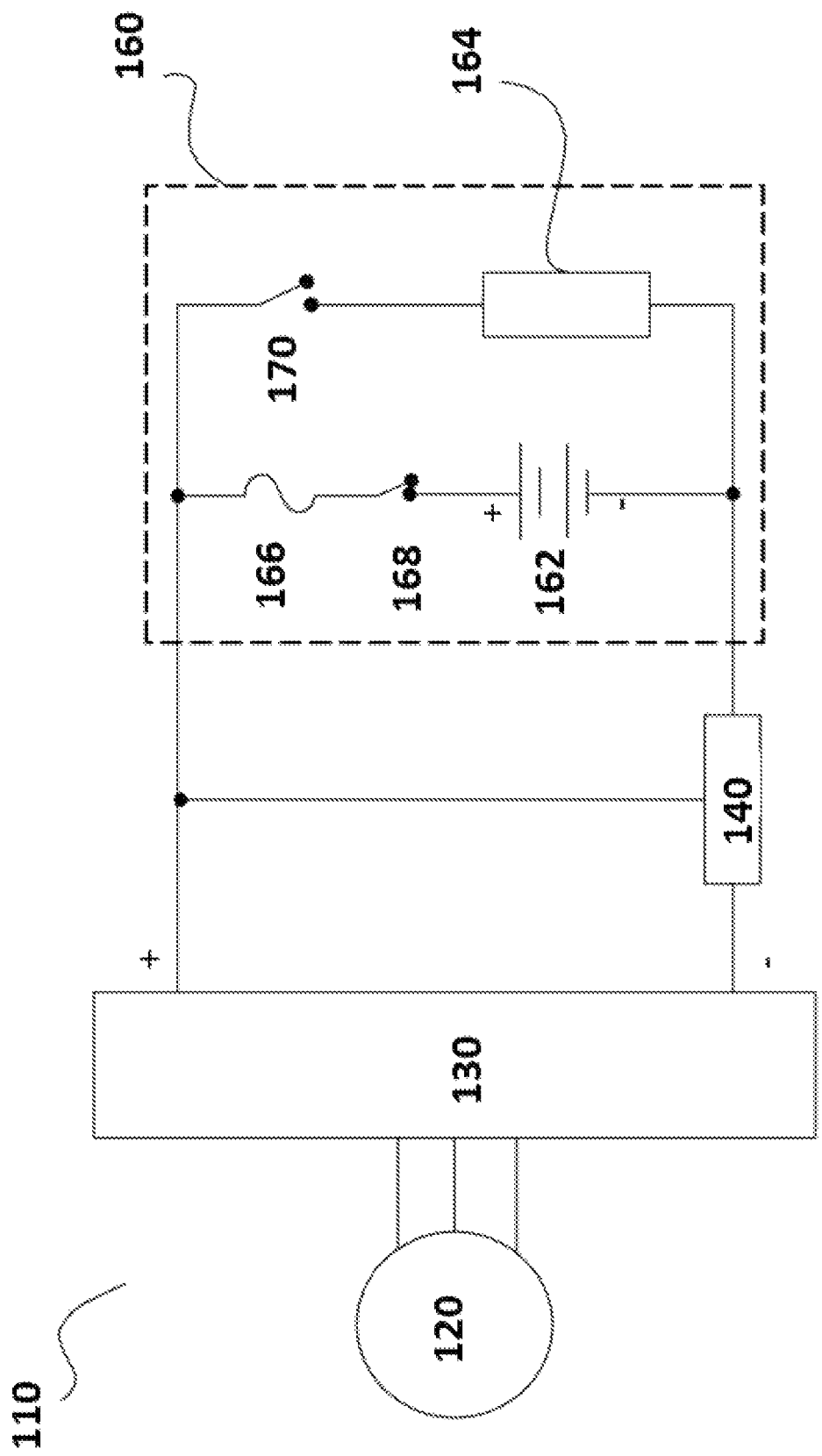
FIG. 8a shows an embodiment of the present invention depicting a block diagram of an example system with the load section in condition 1—with battery (battery connected) and no-load condition.
Figure 8C:
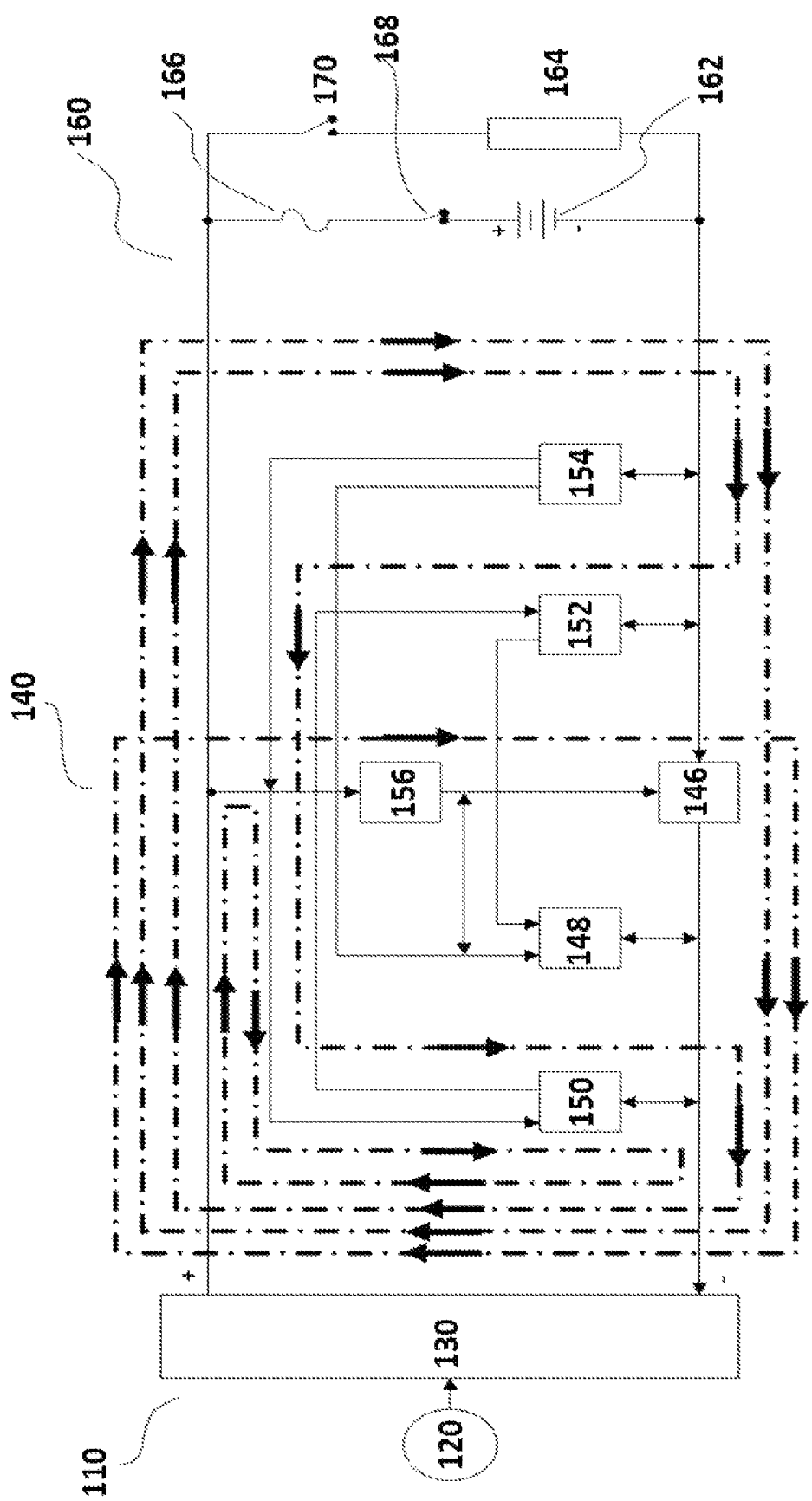
FIG. 8c shows an embodiment of the present invention depicting a block diagram of another example system showing a current flow in the protection device and the load section in condition 1—with battery (battery connected) and no-load condition.
Figure 8D:
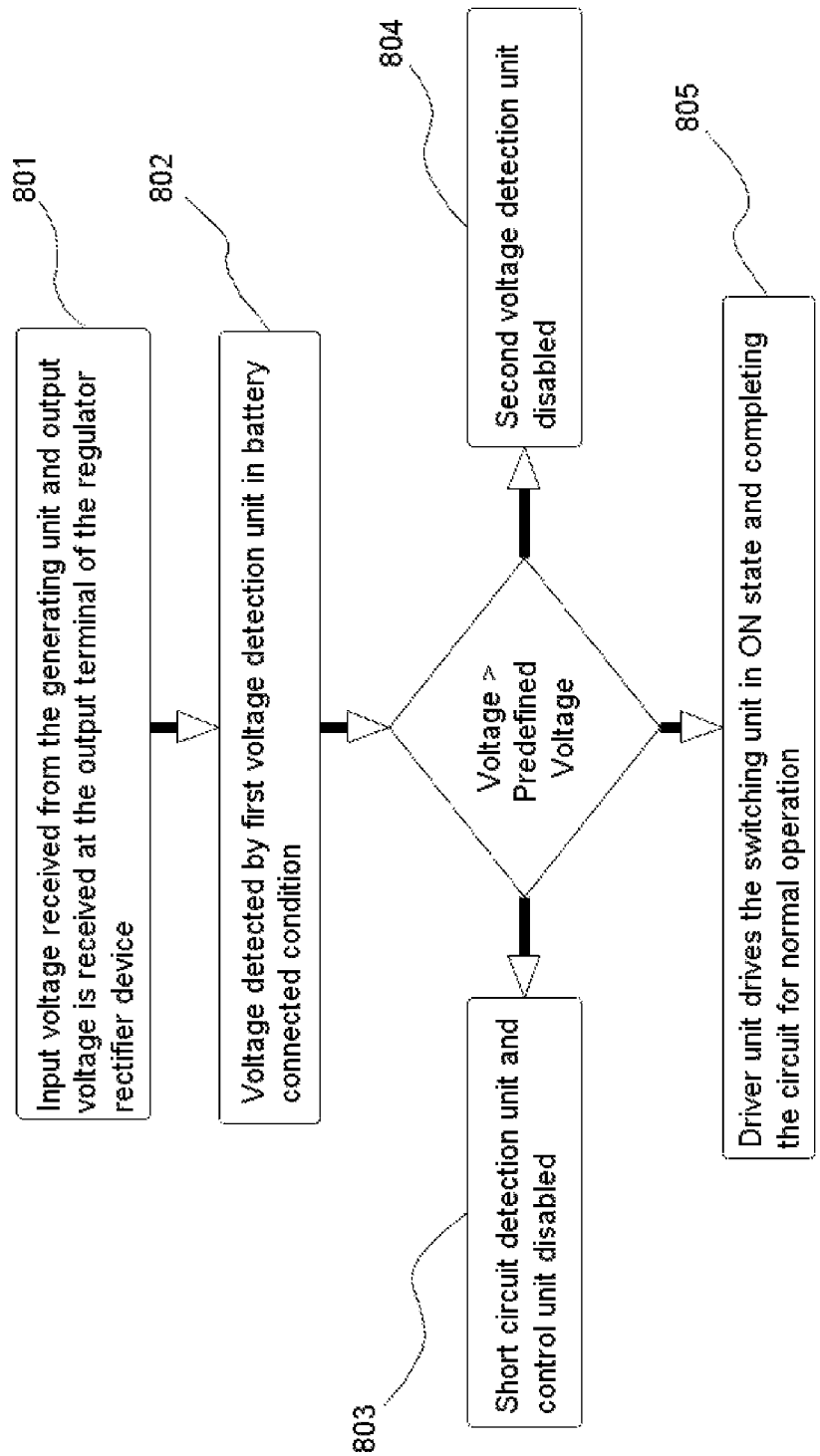
FIG. 8d shows an embodiment of the present invention depicting a flow diagram of a working of an example system in condition 1—with battery (battery connected) and no-load condition.

Condition 1—With battery (battery connected) and no-load condition: FIGS. 8a, 8b, 8c and 8d show a working of an example system (110), specifically, the regulator rectifier device (130) with the protection device (140) in with battery (battery connected) and no-load condition. FIG. 8a shows a block diagram of an example system (110) with the load section (160) having the battery load (162) connected with the circuit by the first switch (168) and a load (164), which is disconnected by the second switch (170) from the circuit. FIG. 8b shows a block diagram of another example system (110) depicting a detailed current flow within the protection device (140). FIG. 8c shows a block diagram of another example system (110) depicting a detailed current flow within the protection device (140) and the load section (160). FIG. 8d is a flow diagram illustrating a working of an example system (110) in condition 1—with battery and no-load condition, when the voltage at the output terminal (134) of the regulator rectifier device (130) is greater than a predefined voltage. As shown in FIG. 8d, at (801), the regulator rectifier device (130) receives an input voltage from the generating unit (120) and receives an output voltage at the output terminal of the regulator rectifier device (130). The generating unit (120), for example, can be a magneto, which is connected at input terminal (132) of the regulator rectifier device (130). The load section (160) includes the battery load (162), which, for example, can be 12.8 Vmin, when RPM=0 in proper polarized direction at output of the regulator rectifier device (130). At (802), the voltage across the output terminal (134) of the regulator rectifier device (130) is detected by the first voltage detection unit (150). As shown in the working of FIG. 8d, if the first voltage detection unit (150) detects the voltage above the predefined voltage or a certain voltage level, for example, 9V across the bulk capacitor (114), the short circuit detection unit (152) and the control unit (148) remain deactivated at (803). Further, the second voltage detection unit (154) remains disabled as the battery load (162) is connected properly, as at (804). Further, in this condition, even if the RPM is not applied and only the battery load (162) is connected to regulator rectifier device (130) at its output terminal (134) in proper polarized direction, then the driver unit (156) drives the switching unit (146) in ON state, independent of load conditions, as at (805). Further, when the RPM is applied, the battery charging starts normally with switching unit (146) in ON state continuously. When battery charging is started through the regulator rectifier device (130), the regulator rectifier device (130) takes charge to drive the switching unit (146) till RPM=0. The battery charging current completes the path from the positive terminal (136) of the regulator rectifier device (130) to positive terminal of the battery load (162) and then from the negative terminal of the battery load (162) to the negative terminal (138) of the regulator rectifier device (130) or the bulk capacitor (114) through the switching unit (146). The complete circuit works properly, till there is no change in load side.

Figure 9A:
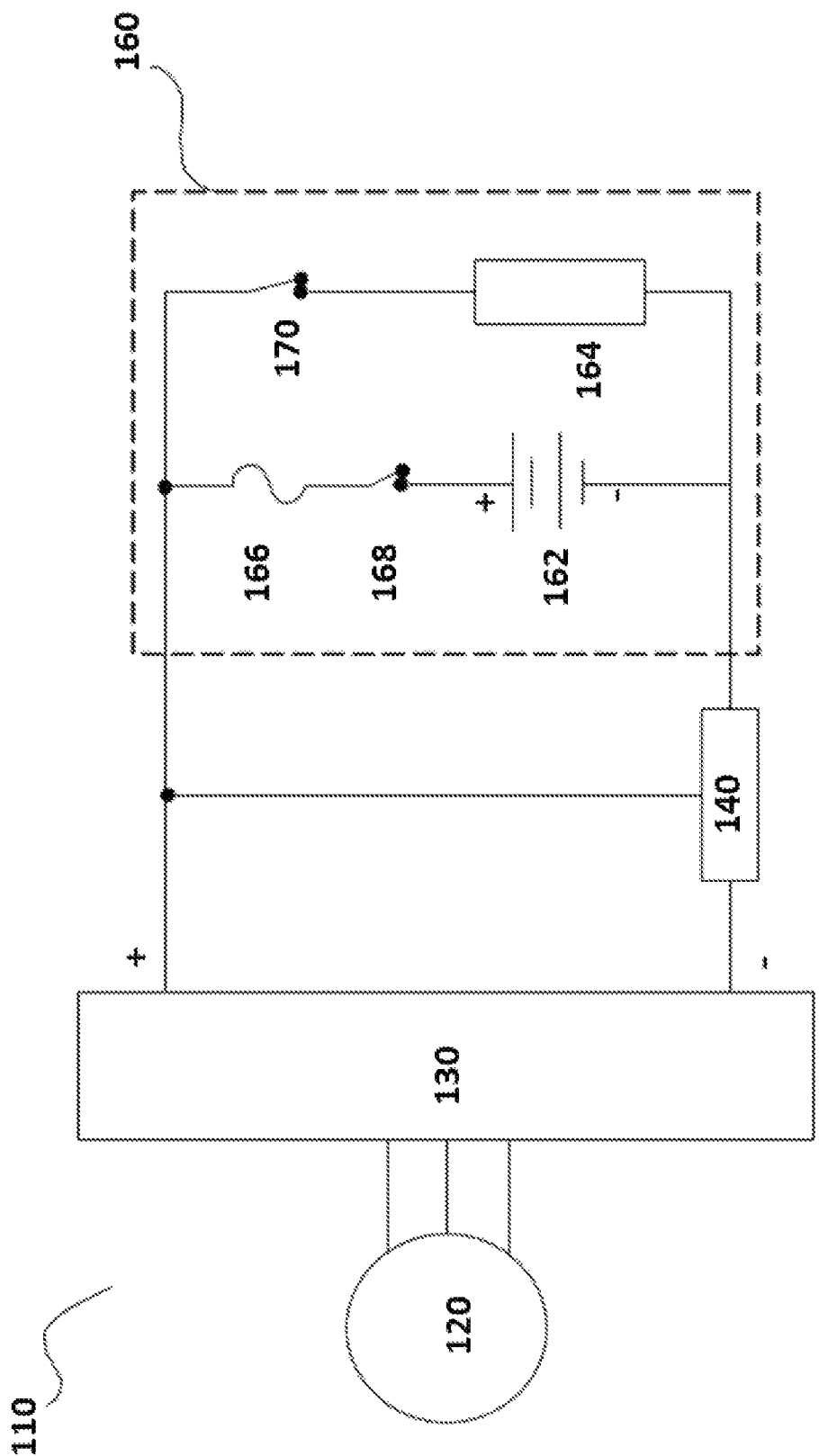
FIG. 9a shows an embodiment of the present invention depicting a block diagram of an example system with load section in condition 2—with battery (battery connected) and with load condition.
Figure 9B:
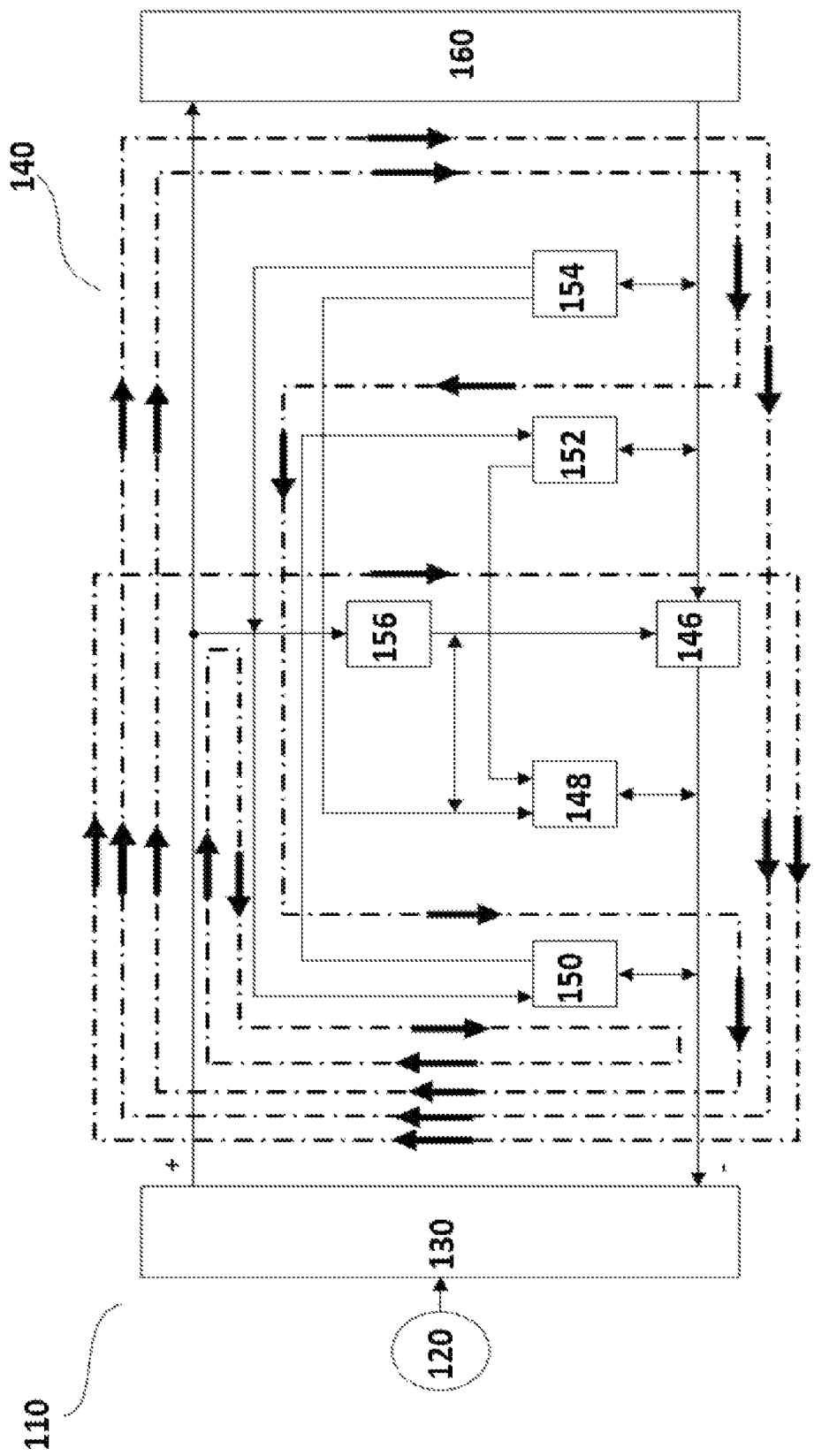
FIG. 9b shows an embodiment of the present invention depicting a block diagram of another example system showing a current flow in the protection device in condition 2—with battery (battery connected) and with load condition.
Figure 9C:
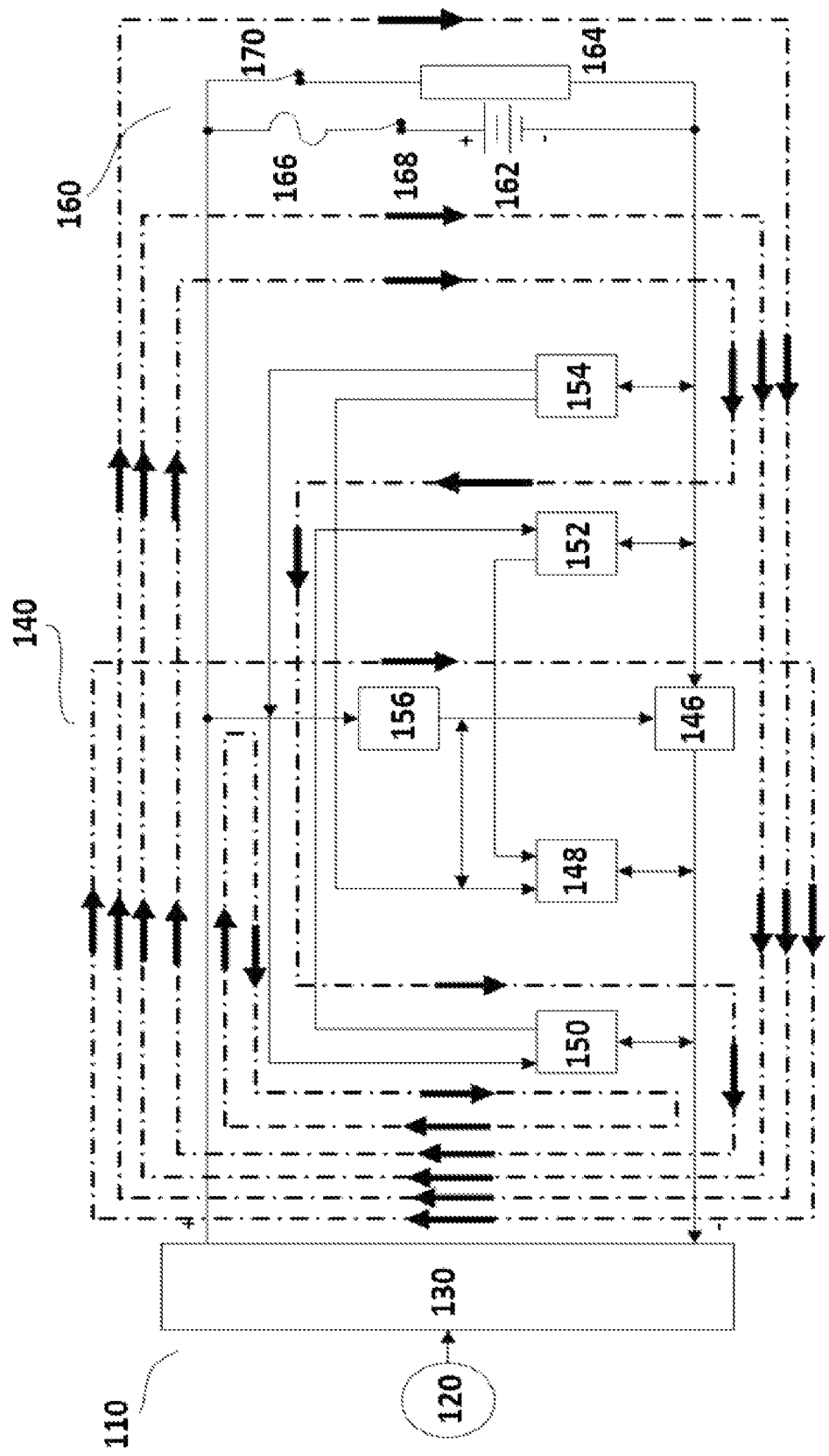
FIG. 9c shows an embodiment of the present invention depicting a block diagram of another example system showing the current flow in the protection device and the load section in condition 2—with battery (battery connected) and with load condition.
Figure 9D:
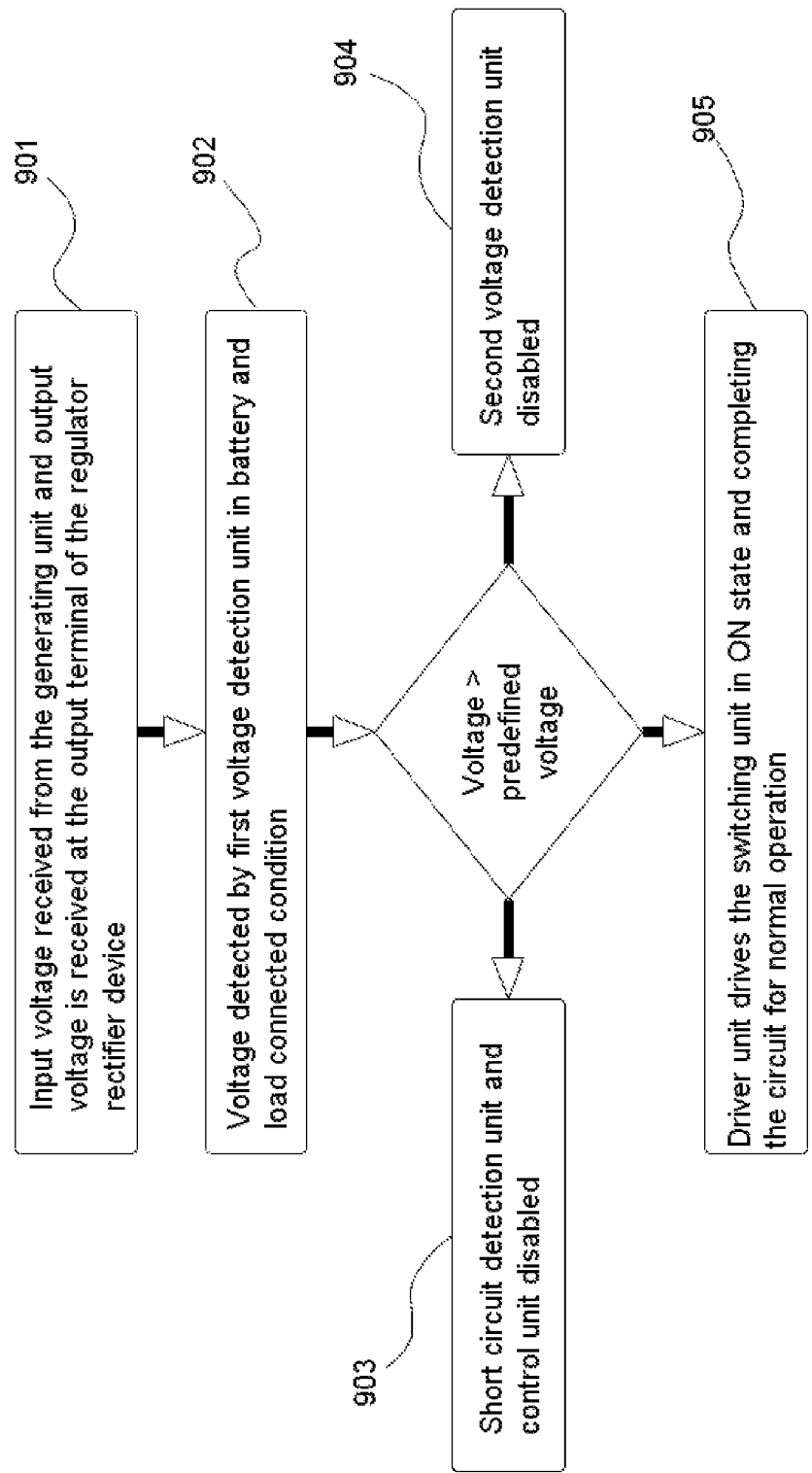
FIG. 9d shows an embodiment of the present invention depicting a flow diagram for a working of an example system in condition 2—with battery (battery connected) and with load condition.

Condition 2—With battery (battery connected) and with load condition: FIGS. 9a, 9b, 9c and 9d show a working of an example system (110), specifically, the regulator rectifier device (130) with the protection device (140) in with battery (battery connected) and with load condition. FIG. 9a shows a block diagram of an example system (110) with the load section (160) having a battery load (162) connected with the circuit by the first switch (168) and the load (164) connected by the second switch (170). FIG. 9b shows a block diagram of another example system (110) depicting a detailed current flow within the protection device (140). FIG. 9c shows a block diagram of another example system (110) depicting a detailed current flow within the protection device (140) and the load section (160). FIG. 9d is a flow diagram illustrating a working of an example system (110) in condition 2—with battery and with load condition, when the voltage at the output terminal (134) of the regulator rectifier device (130) is greater than a predefined voltage. As shown in FIGS. 9b and 9c, the regulator rectifier device (130) is connected with its associated parts like generating unit (120) and load section (160). The generating unit (120) like magneto is connected at the input terminal (132) of the regulator rectifier device (130), and the load section (160) comprising the load (164) and battery load (162) (for example, 12.8 Vmin, when RPM=0) in proper polarized direction are connected at output terminal (134) of the regulator rectifier device (130). As shown in FIG. 9d, the regulator rectifier device (130) receives an input voltage from the generating unit (120) and output voltage is received at the output terminal (134) of the regulator rectifier device (130), as at (901). The first voltage detection unit (150) detects voltage across output terminal (134) of the regulator rectifier device (130) in with battery (battery connected) and with load condition, as at (902). As shown at (903), the second voltage detection unit (154) remains disabled as the battery load (162) is connected properly. Further, as shown in the working of FIG. 9d, if the voltage detected by the first voltage detection unit (150) is greater than the predefined voltage i.e. above certain voltage level (for example, 9V) across the bulk capacitor (114) in with battery (battery connected) condition, the short circuit detection unit (152) and the control unit (148) remain deactivated, as at (903). Further, the second voltage unit (154) remains disabled as the battery load (162) is connected properly, as at (904). Further, in this condition, the driver unit (156) drives the switching unit (146) in ON state even if the RPM is not applied and only the battery load (162) and the load (164) is connected to the regulator rectifier device (130) at output terminal (134) in proper polarized direction, as at (905). When the RPM is applied, the battery charging starts normally with the switching unit (146) in ON state continuously. When battery charging started through the regulator rectifier device (130), the regulator rectifier device (130) takes charge to drive the switching unit (146) till RPM=0. The battery charging currents complete the path from positive terminal (136) of the regulator rectifier device (130) to the positive terminal of the battery load (162) and then from the negative terminal of the battery load (162) to the negative terminal (138) of the regulator rectifier device (130) or the bulk capacitor (114) through the switching unit (146), as shown in FIG. 9b. Similarly, the load current completes the path from the positive terminal (136) of the regulator rectifier device (130) to one end of the load section (160) and then from other end of the load section (160) to the negative terminal of the bulk capacitor (114) through the switching unit (146), as shown in FIG. 9c. Conclusively, both the current passes through the switching unit (146) (FIG. 9c).

Figure 10A:
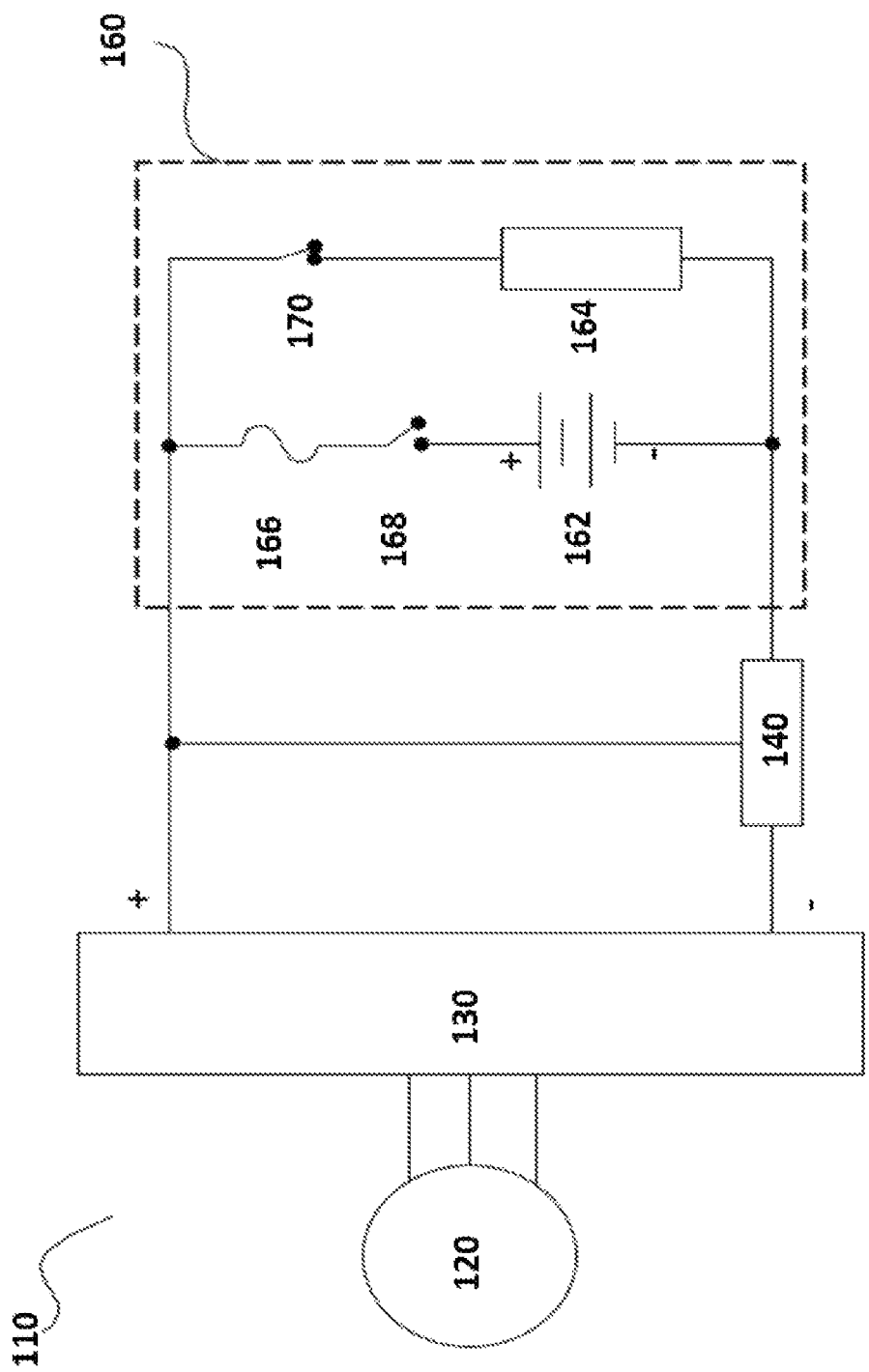
FIG. 10a shows an embodiment of the present invention depicting a block diagram of an example system with load section in condition 3—battery-less and with load condition.
Figure 10B:
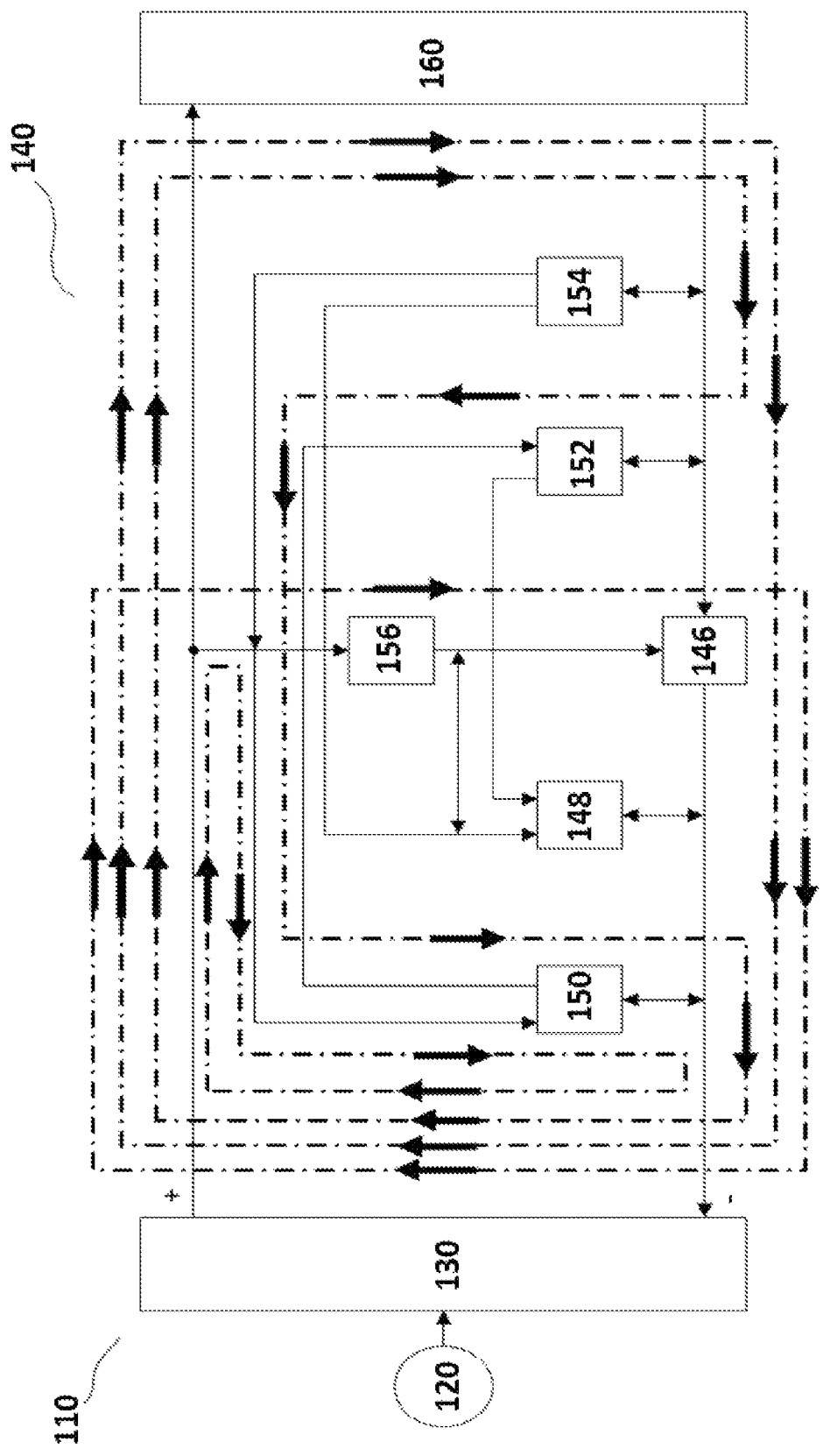
FIG. 10b shows an embodiment of the present invention depicting a block diagram of another example system showing a current flow in the protection device in condition 3—battery-less and load condition.
Figure 10C:
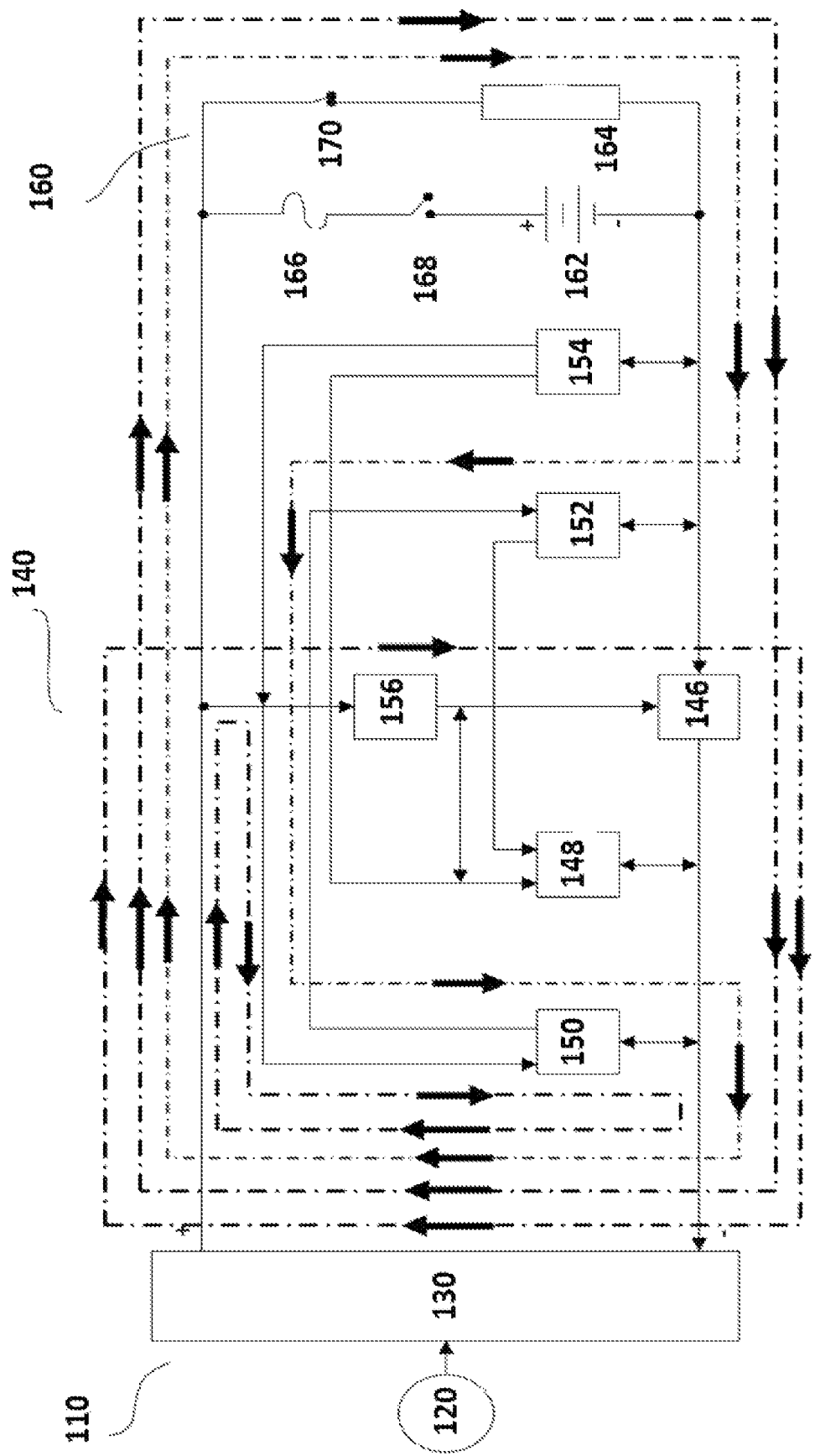
FIG. 10c shows an embodiment of the present invention a block diagram of another example system showing the current flow in the protection device and the load section in condition 3—battery-less and load condition.
Figure 10D:
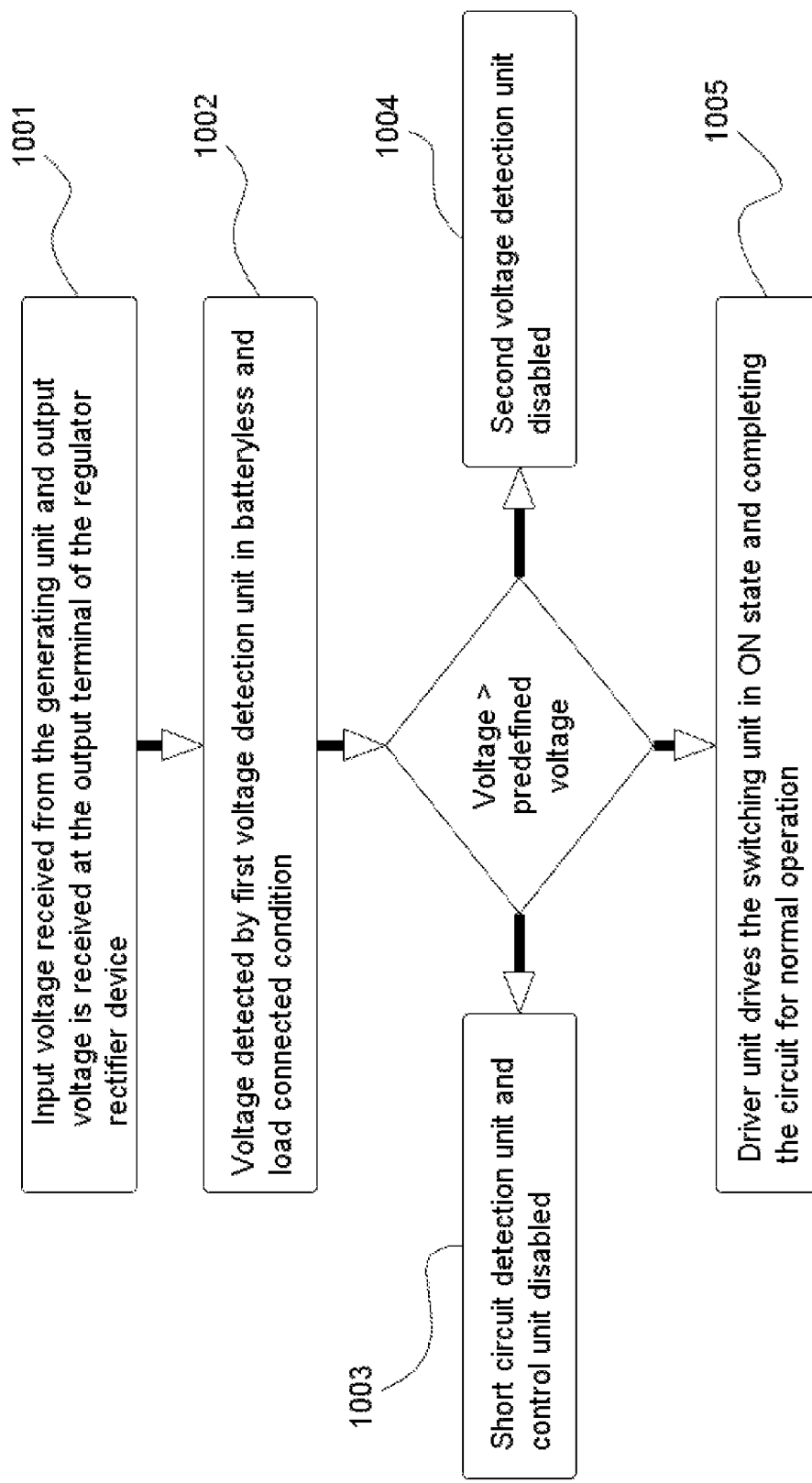
FIG. 10d shows an embodiment of the present invention depicting a flow diagram for a working of an example system in condition 3—battery-less and load condition.

Condition 3—Battery-less and with load condition: FIGS. 10a, 10b, 10c and 10d show a working of an example system (110), specifically, the regulator rectifier device (130) with the protection device (140) in battery-less and with load condition. FIG. 10a shows a block diagram of an example system (110) with the load section (160) having a battery-less and with load condition i.e. the battery load (162) is disconnected from the circuit by the first switch (168) and the load (164) is connected by the second switch (170). FIG. 10b shows a block diagram of another example system (110) depicting a detailed current flow within the protection device (140). FIG. 10c shows a block diagram of another example system (110) depicting a detailed current flow within the protection device (140) and the load section (160). FIG. 10d is a flow diagram illustrating a working of an example system (110) in condition 3—battery-less and with load condition, when the voltage at the output terminal (134) of the regulator rectifier device (130) is greater than a predefined voltage. As shown in FIG. 10b, the regulator rectifier device (130) is connected with its associated parts like the generating unit (120) and the load section (160). The generating unit (120) like magneto is connected at the input terminal (132) of the regulator rectifier device (130), and the load section (160) comprising the load (164) is connected at output terminal (134) of the regulator rectifier device (130). As shown in FIG. 10c, in this condition, the battery load (162) is not connected with the circuit. Since, the battery load (162) is not connected to output terminal (134) of the regulator rectifier device (130), the driver unit (156) cannot drive the switching unit (146) in ON state at RPM=0. However, when the RPM is applied, the bulk capacitor (114) of the regulator rectifier device (130) charges even in battery-less condition to provide voltage at the output terminal (134) of the regulator rectifier device (130). Accordingly, as shown at (1001) in FIG. 10d, the regulator rectifier device (130) receives an input voltage from the generating unit (120) and output voltage is received at the output terminal (134) of the regulator rectifier device (130). At (1002), the first voltage detection unit (150) detects voltage across output terminal (134) of the regulator rectifier device (130) in battery-less condition and load condition. As shown in the working of FIG. 10d, if the voltage detected by the first voltage detection unit (150) is greater than the pre-defined voltage i.e. above certain voltage level (for example, 9V) across the bulk capacitor (114) in battery-less condition, the short circuit detection unit (152) and the control unit (148) remain disabled (1003). Further, the second voltage detection unit (154) remains disabled as the battery load (162) is not connected, at (1004) and the driver unit (156) drives the switching unit (146) in ON state only when RPM is applied, as at (1005). The load current completes the path from the positive terminal (136) of the regulator rectifier device (130) to one end of load (164) and then from other end of load to the negative terminal (138) of the regulator rectifier device (130) through the switching unit (146), as shown in FIG. 10c. In this condition, the voltage appeared at output terminal (134) i.e. at across load, is with ripple voltage. If in case the regulator rectifier device (130) is overloaded by reducing the load resistance, the output voltage appearing across the bulk capacitor (114) also reduces. When the voltage across the bulk capacitor (114) reduces below certain voltage level (for example, 9V), then the control unit (148) becomes active or turns ON and drops down the gate voltage of switching unit (146) to ground level to switch the switching unit (146) into OFF state, to avoid the failure of switching unit (146) by going in linear region.

Figure 11A:
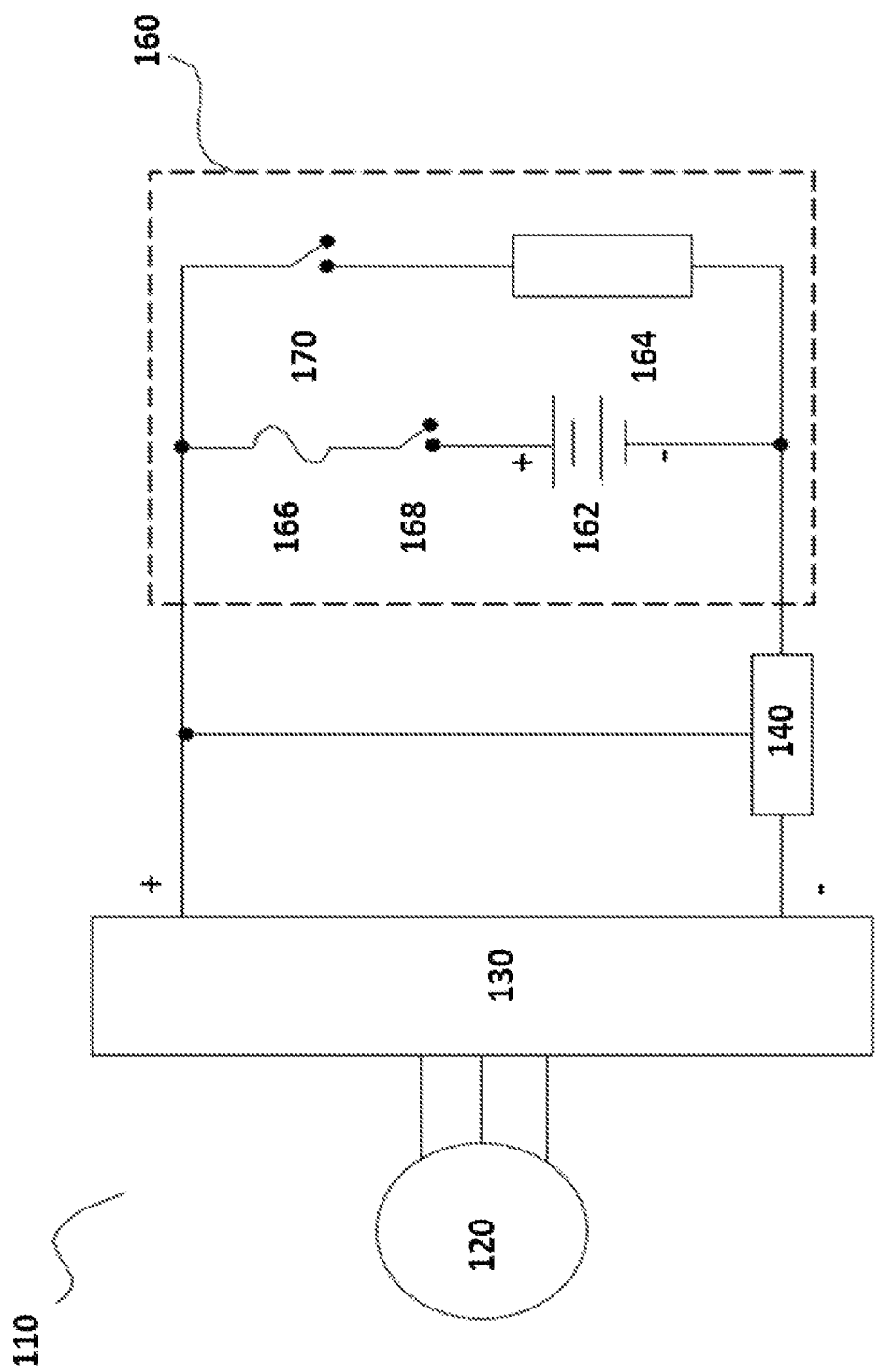
FIG. 11a shows an embodiment of the present invention depicting a block diagram of an example system with load section in condition 4—battery-less and no-load condition.
Figure 11B:
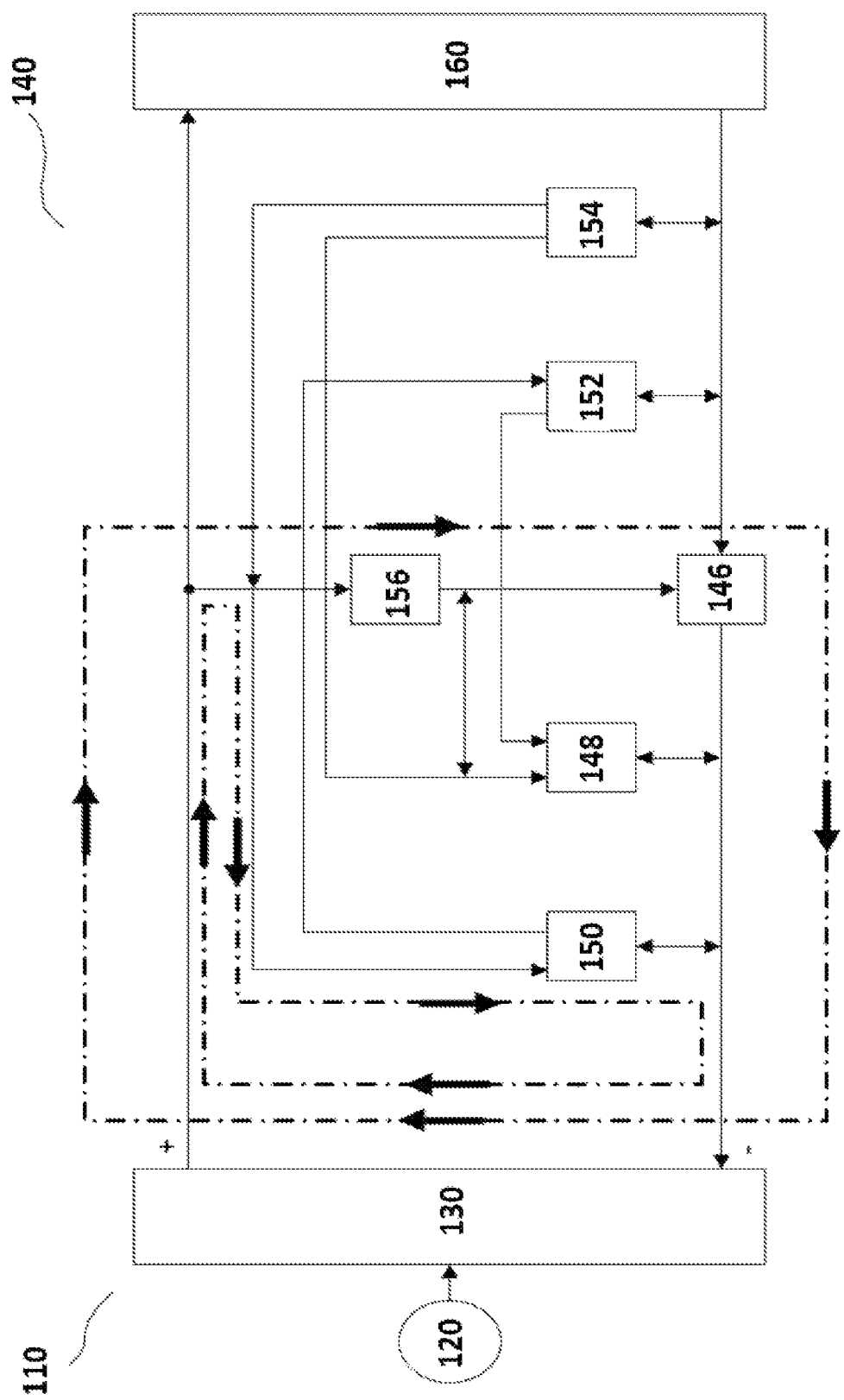
FIG. 11b shows an embodiment of the present invention depicting a block diagram of another example system showing a current flow in the protection device in condition 4—battery-less and no-load condition.
Figure 11C:
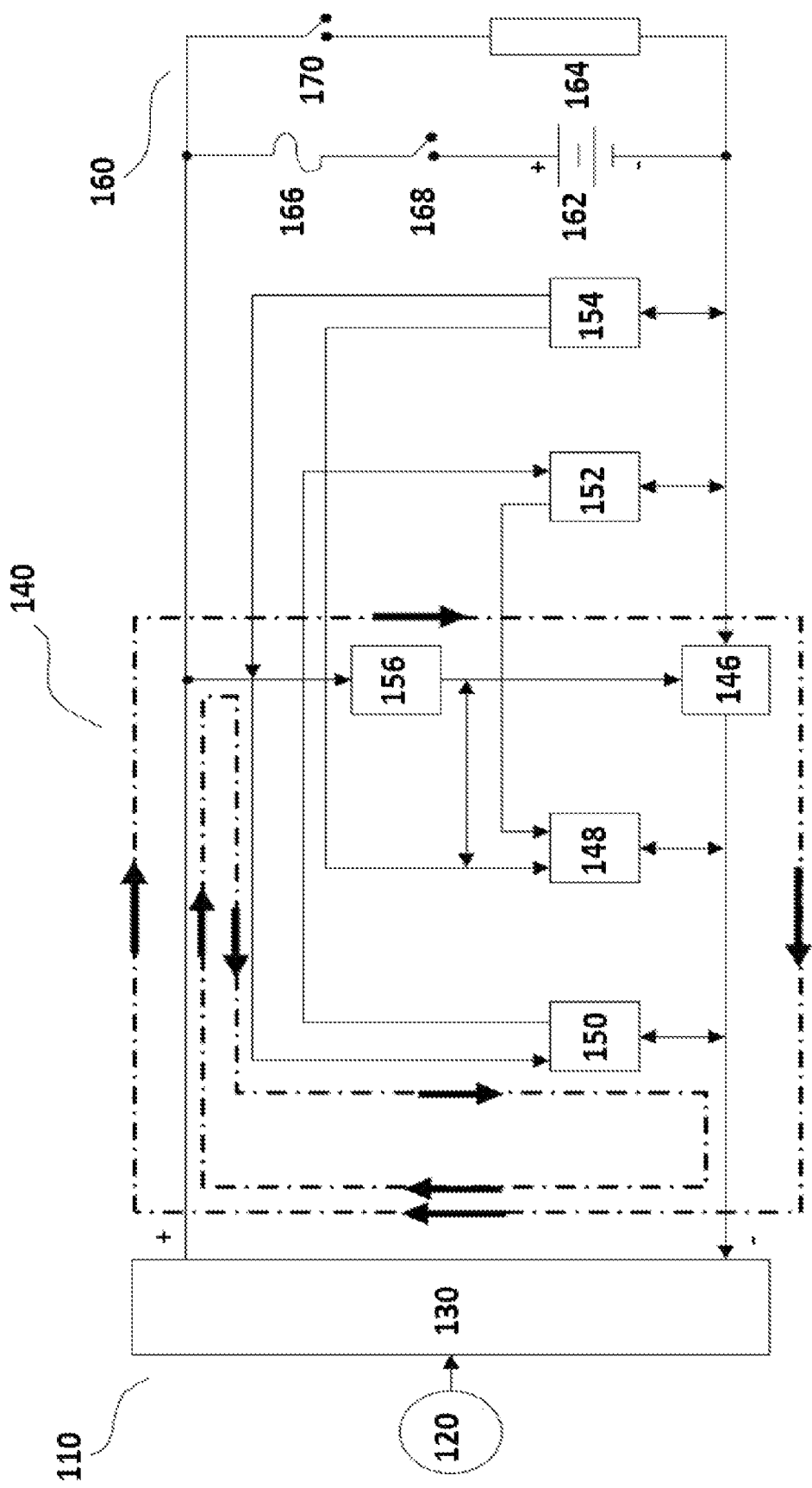
FIG. 11c shows an embodiment of the present invention depicting a block diagram of another example system showing the current flow in the protection device and the load section in condition 4—battery-less and no-load condition.
Figure 11D:
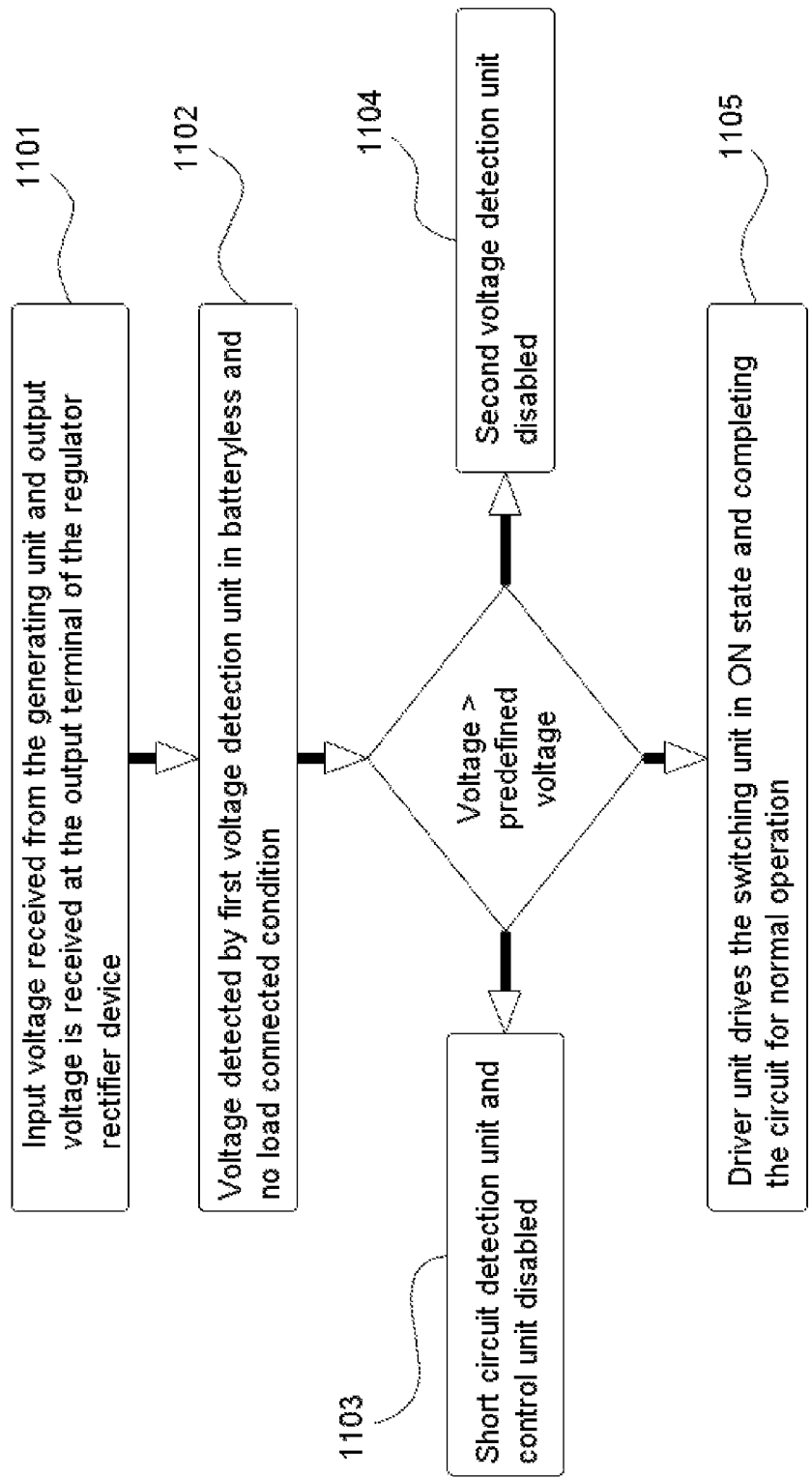
FIG. 11d shows an embodiment of the present invention depicting a flow diagram for a working of an example system in condition 4—battery-less and no-load condition.

Condition 4—Battery-less and no-load condition: FIGS. 11a, 11b, 11c and 11d show a working of an example system (110), specifically, the regulator rectifier device (130) with the protection device (140) in battery-less and no-load condition. FIG. 11a shows a block diagram of an example system (110) with the load section (160) having a battery-less and no-load condition i.e. the battery load (162) is disconnected from the circuit by the first switch (168) and the load (164) is also disconnected from the circuit by the second switch (170). FIG. 11b shows a block diagram of another example system (110) depicting a detailed current flow within the protection device (140). FIG. 11c shows a block diagram of another example system (110) depicting a detailed current flow within the protection device (140) and the load section (160). FIG. 11d is a flow diagram illustrating a working of an example system (110) in condition 4—battery-less and no-load condition, when the voltage at the output terminal (134) of the regulator rectifier device (130) is greater than a predefined voltage. Since in this condition, the load (164) and the battery load (162) are disconnected from the circuit, no current flows through them. As shown in FIG. 11b, the regulator rectifier device (130) is connected with its associated parts like the generating unit (120) and the load section (160). In this condition, the generating unit (120) like magneto is connected at the input terminal (132) of the regulator rectifier device (130) and no-load and no battery are connected to the output terminal (134) of the regulator rectifier device (130). Since, the battery load (162) is not connected to output terminal (134), the driver unit (156) cannot drive the switching unit (146) in ON state at RPM=0. However, when the RPM is applied, the bulk capacitor (114) charges even in battery-less condition to provide voltage at the output terminal (134) of the regulator rectifier device (130). Accordingly, as shown at (1101) in FIG. 11d, the regulator rectifier device (130) receives an input voltage from the generating unit (120) and output voltage is received at the output terminal (134) of the regulator rectifier device (130). At (1102), the first voltage detection unit (150) detects voltage across the output terminal (134) of the regulator rectifier device (130) in battery-less and no-load condition. As shown in the working of FIG. 11d, if the voltage detected by the first voltage detection unit (150) is greater than the predefined voltage i.e. above certain voltage level (for example, 9V) across the bulk capacitor (114) in battery-less and no-load condition, the short circuit detection unit (152) and the control unit (148) remain disabled (1103). Further, the second voltage detection unit (154) also remains disabled as the battery load is not connected, at (1104). The driver unit (156) drives the switching unit (146) in ON state thereby completing the circuit for normal operation, when RPM is applied, as at (1105). In this condition, the voltage appeared at the output terminal (134) i.e. at first voltage detection unit (150) is with ripple voltage.

Condition 5—Short circuit condition: In short circuit condition, the current passes through a least resistive path also termed as short, which can damage the regulator rectifier device (130). The short is termed for a least resistive path or a resistance with least resistance value for better explanation of the condition herein. The short circuit condition (condition 5) may exist in with battery (battery connected) and no-load condition; with battery (battery connected) and with load condition; battery-less and with load condition; and battery-less and no-load condition.

Figure 13A:
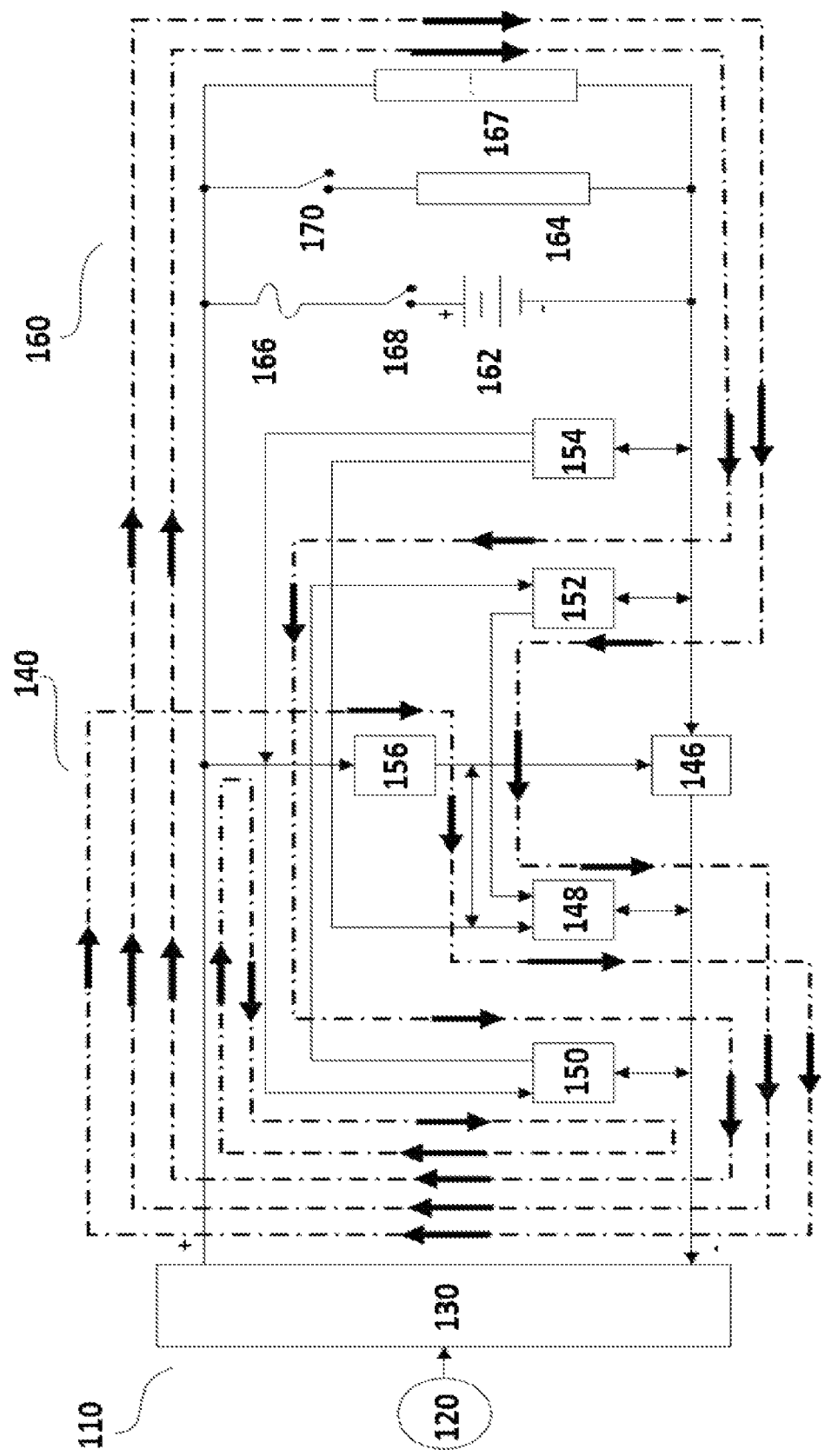
FIG. 13a shows an embodiment of the present invention depicting a block diagram showing a current flow in the protection device and the load section in condition 5—battery-less and no-load in short circuit condition at time when voltage goes below predefined voltage.
Figure 13B:
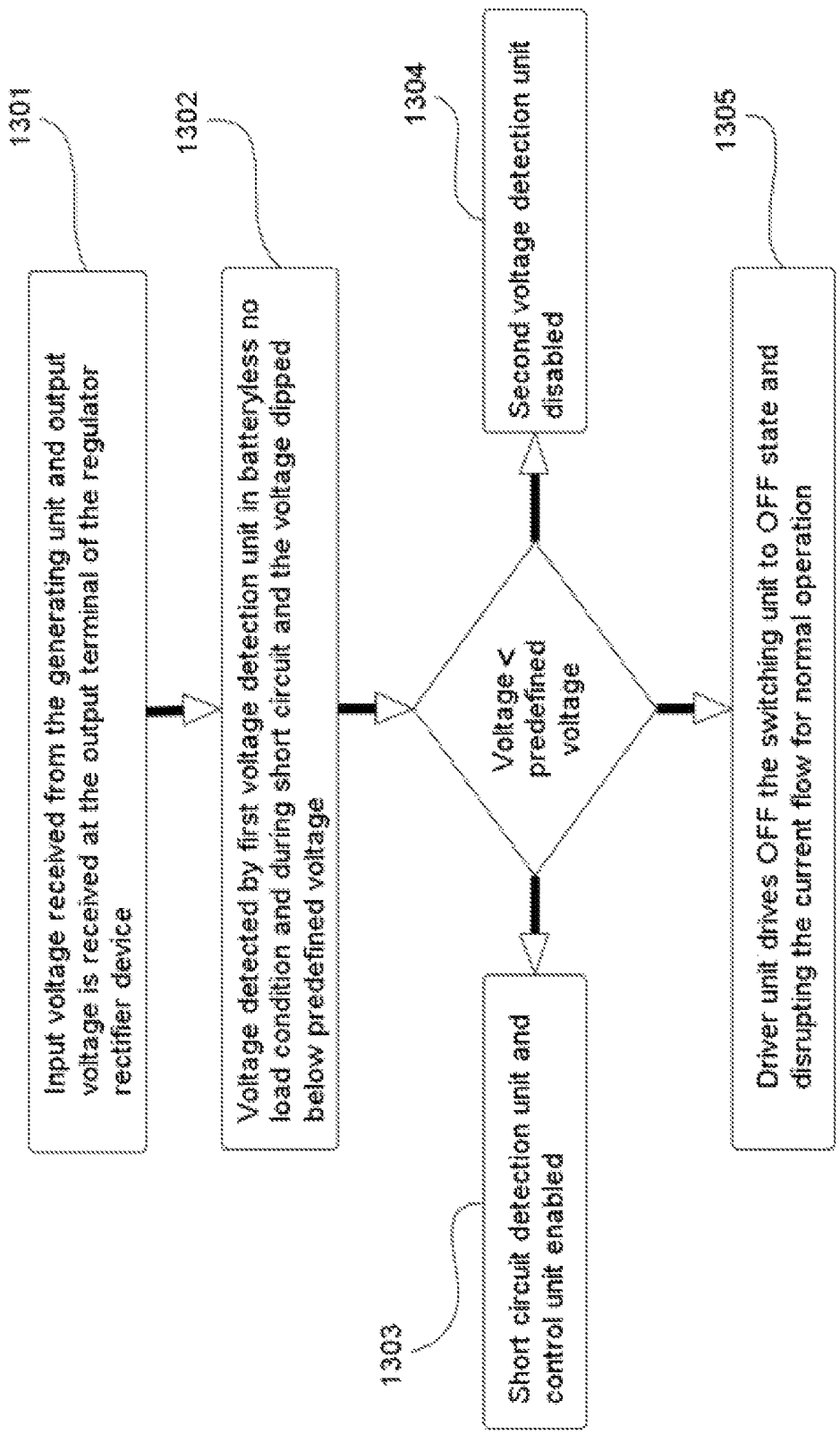
FIG. 13b shows an embodiment of the present invention depicting a flow diagram for a working of an example system in condition 5—battery-less and no-load in short circuit condition at time when voltage goes below predefined voltage.
Figure 14A:
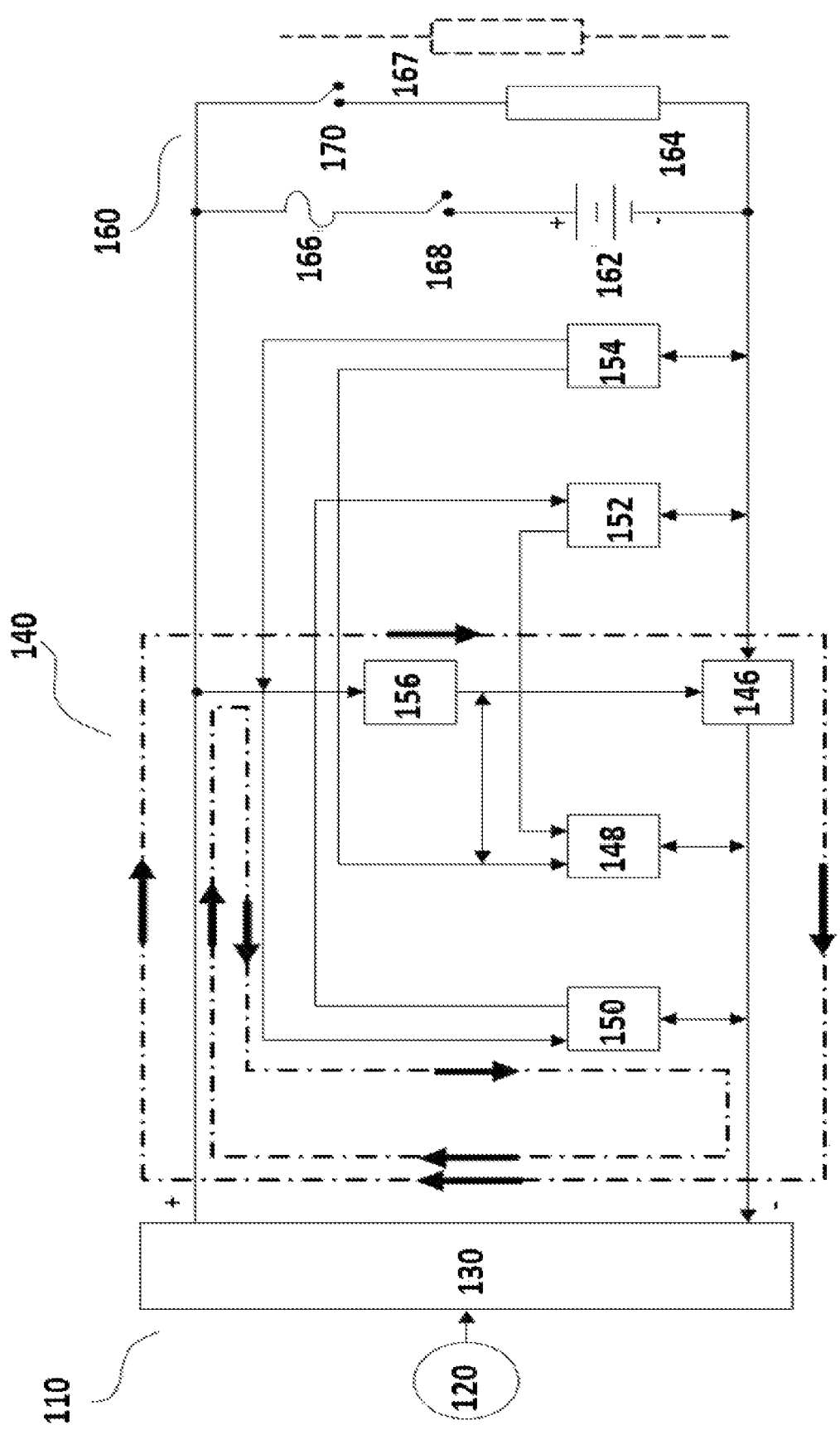
FIG. 14a shows an embodiment of the present invention depicting a block diagram showing a current flow in the protection device and the load section in condition 5—battery-less and no-load condition and short circuit condition is removed.
Figure 14B:
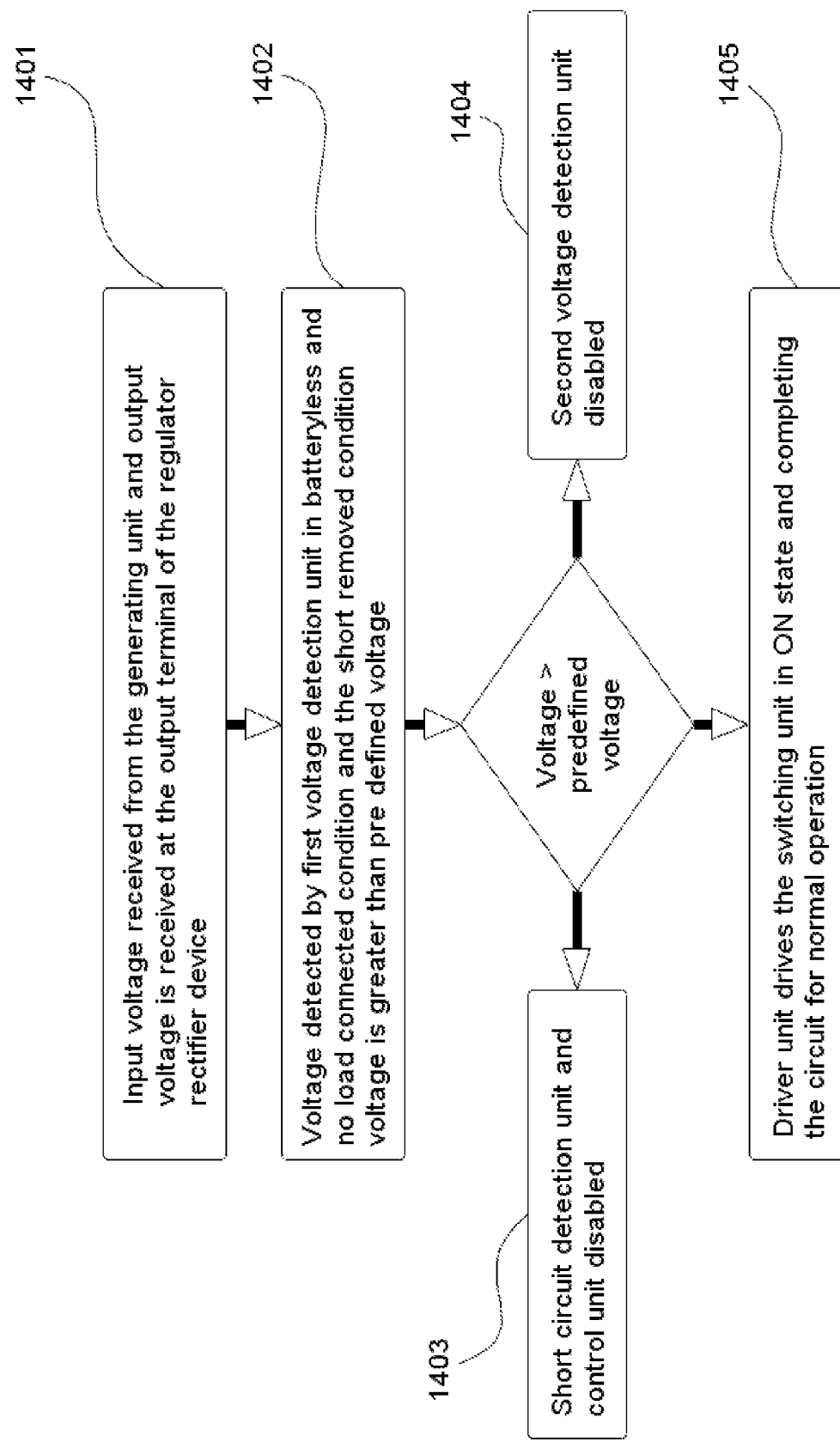
FIG. 14b shows an embodiment of the present invention depicting a flow diagram for a working of an example system in condition 5—battery-less and no-load condition and short circuit condition is removed.

FIGS. 12a, 12b, 12c and 12d show a working of an example system (110) in battery-less, no-load and short circuit condition, when the voltage at the output terminal (134) is greater than a predefined voltage. FIGS. 13a and 13b show a working of an example system (110) in battery-less, no-load, short circuit condition, when the voltage dips below a predefined voltage. Thereafter, FIGS. 14a and 14b show a working of an example system (110) in battery-less, no-load, short circuit condition, once the short (167) is removed. The short (167) can be a manual short wherein a wire connects positive terminal (136) and the negative terminal (138) of the regulator rectifier device (130). FIGS. 12, 13 and 14 show the working of an example system (110), specifically, the regulator rectifier device (130) with the protection device (140) in short circuit condition in battery-less and no-load condition.

Figure 12A:
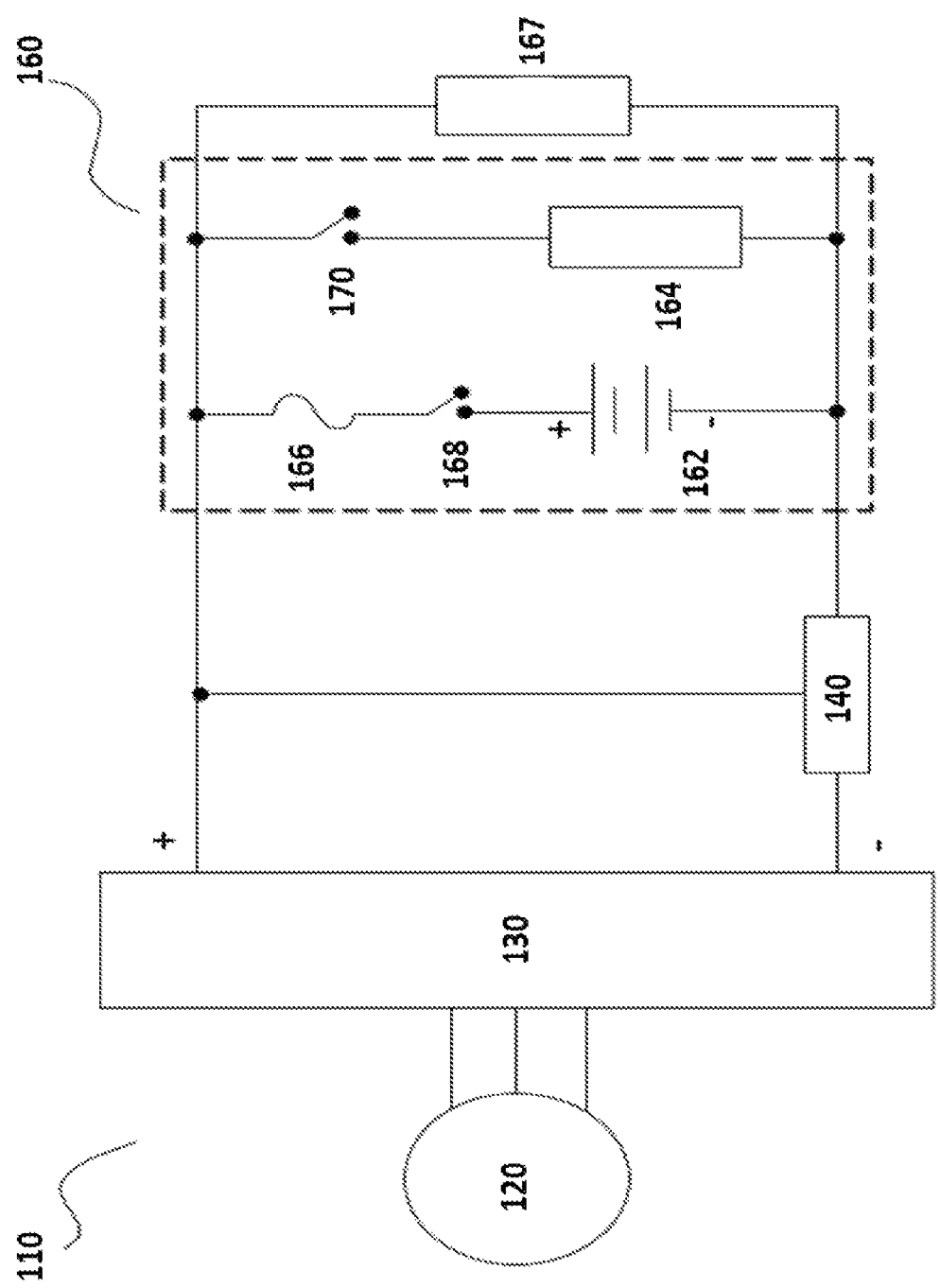
FIG. 12a shows an embodiment of the present invention depicting a block diagram of an example system with load section in condition 5—battery-less and no-load in the short circuit condition.
Figure 12B:
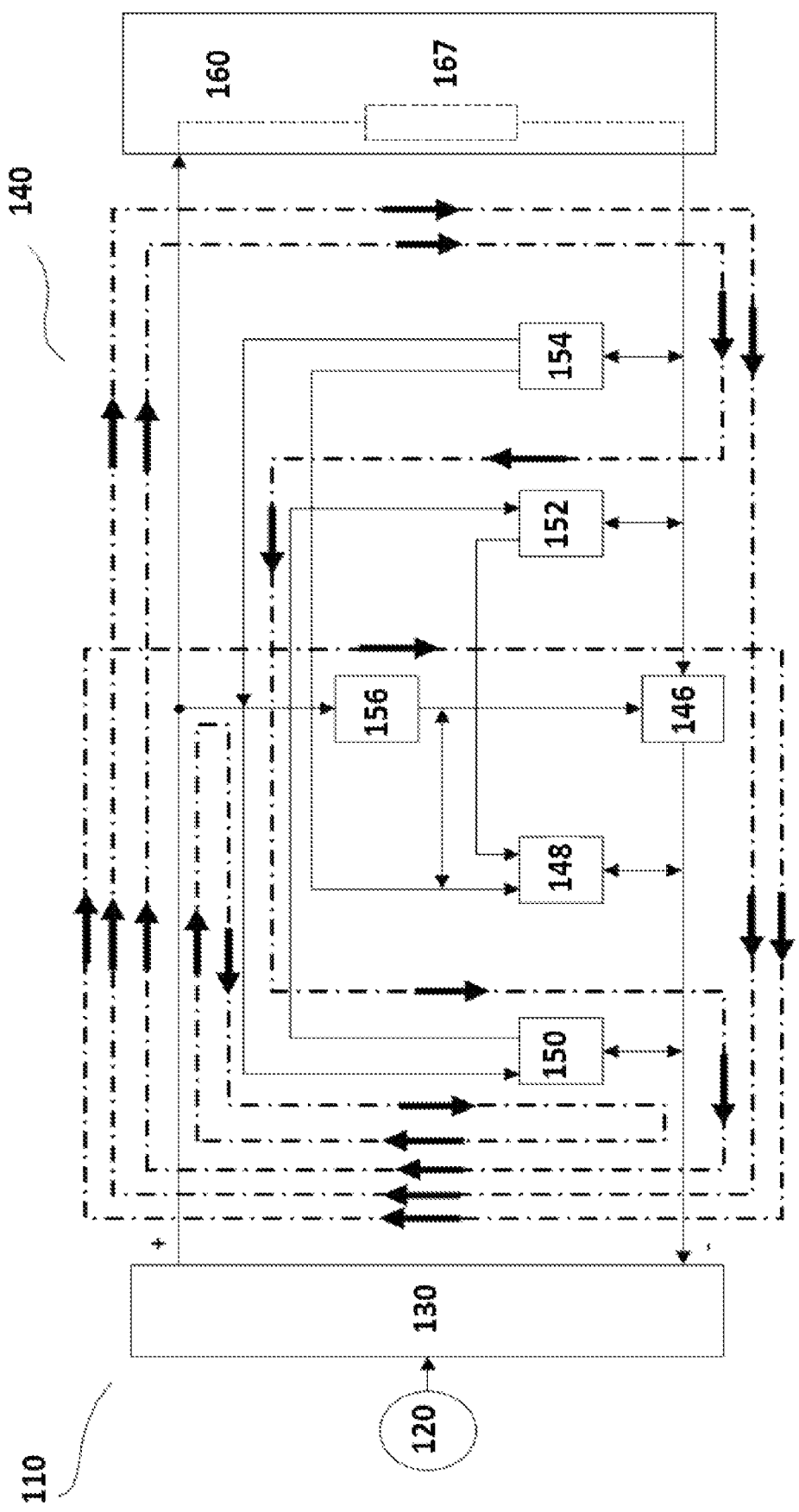
FIG. 12b shows an embodiment of the present invention depicting a block diagram of another example system showing a current flow in the protection device in condition 5—battery-less and no-load in short circuit condition at time t0.
Figure 12C:
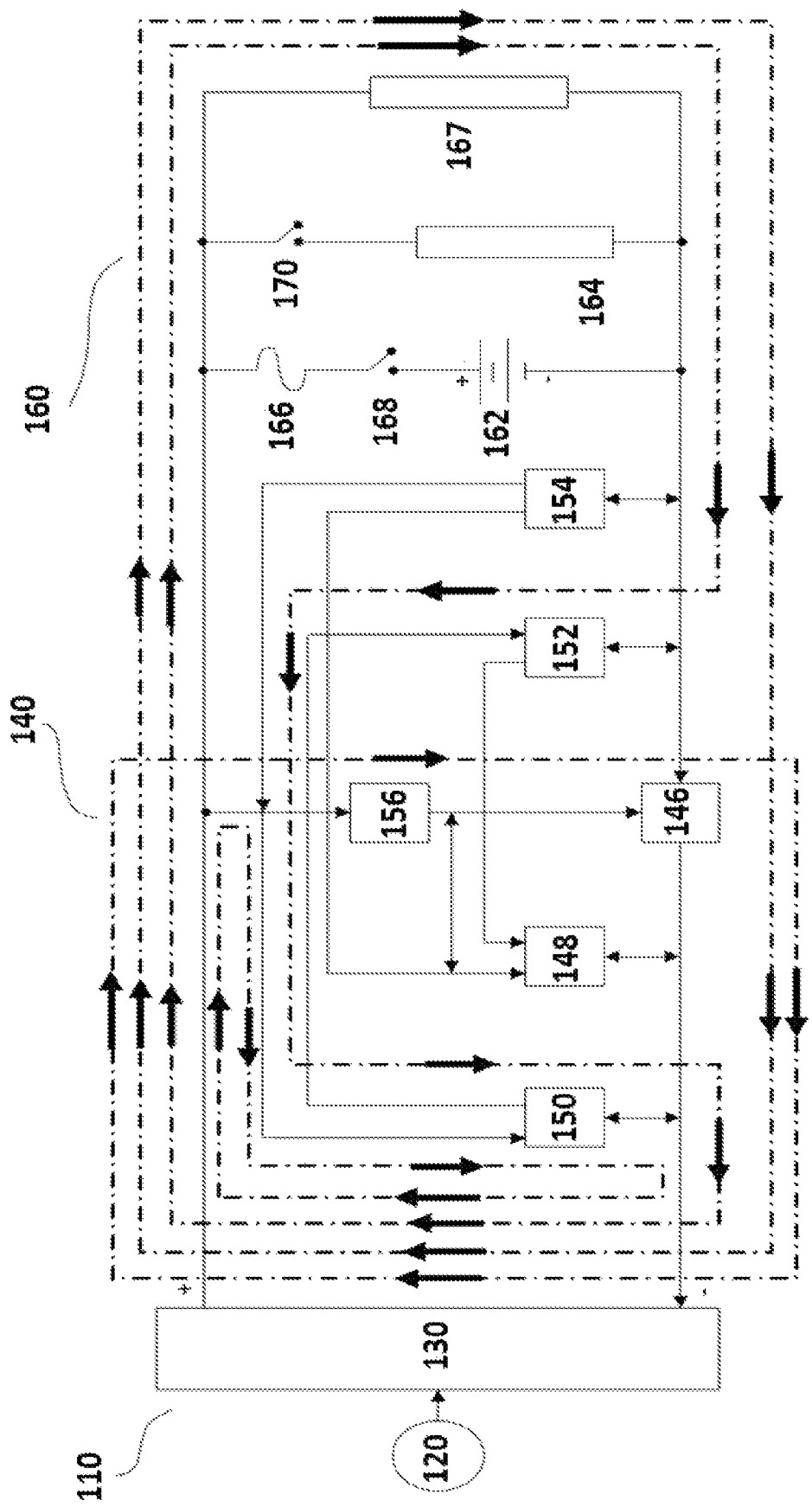
FIG. 12c shows an embodiment of the present invention depicting a block diagram of another example system showing the current flow in the protection device and the load section in condition 5—battery-less and no-load in short circuit condition at time t0.
Figure 12D:
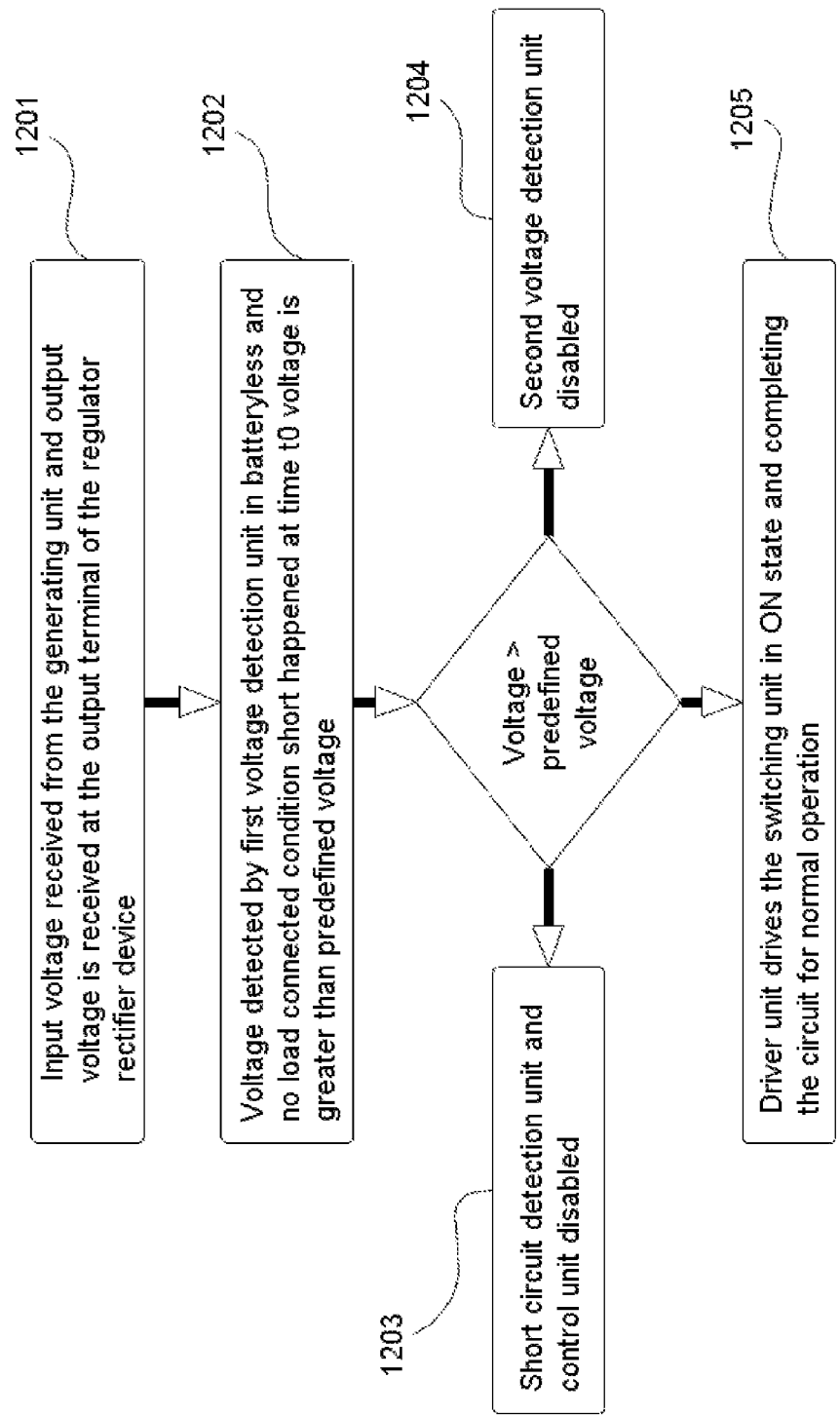
FIG. 12d shows an embodiment of the present invention depicting a flow diagram for a working of an example system in condition 5—battery-less and no-load in short circuit condition at time t0.

FIG. 12a shows a block diagram of an example system (110) with the load section (160) having a battery-less and no-load condition and a short (167) connected between the positive terminal (136) and the negative terminal (138) of the regulator rectifier device (130). FIG. 12b shows a block diagram of another example system (110) depicting a detailed current flow within the protection device (140) when short (167) is connected. FIG. 12c shows a block diagram of another example system (110) depicting a detailed current flow within the protection device (140) and the load section (160) when shorted in no-load and battery-less condition. FIG. 12d is a flow diagram illustrating a working of an example system (110) in condition 5—short circuit condition, at time t=0, when the voltage at the output terminal (134) of the regulator rectifier device (130) is greater than a predefined voltage. As disclosed in FIG. 12a, the regulator rectifier device (130) is connected with its associated parts like the generating unit (120) and the load section (160). In this condition, the generating unit (120) like magneto is connected at the input terminal (132) of the regulator rectifier device (130) and no-load and no battery are connected to the output terminal (134) of the regulator rectifier device (130). Since, the battery load (162) is not connected to output terminal (134), the driver unit (156) cannot drive the switching unit (146) in ON state at RPM=0. Due to bulk capacitor (114), the regulator rectifier device (130) works in battery-less condition. So, initially at t=0, regulator rectifier device (130) charges even in battery-less condition to provide voltage at the output terminal (134) of the regulator rectifier device (130). Accordingly, as shown at (1201) in FIG. 12d, the regulator rectifier device (130) receives an input voltage from the generating unit (120) and output voltage is received at the output terminal (134) of the regulator rectifier device (130). The voltage at t=0 at the output terminal (134) of the regulator rectifier device (130) is detected in no-load and battery-less condition as usual by the first voltage detection unit (150), at (1202). But the difference here is that the circuit is shorted. However, at t=0, the system works as in normal condition with no-load and battery-less condition i.e. the short circuit detection unit (152) and the control unit (148) remain disabled at t=0, as at (1203). Further, the second voltage detection unit (154) also remains disabled, as the battery load is not connected, at (1204). The drive unit (156) drives the switching unit (146) in ON state due to voltage at the output terminal (134) i.e. due to voltage at bulk capacitor (114) greater than predefined voltage, at (1205). However, when the voltage starts dipping below a predefined voltage due to short (167), the current path changes as shown in FIG. 13.

FIG. 13a shows a block diagram of an example system (110) depicting a detailed current flow within the protection device (140) and the load section (160) when shorted in no-load and battery-less condition and when the voltage at the output terminal (134) of the regulator rectifier device (130) is less than a predefined voltage. FIG. 13b is a flow diagram illustrating a working of an example system (110) in short circuit, no-load and battery-less condition, when the voltage at the output terminal (134) of the regulator rectifier device (130) is less than a predefined voltage. Due the presence of the bulk capacitor (114), the output voltage at the output terminal (134) of the regulator rectifier device (130) will be received. Accordingly, as shown at (1301) in FIG. 13b, the regulator rectifier device (130) receives an input voltage from the generating unit (120) and output voltage is received at the output terminal (134) of the regulator rectifier device (130). At (1302), the first voltage detection unit (150) detects voltage across the output terminal (134) of the regulator rectifier device (130) in battery-less and no-load condition. Due to the short (167) connected between the positive terminal (136) and the negative terminal (138) of the regulator rectifier device (130), the voltage across the bulk capacitor (114) starts dipping and goes below a predefined voltage. As a result, the short circuit detection unit (152) and the control unit (148) get enabled, at (1303). The second voltage detection unit (154) remains disabled, as the battery load is not connected, at (1304). Since the control unit (148) is enabled in this condition, the driver unit (156) will not be able to drive the switching unit (146) in ON state and instead drive it in OFF state, as at (1305), thereby protecting the regulator rectifier device (130) in case of short circuit condition.

FIG. 14a shows a block diagram of an example system (110) depicting a detailed current flow path within the protection device (140) when the short (167) is removed in battery-less and no-load condition. FIG. 14b is a flow diagram illustrating a working of an example system (110) when the voltage at the output terminal (134) of the regulator rectifier device (130) is greater than a predefined voltage in battery-less, no-load and short removed condition. As shown at (1401) in FIG. 14b, the regulator rectifier device (130) receives an input voltage from the generating unit (120) and output voltage is received at the output terminal (134) of the regulator rectifier device (130). The output voltage is detected by the first voltage detection unit (150) in battery-less, no-load and short removed condition, at (1402). Since the voltage in FIG. 14b is greater than the predefined voltage, the short circuit detection unit (152) and the control unit (148) become disabled, at (1403). Further, the second voltage detection unit (154) remains disabled, at (1404). The driver unit (156) drives the switching unit (146) in ON state and the current passes through the switching unit (146) to complete the circuit, as at (1405).

Figure 15A:
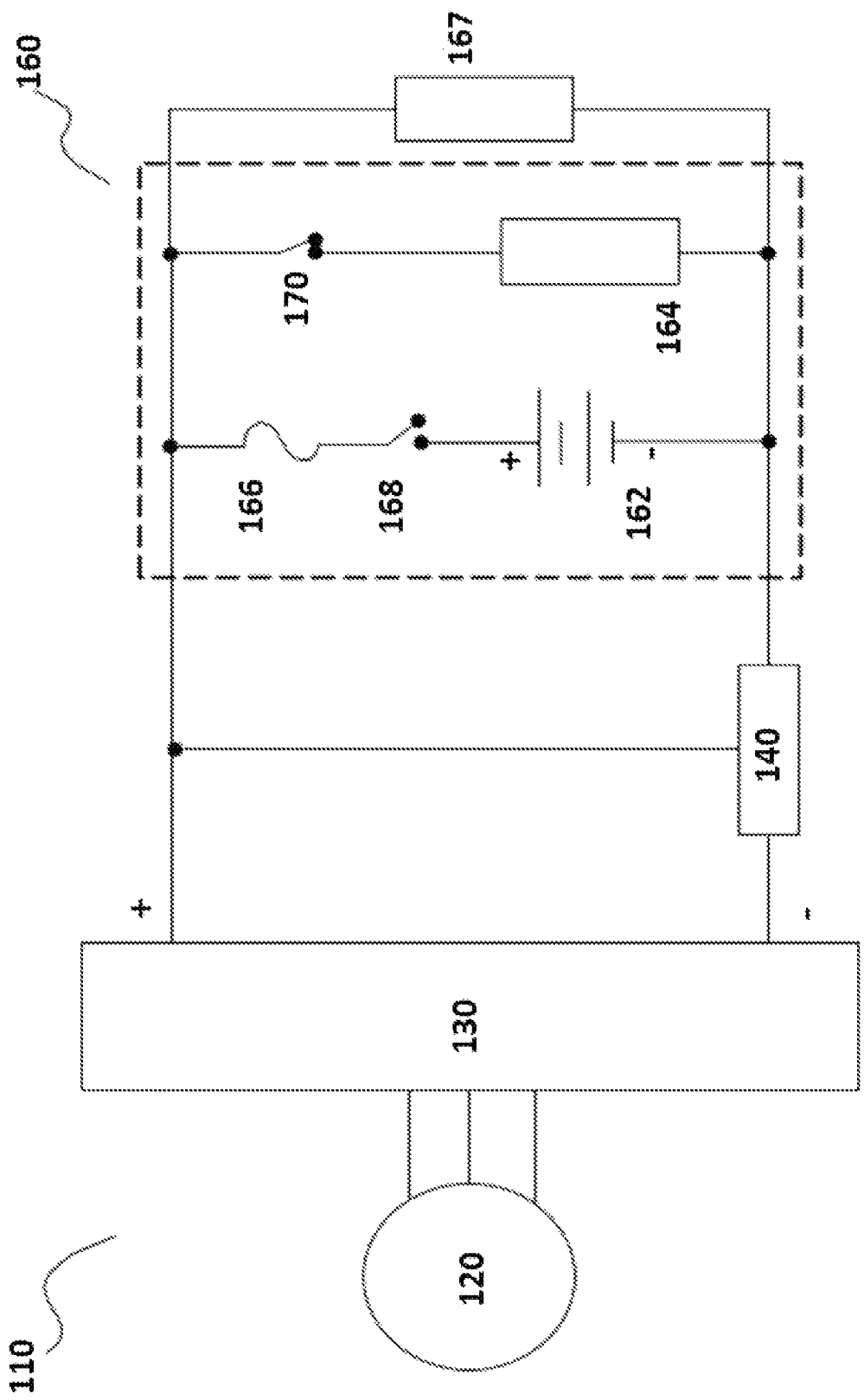
FIG. 15a shows an embodiment of the present invention depicting a block diagram of an example system with load section in condition 5—battery-less and with load in short circuit condition.
Figure 15B:
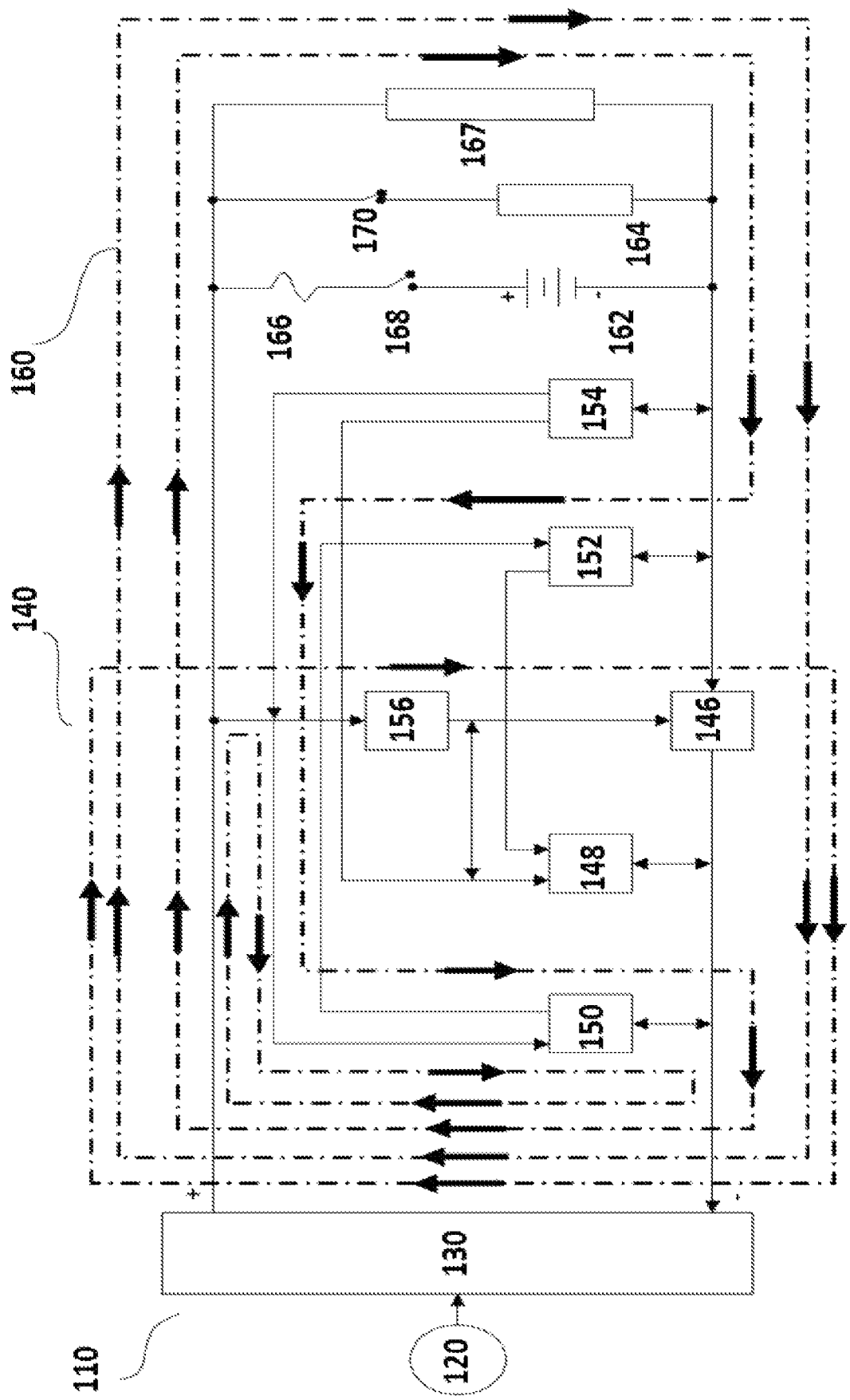
FIG. 15b shows an embodiment of the present invention depicting a block diagram showing a current flow in the protection device and the load section in condition 5—battery-less and with load in short circuit condition at time t0.
Figure 15C:
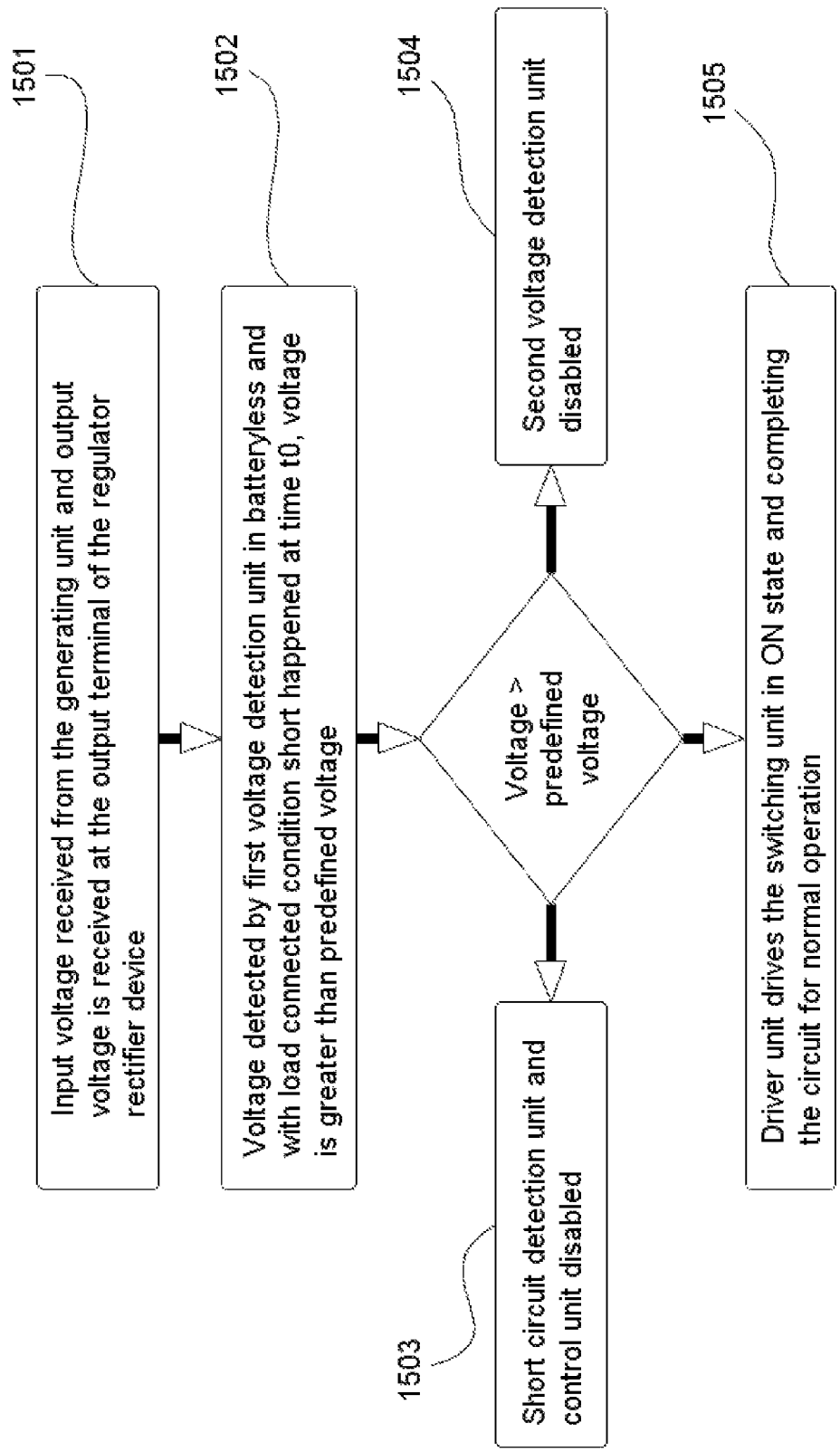
FIG. 15c shows an embodiment of the present invention depicting a flow diagram for a working of an example system in condition 5—battery-less and with load in short circuit condition at time t0.

The short circuit condition also includes another sub-condition, i.e. when the load (164) is connected and the battery load (162) is disconnected i.e. battery-less and with load condition. FIGS. 15a, 15b and 15c show an example system (110) in the short circuit condition when the battery load (162) is disconnected, however, the load (164) and the short (167) are connected. FIG. 15a shows a block diagram of an example system (110) wherein the load (164) is connected to the circuit by the second switch (170) and the battery load (162) is disconnected by the first switch (168) and the short (167) is applied. FIG. 15b shows a block diagram of another example system (110) depicting a detailed current flow within the protection device (140) and the load section (160) when shorted. Since the current travels through least resistive path, the current flows through the short (167) instead of the load (164). FIG. 15c is a flow diagram illustrating a working of an example system (110) when the voltage at the output terminal (134) of the regulator rectifier device (130) is greater than a predefined voltage in battery-less, with load and short condition. As shown in FIG. 15c, the regulator rectifier device (130) outputs voltage at its output terminal (134) when an input voltage is received from the generating unit (120), as at (1501). The first voltage detection unit (150) detects voltage across the output terminal (134) of the regulator rectifier device (130) in battery-less, with load and short condition, as at (1502) at time t=0 when the voltage across output terminal (134) is greater than a predefined voltage. The short circuit detection unit (152) and the control unit (148) remains disabled, as at (1503). The second voltage detection unit (154) also remains disabled due to battery-less condition (1504). The driver unit (156) drives the switching unit (146) in ON state, thereby completing the circuit for normal operation, as at (1505). Since the circuit is shorted, the voltage across the bulk capacitor (114) starts dipping below a predefined voltage.

Figure 16A:
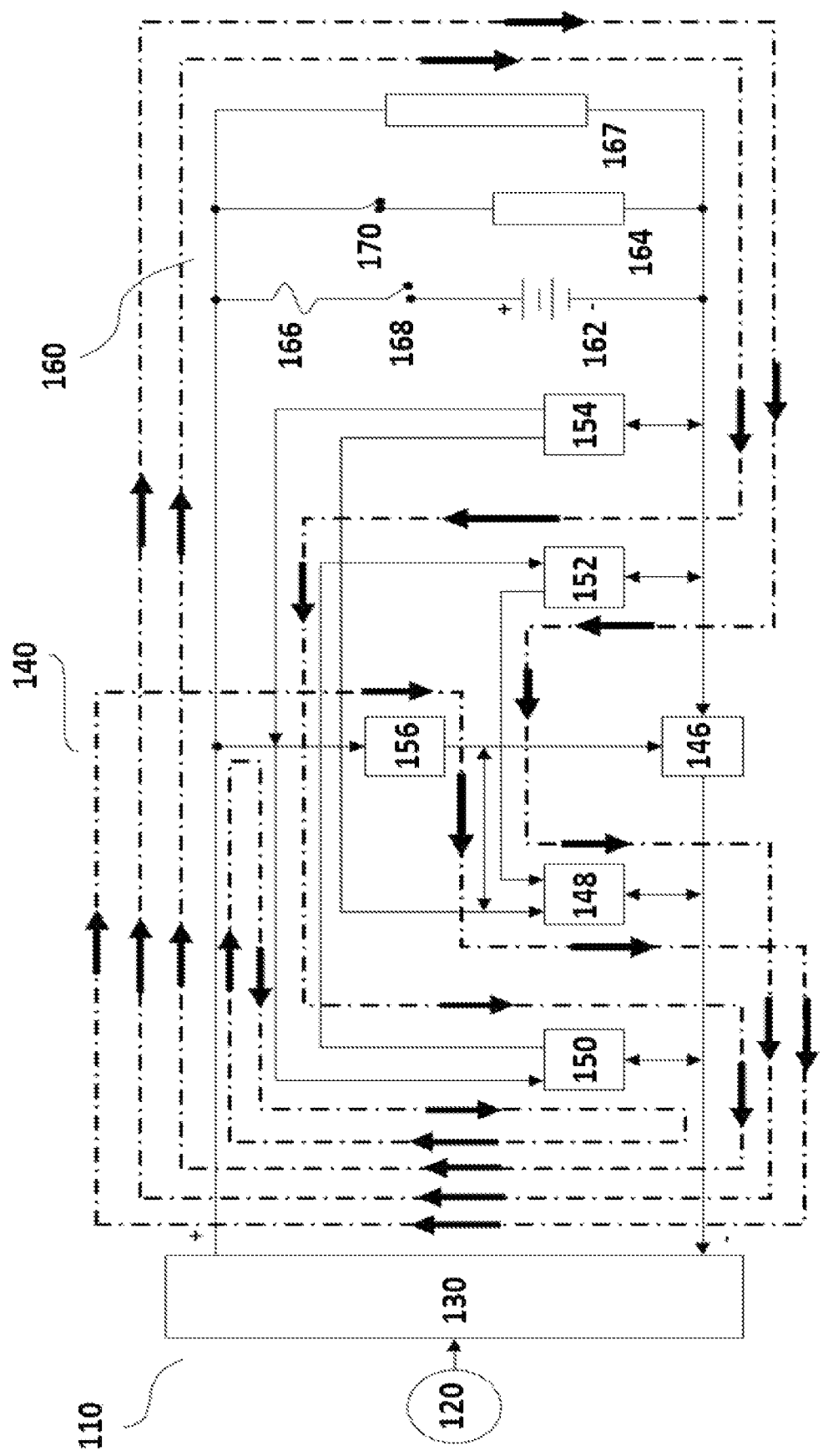
FIG. 16a shows an embodiment of the present invention depicting a block diagram showing a current flow in the protection device and the load section in condition 5—battery-less and with load in short circuit condition at time when voltage goes below predefined voltage.
Figure 16B:
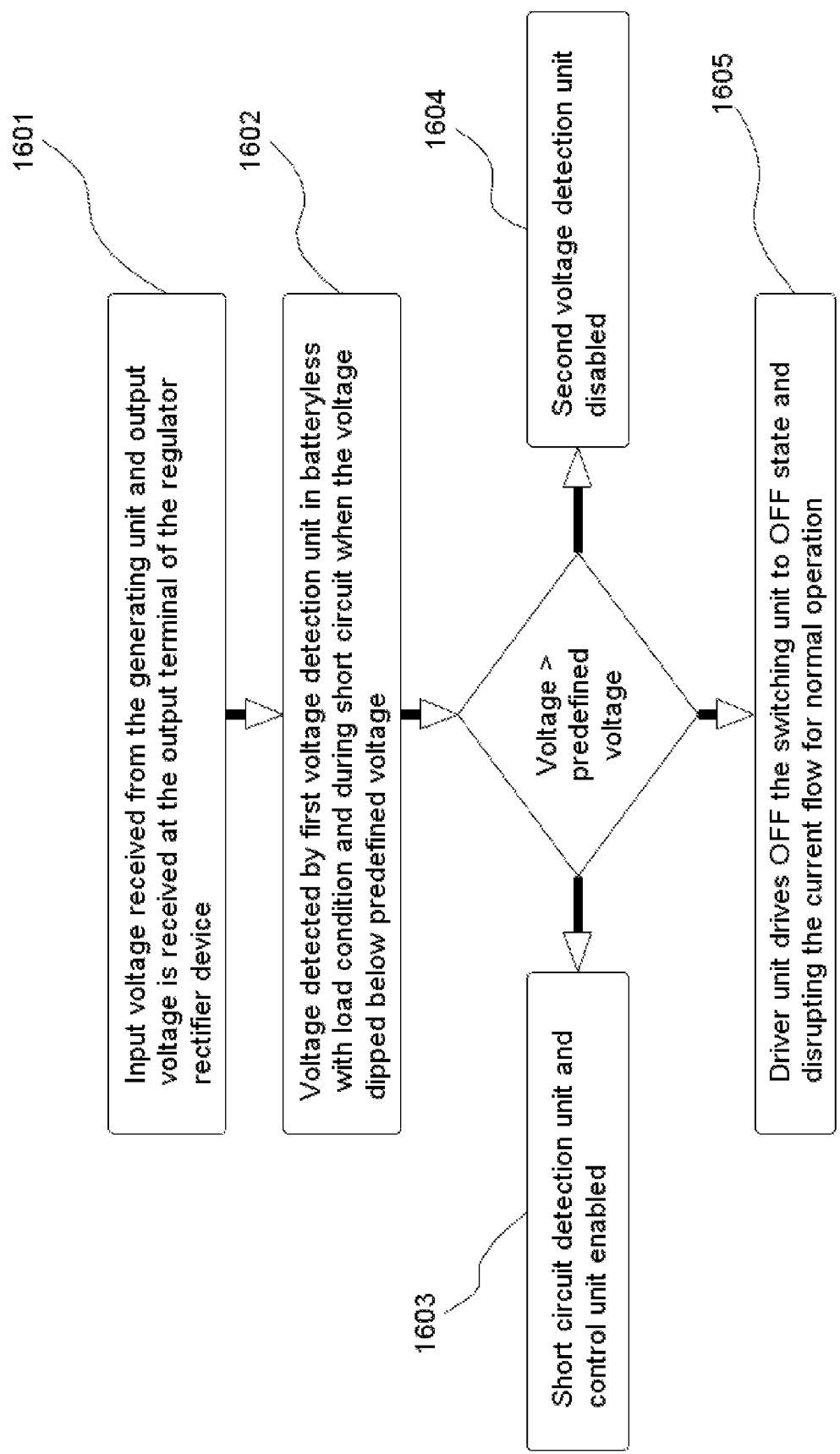
FIG. 16b shows an embodiment of the present invention depicting a flow diagram for a working of an example system in condition 5—battery-less and with load in short circuit condition at time when voltage goes below predefined voltage.
Figure 17A:
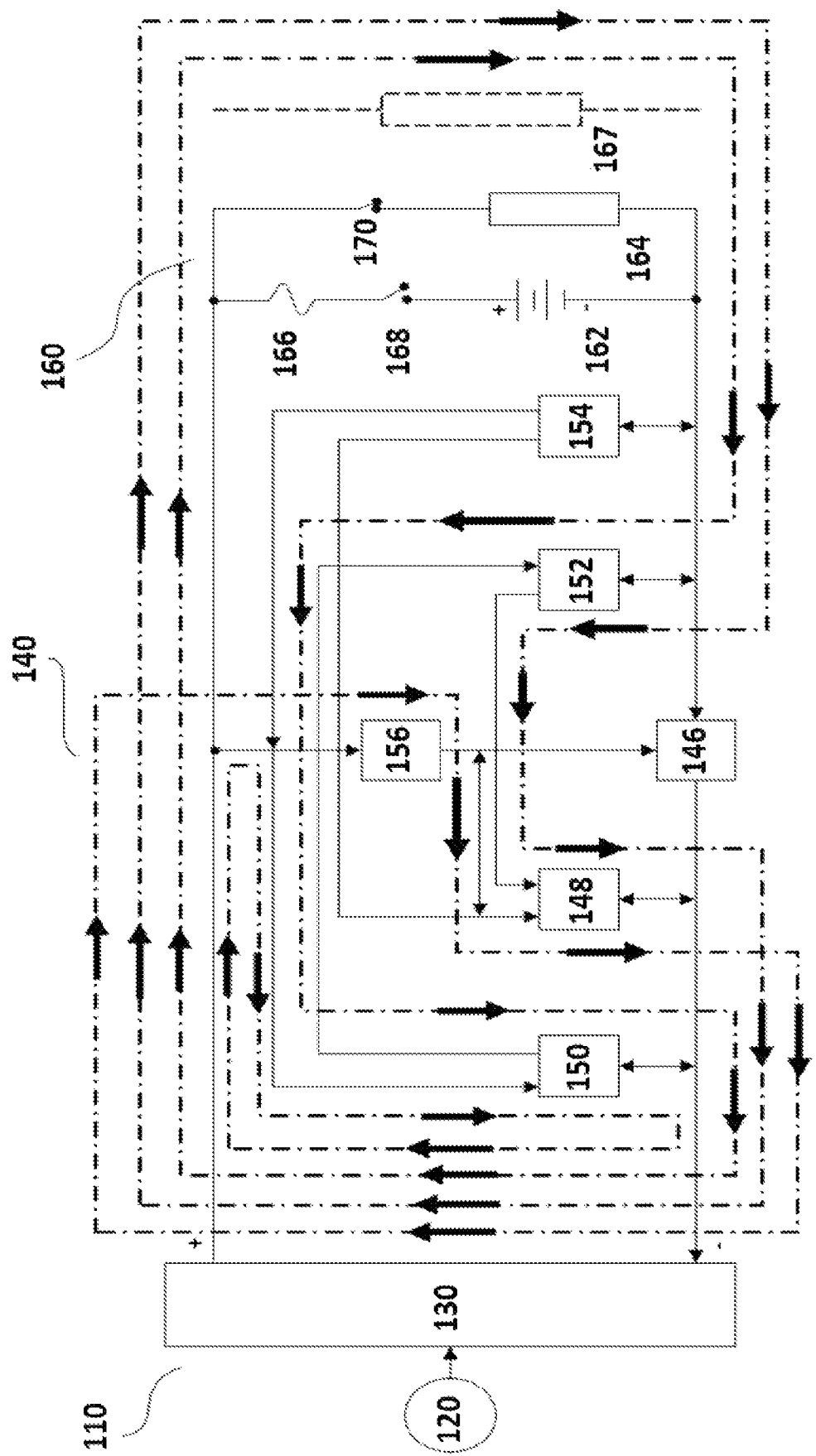
FIG. 17a shows an embodiment of the present invention depicting a block diagram showing a current flow in the protection device and the load section in condition 5—battery-less and with load and short circuit condition is removed but still the switching unit latches.
Figure 17B:
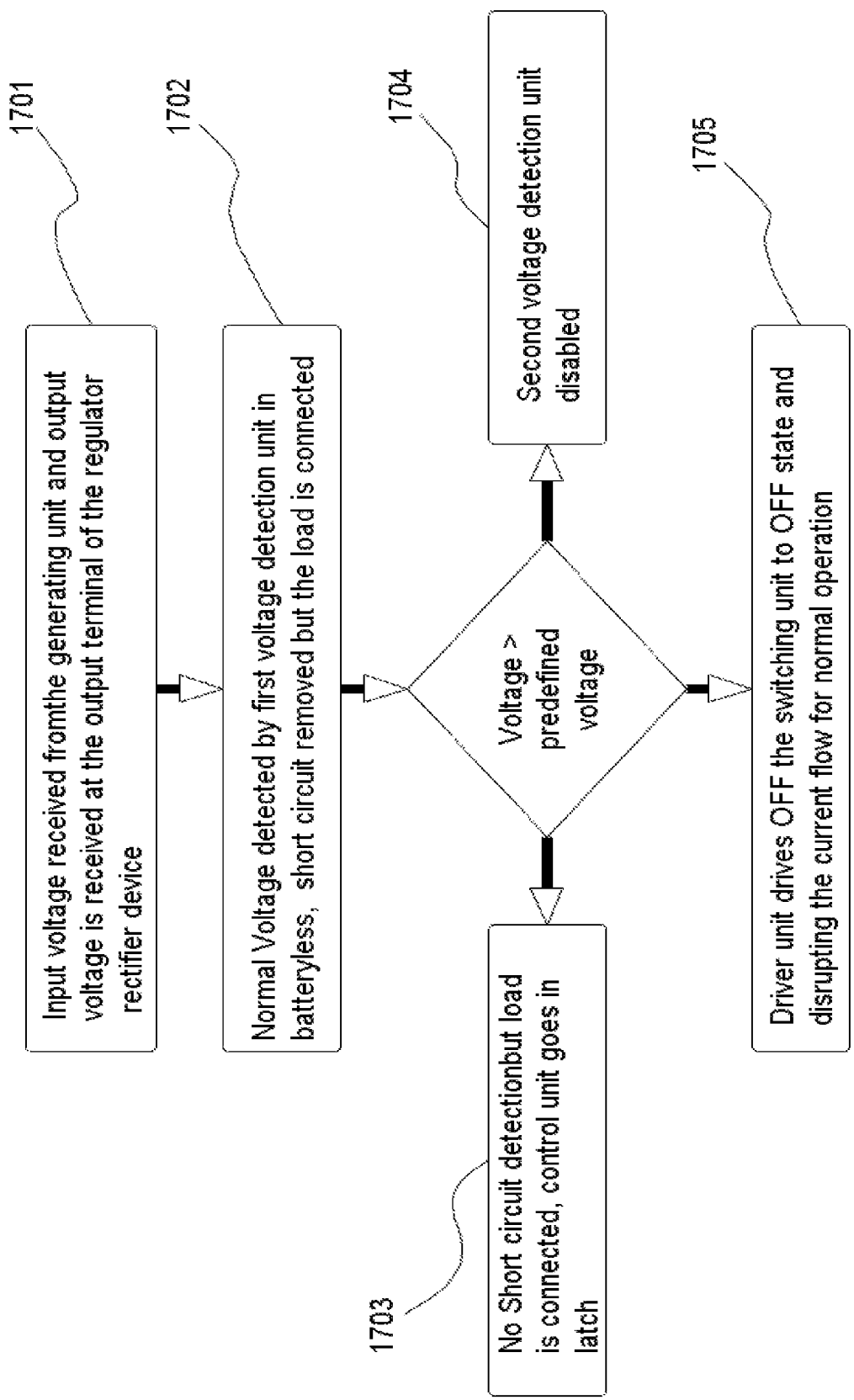
FIG. 17b shows an embodiment of the present invention depicting a flow diagram for a working of an example system in condition 5—battery-less and with load and short circuit condition is removed but still the switching unit latches.

When the voltage starts dipping below a predefined voltage due to short (167), the current path changes, as shown in FIG. 16a. FIG. 16a shows a block diagram of an example system (110) depicting a detailed current flow within the protection device (140) and the load section (160) when shorted in battery-less and with load condition, when the voltage at the output terminal (134) of the regulator rectifier device (130) is less than a predefined voltage. FIG. 16b is a flow diagram illustrating a working of an example system (110) in short circuit, battery-less and with load condition, when the voltage at the output terminal (134) of the regulator rectifier device (130) is less than a predefined voltage. As at (1601), the output voltage at the output terminal (134) of the regulator rectifier device (130) is received (1601). Due to the short (167) connected between the positive terminal (136) and the negative terminal (138) of the regulator rectifier device (130), the voltage across the bulk capacitor (114) starts dipping and goes below a predefined voltage. The dipping voltage is detected by the first voltage detection unit (150) in load and battery-less condition, at (1602), in the presence of short (167). Once the voltage drops below the predefined voltage, the short circuit detection unit (152) and the control unit (148) get enabled, at (1603). Since the battery load (162) is not connected, the second voltage detection unit (154) remains disabled, at (1604). The driver unit (156) drives the switching unit in OFF state as controlled by the control unit (148) as shown in FIG. 16b at (1605). This will protect the regulator rectifier device (130) from being damaged. Now, once the short (167) is removed as shown in FIGS. 17a and 17b, the current path will remain the same and the switching unit (146) continues its operation in OFF state. FIG. 17a shows a block diagram of an example system (110) depicting a detailed current flow path within the protection device (140) and load section (160) when the short (167) is removed in battery-less and with load condition.

FIG. 17b is a flow diagram illustrating a working of an example system (110) when the voltage at the output terminal (134) of the regulator rectifier device (130) is greater than a predefined voltage in battery-less, with load and short removed condition. As shown in FIG. 17b, the output voltage will be received at bulk capacitor (114) i.e. at the output terminal (134) of the regulator rectifier device (130) once the short (167) is removed, as at (1701). The first voltage detection unit (150) will detect the voltage at the output terminal (134) at battery-less, with load and short removed condition, as at (1702). If the voltage detected by the first voltage detection unit (150) is greater than a predefined voltage in this condition, the control unit (148) goes in latch, as at (1703) even in the absence of the short (167). Further, due to battery-less condition, the second voltage detection unit (154) remains disabled, as at (1704). Due to the latching by the control unit (148), the driver unit (156) will not drive the switching unit (146) in ON state, instead it will continue to drive the switching unit (146) in OFF state as controlled by the control unit (148), thereby disrupting the current flow for normal operation, as at (1705). In order to initiate the normal operation of the circuit, the circuit is refreshed and the control unit (148) is de-latched. This can be achieved by switching OFF the power supply for some time and then switching ON the power supply, for example, generating unit (120) in this case.

Figure 18A:
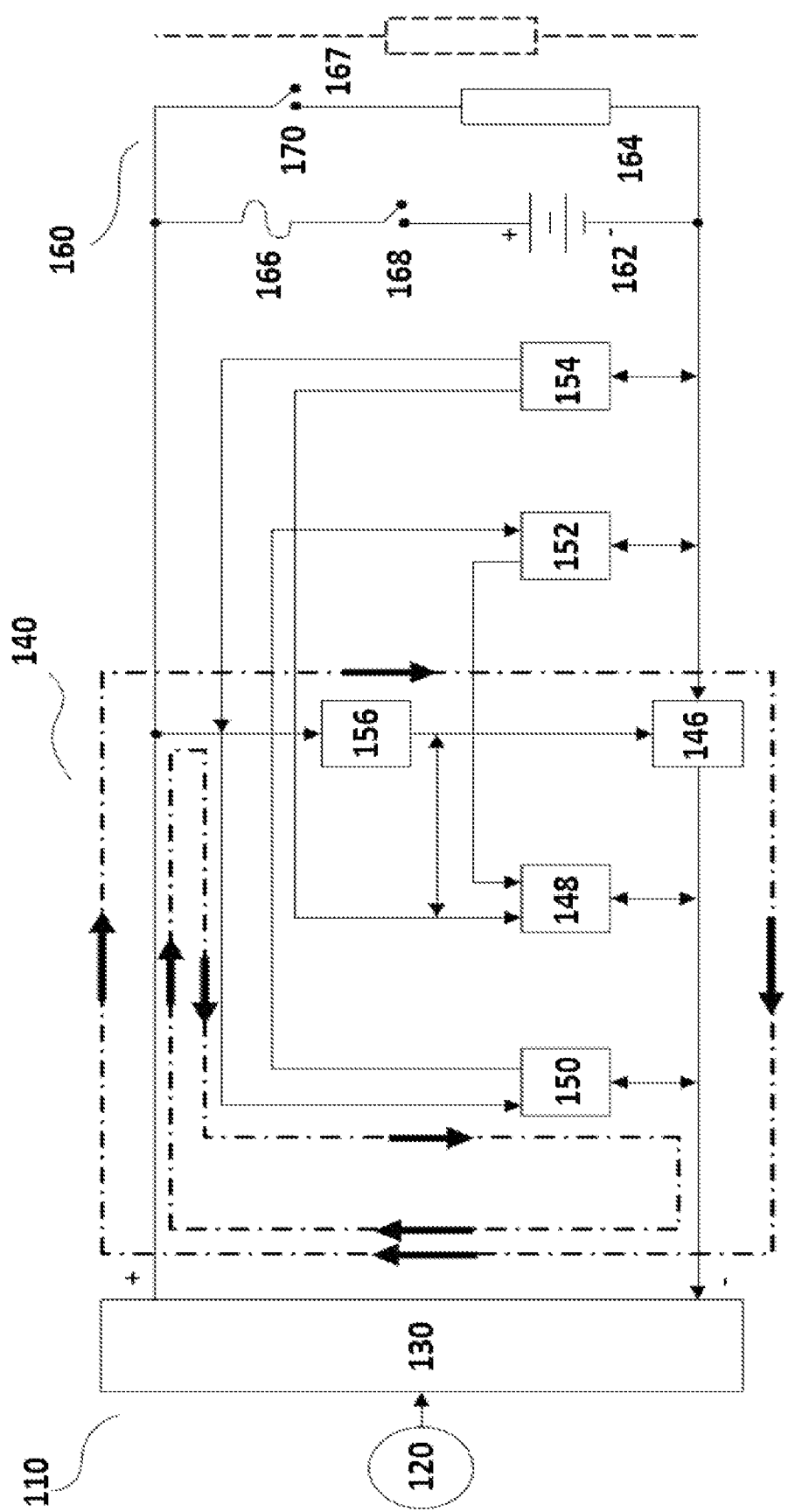
FIG. 18a shows an embodiment of the present invention depicting a block diagram showing a current flow in the protection device and the load section in condition 5—battery-less and short circuit condition is removed and the load is disconnected to disable the latch i.e. to enable the switching unit.
Figure 18B:
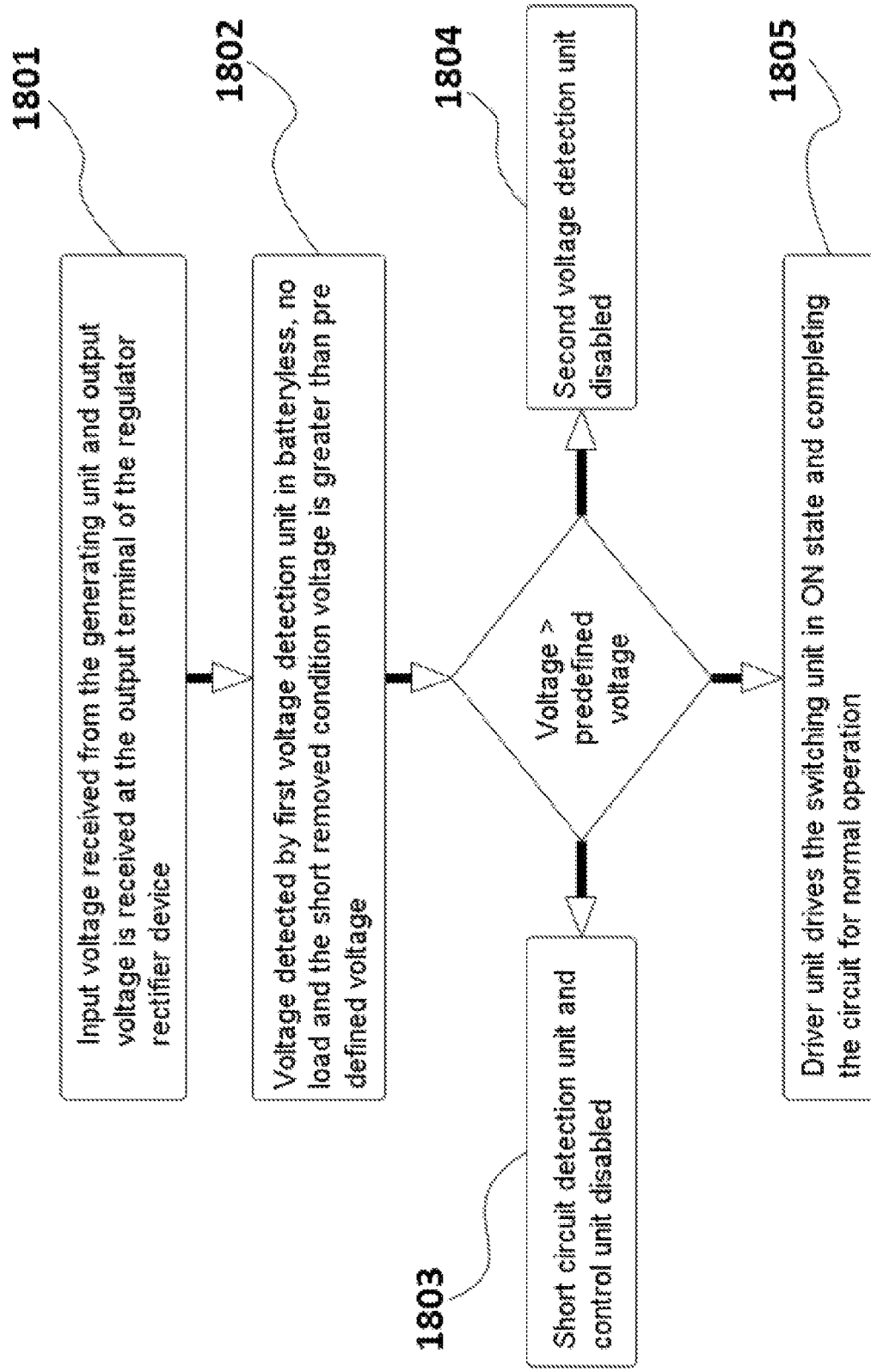
FIG. 18b shows an embodiment of the present invention depicting a flow diagram for a working of an example system in condition 5—battery-less and short circuit condition is removed and the load is disconnected to disable the latch i.e. to enable the switching unit.

FIG. 18a shows a block diagram of an example system (110) depicting a detailed current flow path in the protection device (140) after the de-latch. The driver unit (156) drives the switching unit (146) in ON state and the current flows through the driver unit (156) and the switching unit (146) for completing the circuit, as the load (164) is disconnected due to de-latching. FIG. 18b is a flow diagram illustrating a working of an example system (110) when the voltage at the output terminal (134) of the regulator rectifier device (130) is greater than a predefined voltage in battery-less, no-load and short removed condition, after the circuit is refreshed and de-latched. As shown in FIG. 18b, once the circuit is refreshed, the output voltage across output terminal (134) is received at the bulk capacitor (114), as at (1801). The first voltage detection unit (150) detects that the voltage is greater than the predefined voltage in battery-less and no-load condition (1802). The short circuit detection unit (152) remains disable and the control unit (148) gets disabled (1803). The second voltage detection unit (154) also remains disabled (1804). The driver unit (156) drives the switching unit (146) in ON state (1805) for normal functioning of the circuit.

Figure 19A:
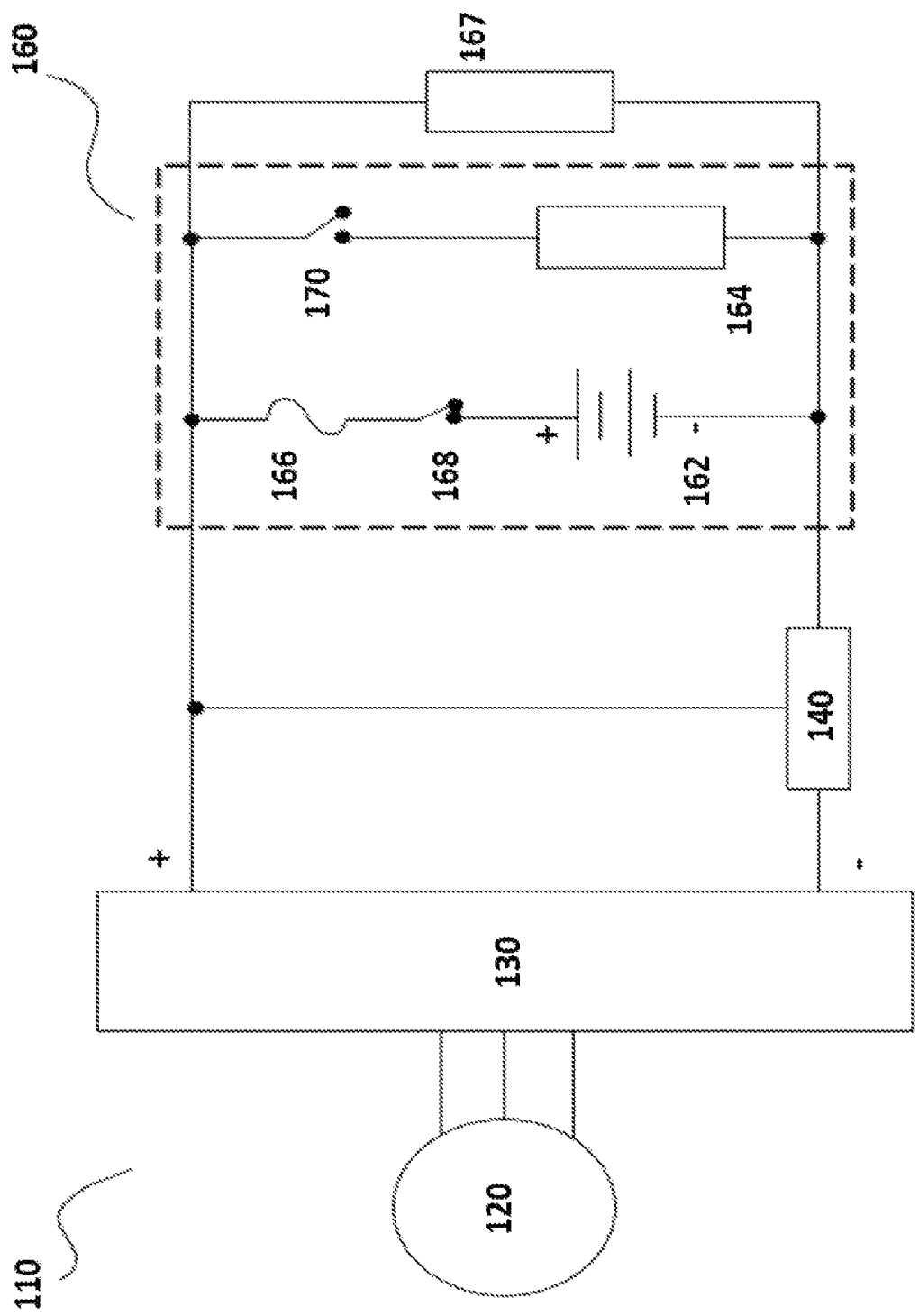
FIG. 19a shows an embodiment of the present invention depicting a block diagram showing a current flow in the protection device and the load section in condition 5—with battery (battery connected) and no-load in short circuit condition.
Figure 19B:
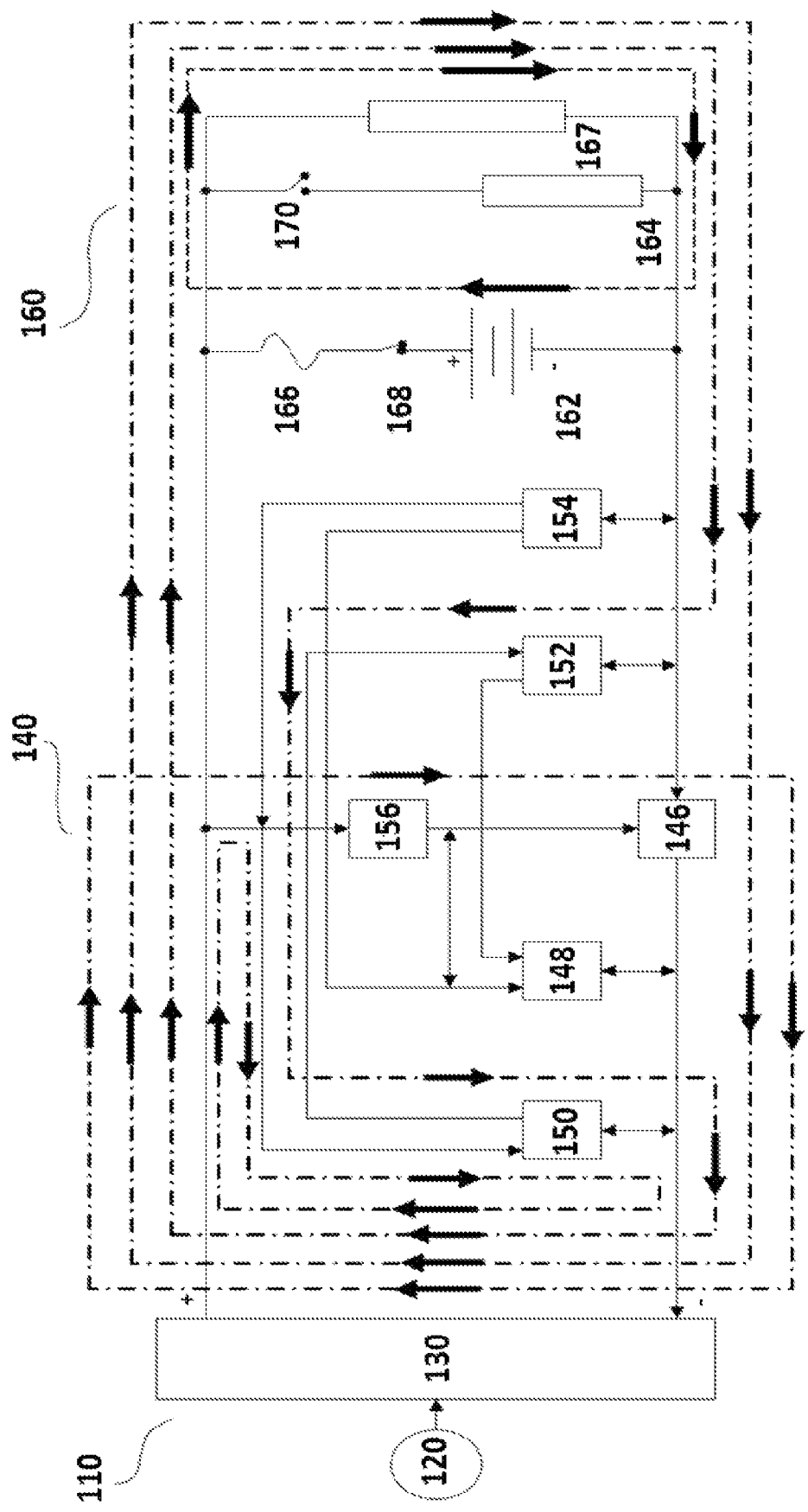
FIG. 19b shows an embodiment of the present invention depicting a block diagram showing a current flow in the protection device and in the load section in condition 5—with battery (battery connected) and no-load in short circuit condition at time t0 wherein fuse is about to blow and voltage is still greater than a predefined voltage.
Figure 19C:
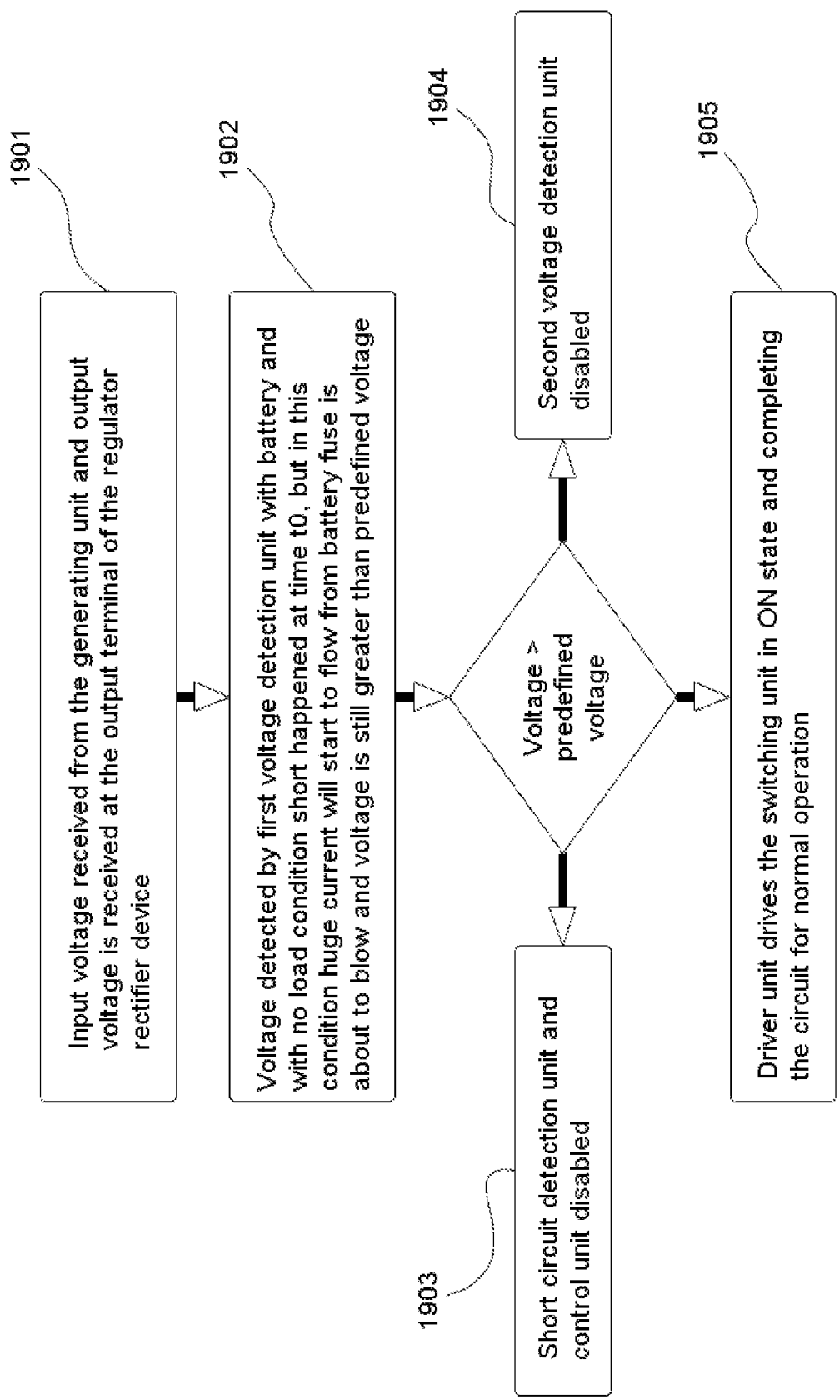
FIG. 19c shows an embodiment of the present invention depicting a flow diagram for a working of an example system in condition 5—with battery (battery connected) and no-load in short circuit condition at time t=0 wherein fuse is about to blow and voltage is still greater a predefined voltage.

Another sub condition under the short circuit condition is when load (164) is not connected and battery load (162) is connected in the load section (160) along with the short (167). FIGS. 19a, 19b and 19c show an example system (110) in the short circuit condition when the load (164) is not connected, however, the battery load (162) and the short (167) are connected. As shown in FIG. 19a, the battery load (162) is connected by the first switch (168) along with the fuse (166). The load (164) is disconnected by the second switch (170). FIG. 19b shows a block diagram of another example system (110) depicting a detailed current flow within the protection device (140) and the load section (160) when shorted. FIG. 19b shows the current flow path in battery connected condition with the short (167). The short (167) being the least resistive path draws highest current. The current from the regulator rectifier device (130) and from the battery load (162) flows through the short (167). FIG. 19c is a flow diagram illustrating a working of an example system (110) in condition 5—short circuit condition, at time t=0, when the voltage at the output terminal (134) of the regulator rectifier device (130) is greater than a predefined voltage. The output voltage across the output terminal (134) of the regulator rectifier device (130) is received based on the input received from the generating unit (120), as at (1901). The first voltage detection unit (150) detects the voltage across the output terminal (134) in battery condition with short (167) at time t=0, as at (1902). Due to least resistance across short (167), a huge current will start flowing through the short (167) and the fuse (166). At the same time, if the voltage is greater than a predefined voltage, the short circuit detection unit (152) and control unit (148) remain disabled, as at (1903). The second voltage detection unit (154) also remains disabled, as at (1904). The driver unit (156) drives the switching unit (146) in ON state to complete the circuit for normal operation.

Figure 20A:
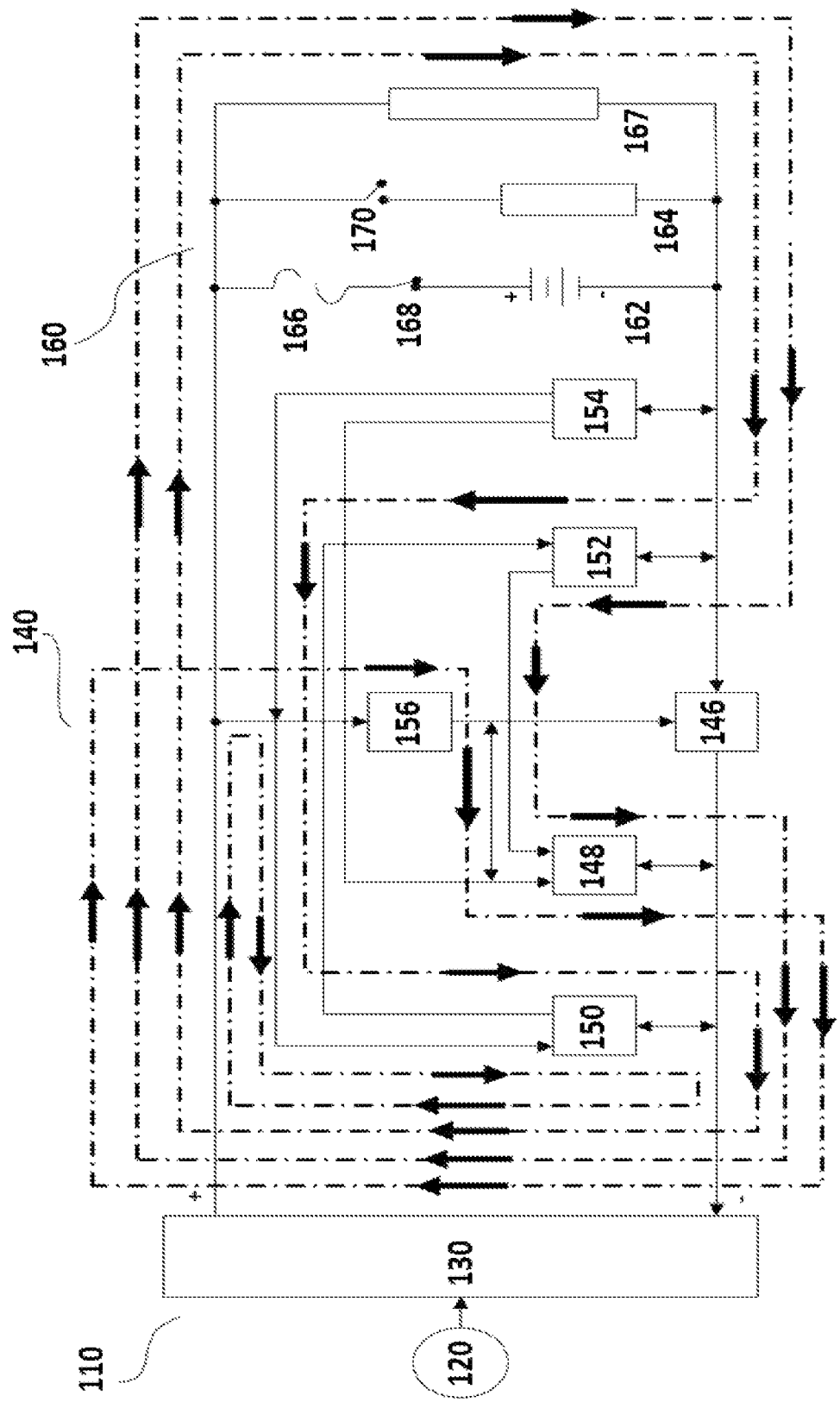
FIG. 20a shows an embodiment of the present invention depicting a block diagram showing a current flow in the protection device and the load section in condition 5—with fuse blown condition i.e. battery-less condition and no-load in short circuit condition at time when voltage goes below a predefined voltage.
Figure 20B:
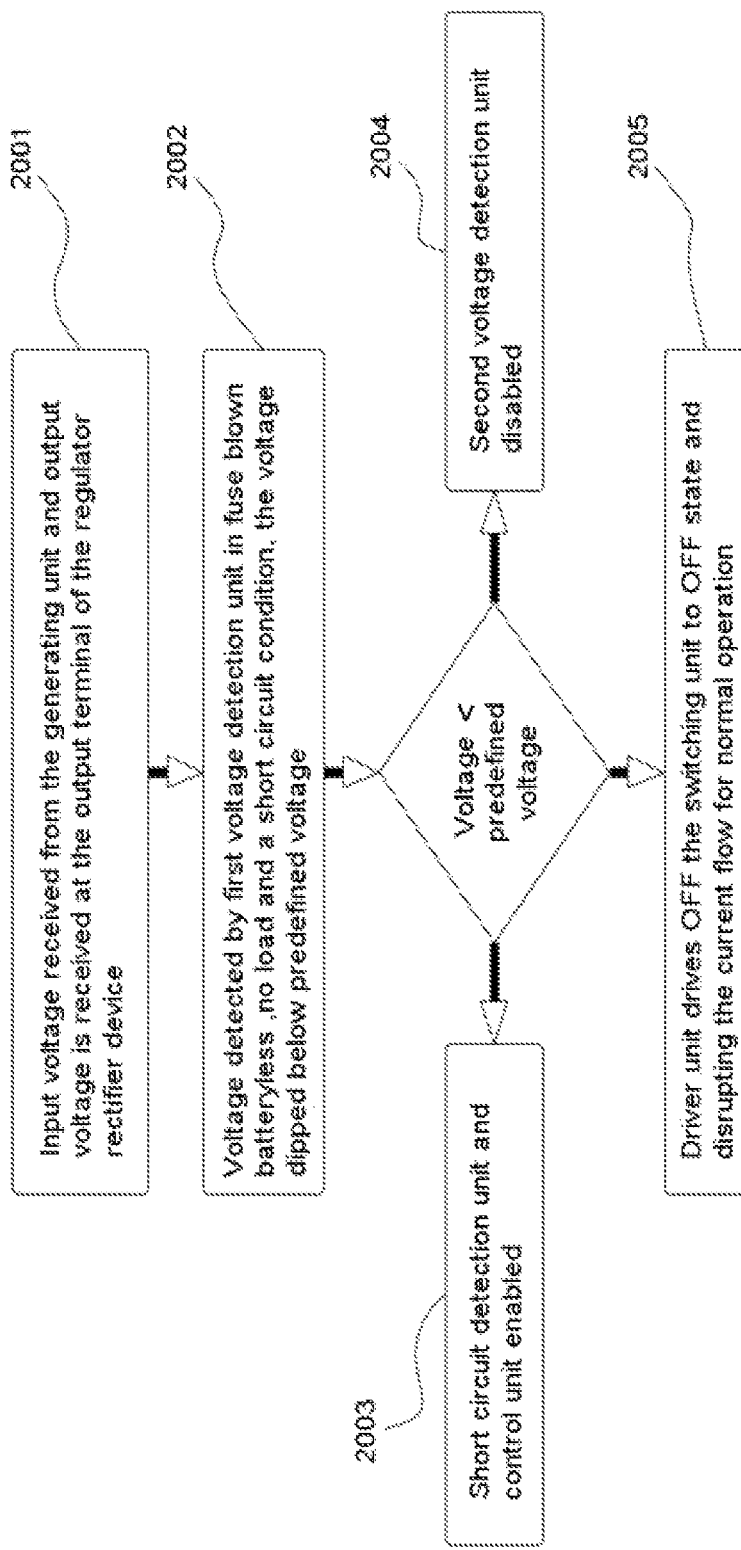
FIG. 20b shows an embodiment of the present invention depicting a flow diagram for a working of an example system in condition 5—with fuse blown condition i.e. battery-less and no-load in short circuit condition at time when voltage goes below a predefined voltage.
Figure 21A:
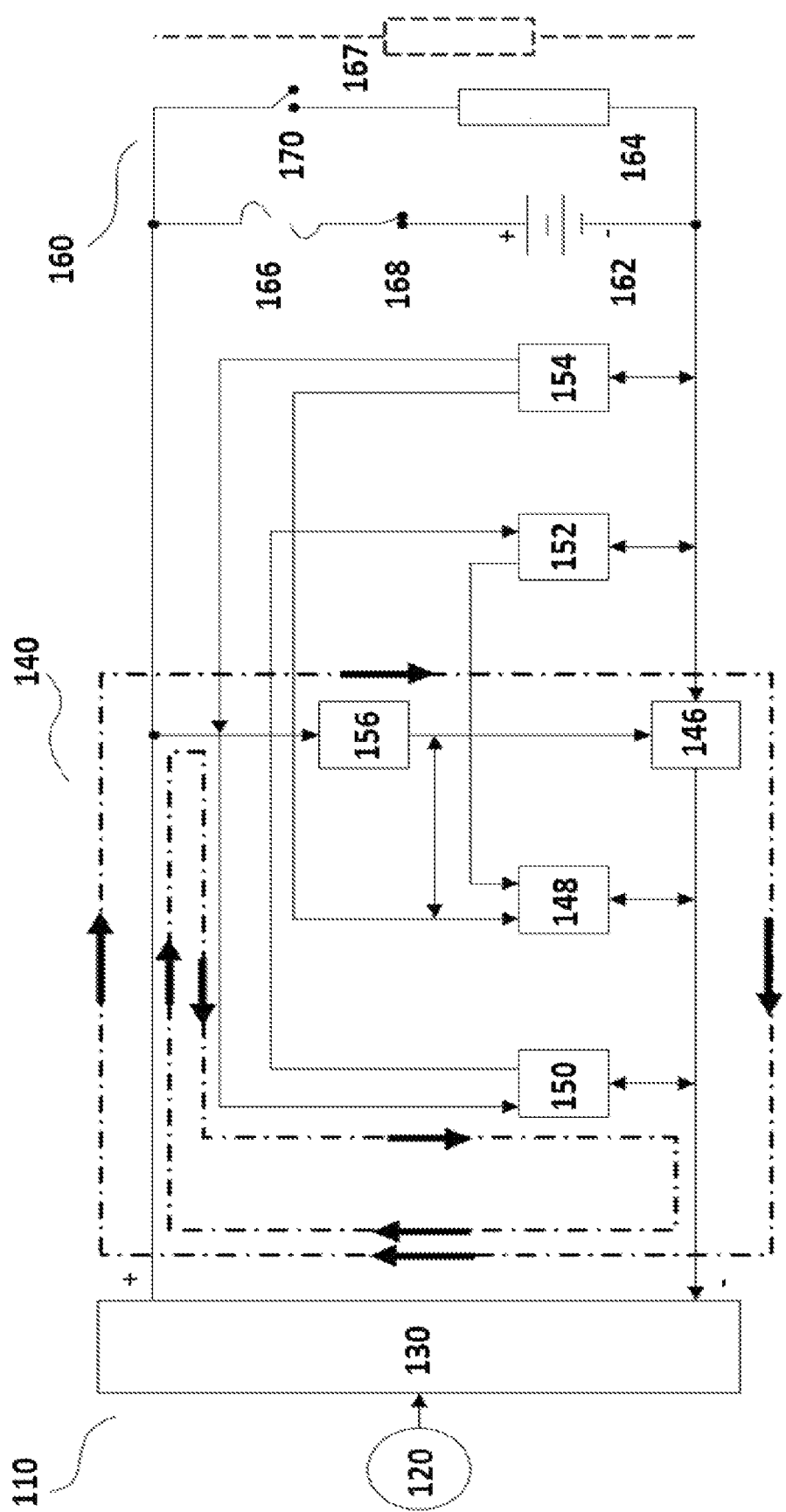
FIG. 21a shows an embodiment of the present invention depicting a block diagram showing a current flow in the protection device and the load section in condition 5—with fuse blown condition as battery-less, no-load and the short circuit condition is removed.
Figure 21B:
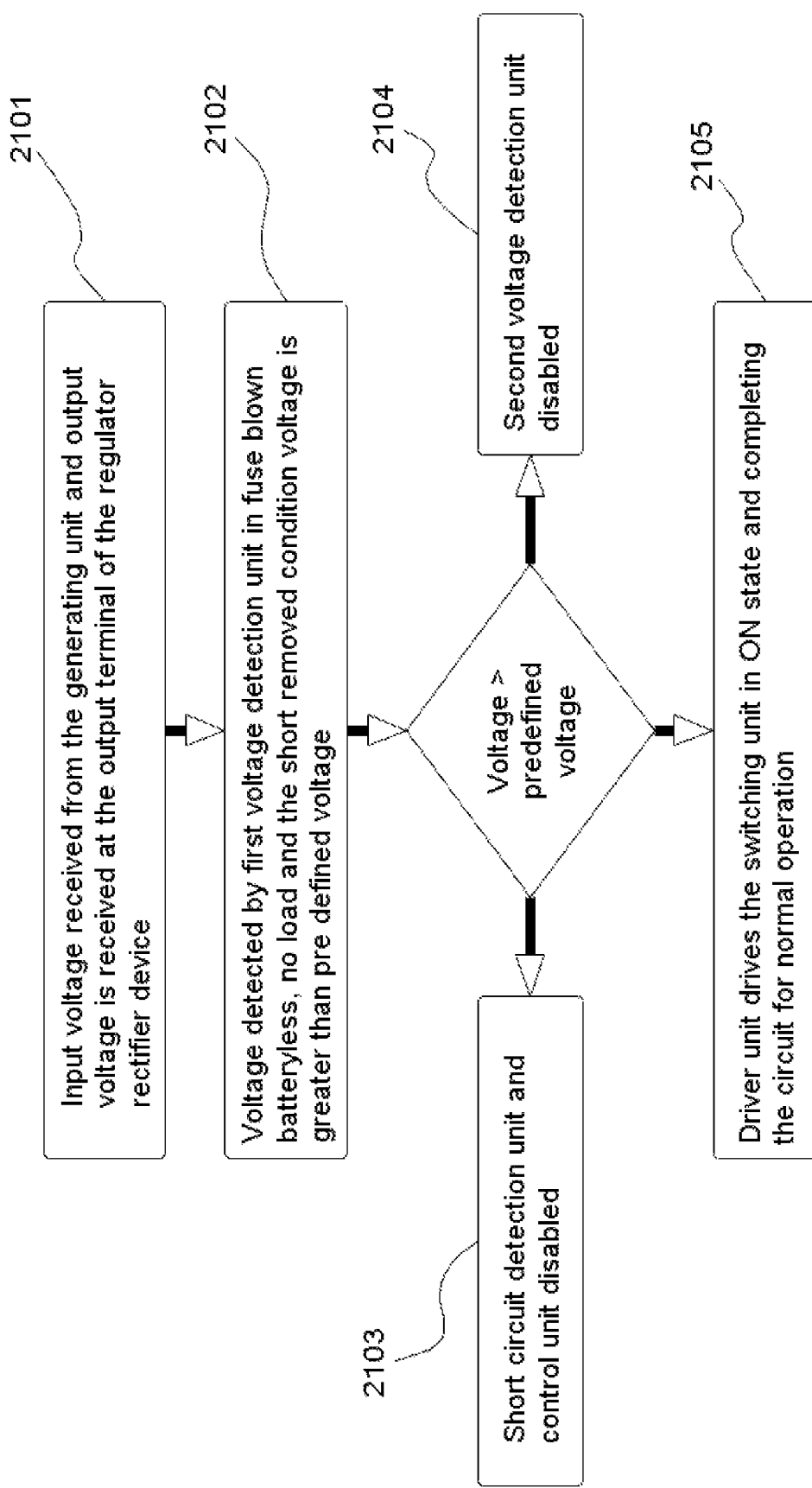
FIG. 21b shows an embodiment of the present invention depicting a flow diagram for a working of an example system in condition 5—with fuse blown condition as battery-less, no-load and the short circuit condition is removed.

Now, when the huge current flows through the fuse (166), the fuse (166) blows, thereby disconnecting the battery load (162) from the circuit, as shown in FIG. 20a. FIG. 20a shows a block diagram of an example system (110) depicting a detailed current flow within the protection device (140) and the load section (160) in short circuit condition when the fuse (166) blows. However, the current keeps on increasing due to the short (167). Further, with the increase in the current, the voltage across the bulk capacitor (114) starts decreasing. FIG. 20b is a flow diagram of a working of an example system (110) in case of short circuit with battery load (162) when the voltage is dipped below a predefined voltage. Since the fuse (166) is already blown, the circuit will act as a battery-less circuit and the output voltage will be received at the output terminal (134) due to bulk capacitor (114), as at (2001). Due to increase in current, the voltage across the output terminal (134) starts dipping below the predefined voltage, which will be detected by the first voltage detection unit (150) in short condition and the fuse blown case, at (2002). Since the voltage is lower than the predefined voltage, the short circuit detection unit (152) and the control unit (148) are enabled, at (2003). The second voltage detection unit (154) remains disabled, at (2004). The driver unit (156) starts driving the switching unit (146) from ON state to OFF state by the control unit (148), at (2005). This will break the normal operation of the regulator rectifier device (130) and protects it. Now, when the short (167) is removed, the driver unit (156) starts driving the switching unit (146) in ON state in battery-less condition, as shown in FIG. 21a. FIG. 21a shows another block diagram of an example system (110) depicting a detailed current flow path within the protection device (140) and load section (160) when the short (167) is removed in battery-less and no-load condition. FIG. 21b is a flow diagram illustrating a working of an example system (110) when the voltage at the output terminal (134) of the regulator rectifier device (130) is greater than a predefined voltage and the short (167) has been removed in a battery-less and no-load condition. When the short (167) is removed, the output voltage will be received at the output terminal (134) due to bulk capacitor (114), as at (2101), since the battery load (162) is now disconnected due to the blown fuse (166) in the circuit. The first voltage detection unit (150) detects the voltage at the output terminal (134) in fuse blown battery-less, no-load and short removed condition, at (2102). The voltage being greater than the predefined voltage, the short circuit detection unit (152) and the control unit (148) get disabled, at (2103). The second voltage detection unit (154) remains disabled, at (2104). The driver unit (156) drives the switching unit (146) in ON state and completing the circuit for normal operation.

Figure 22A:
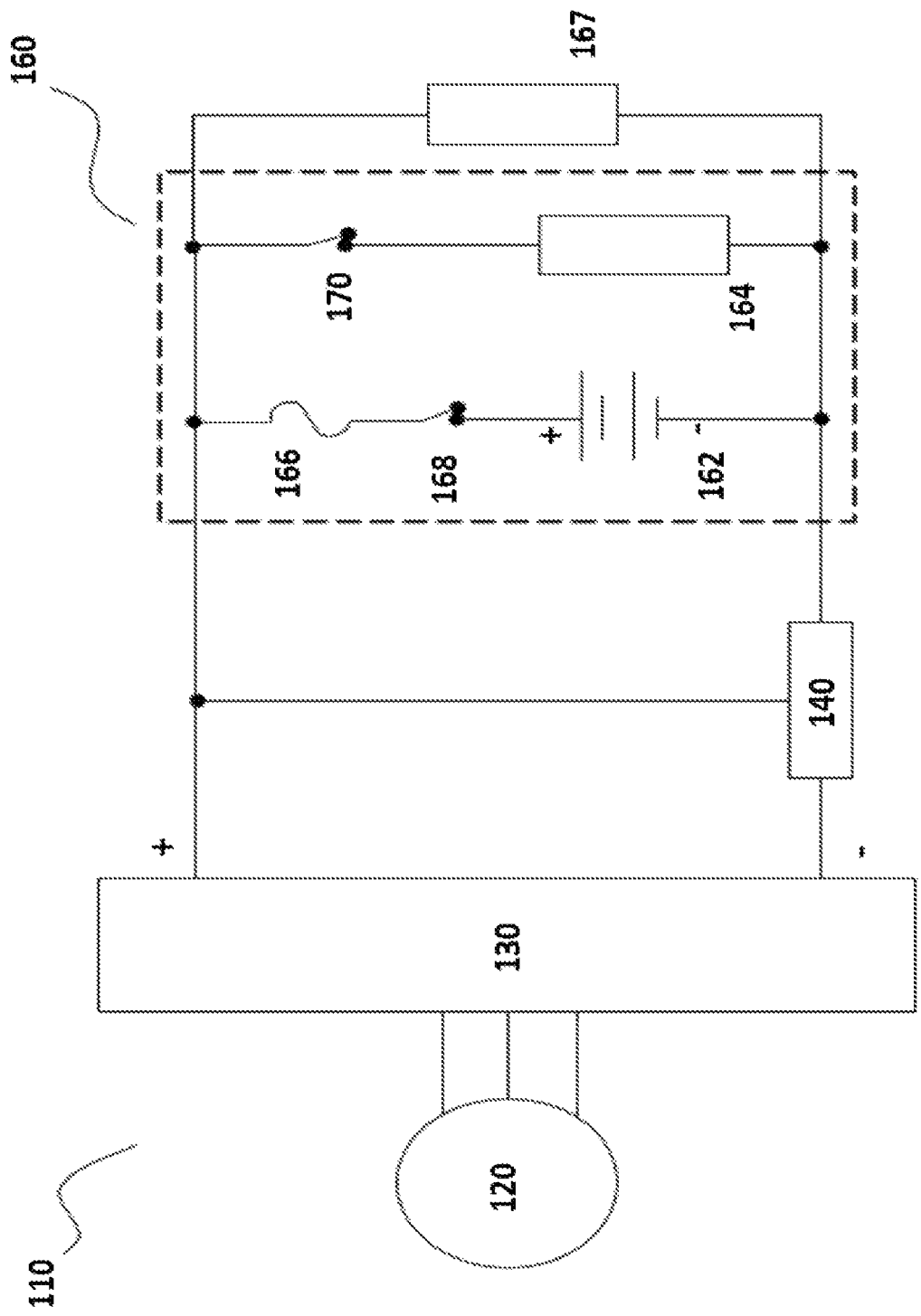
FIG. 22a shows an embodiment of the present invention depicting a block diagram showing a current flow in the protection device and the load section in condition 5—with battery (battery connected) and with load in short circuit condition.
Figure 22B:
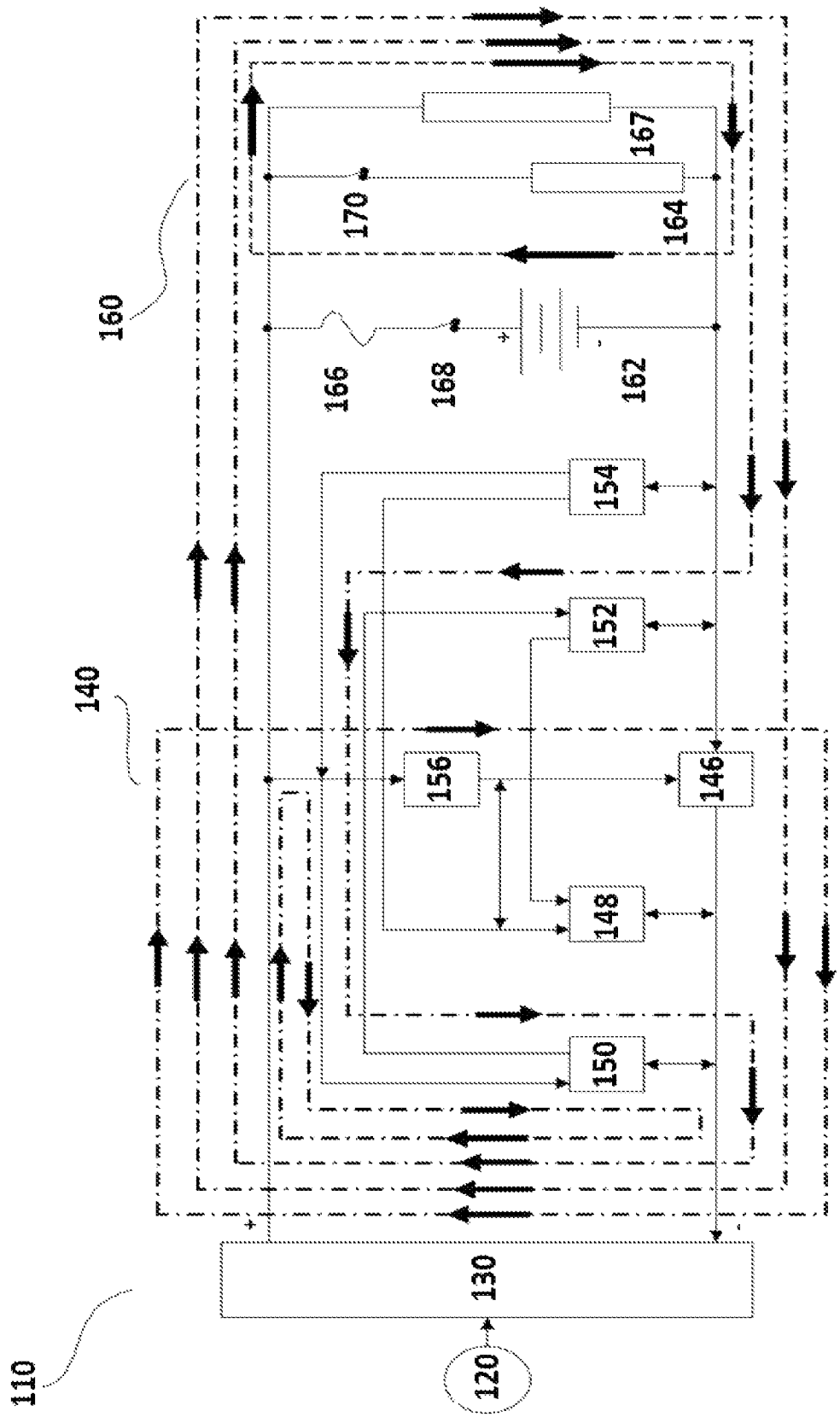
FIG. 22b shows an embodiment of the present invention depicting a block diagram showing a current flow in the protection device and in load section in condition 5—with battery (battery connected) and with load in short circuit condition at time t0 wherein fuse is about to blow and voltage still greater than a predefined voltage.
Figure 22C:
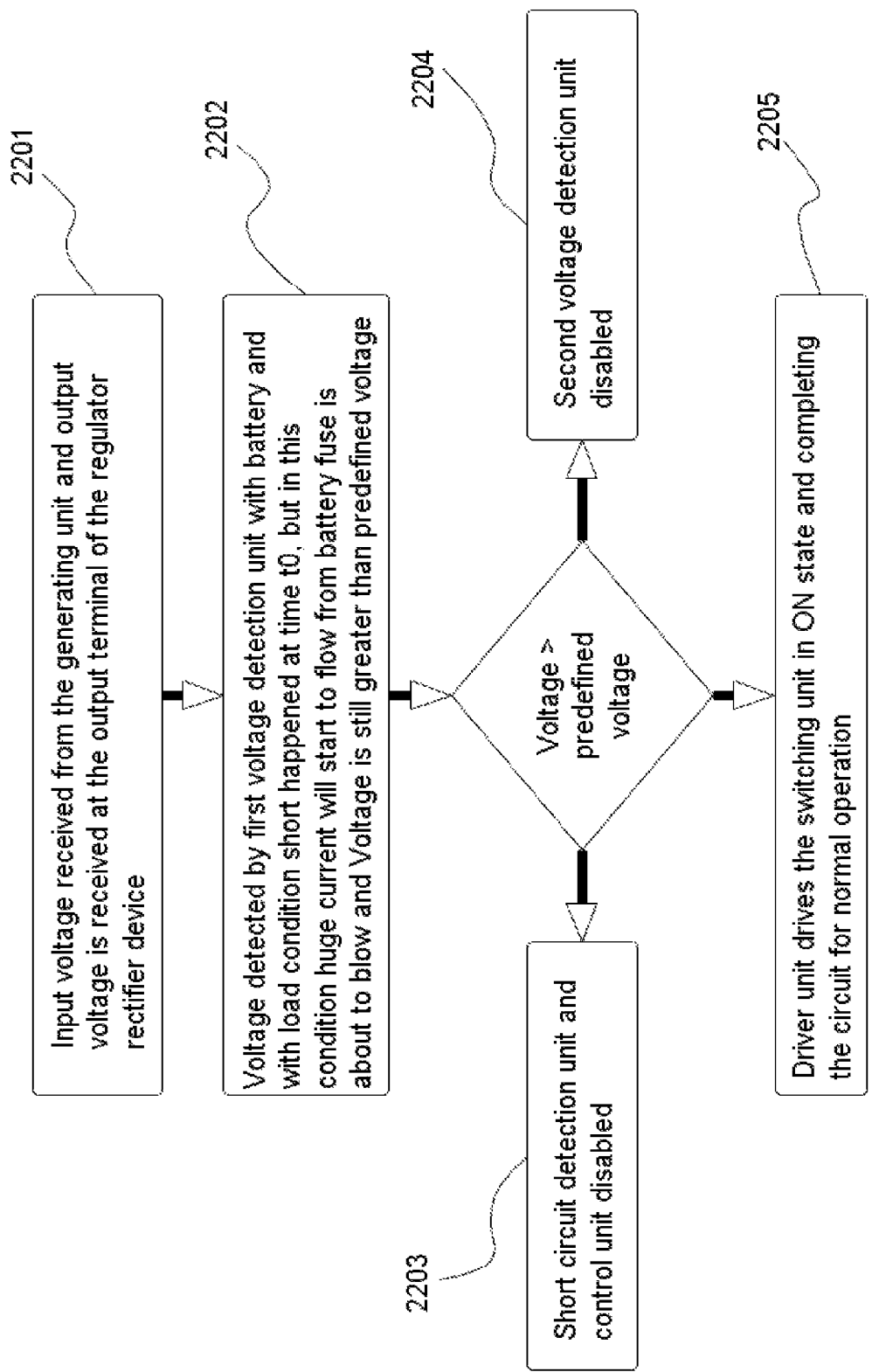
FIG. 22c shows an embodiment of the present invention depicting a flow diagram for a working of an example system in condition 5—with battery (battery connected) and with load in short circuit condition at time t0 wherein fuse is about to blow and voltage still greater than a predefined voltage.

The short circuit condition also includes another sub condition of with battery and with load. FIGS. 22a, 22b and 22c shown an example system (110) in the short circuit condition when the battery load (162), the load (164) and the short (167) are connected. FIG. 22a shows a block diagram of an example system (110) wherein load section (160) including battery load (162) is connected with the circuit by a first switch (168) along with the fuse (166). The load (164) is also connected with the circuit by the second switch (170). The circuit is also connected with the short (167), which provides a least resistive path for the current flow.

FIG. 22b shows a block diagram of another example system (110) depicting a detailed current flow within the protection device (140) and the load section (160) when shorted. The current flow path as shown in FIG. 22b is completed through the short (167) for both the currents i.e. flowing from battery load (162) as well as from the regulator rectifier device (130) at time t=0.

Figure 23B:
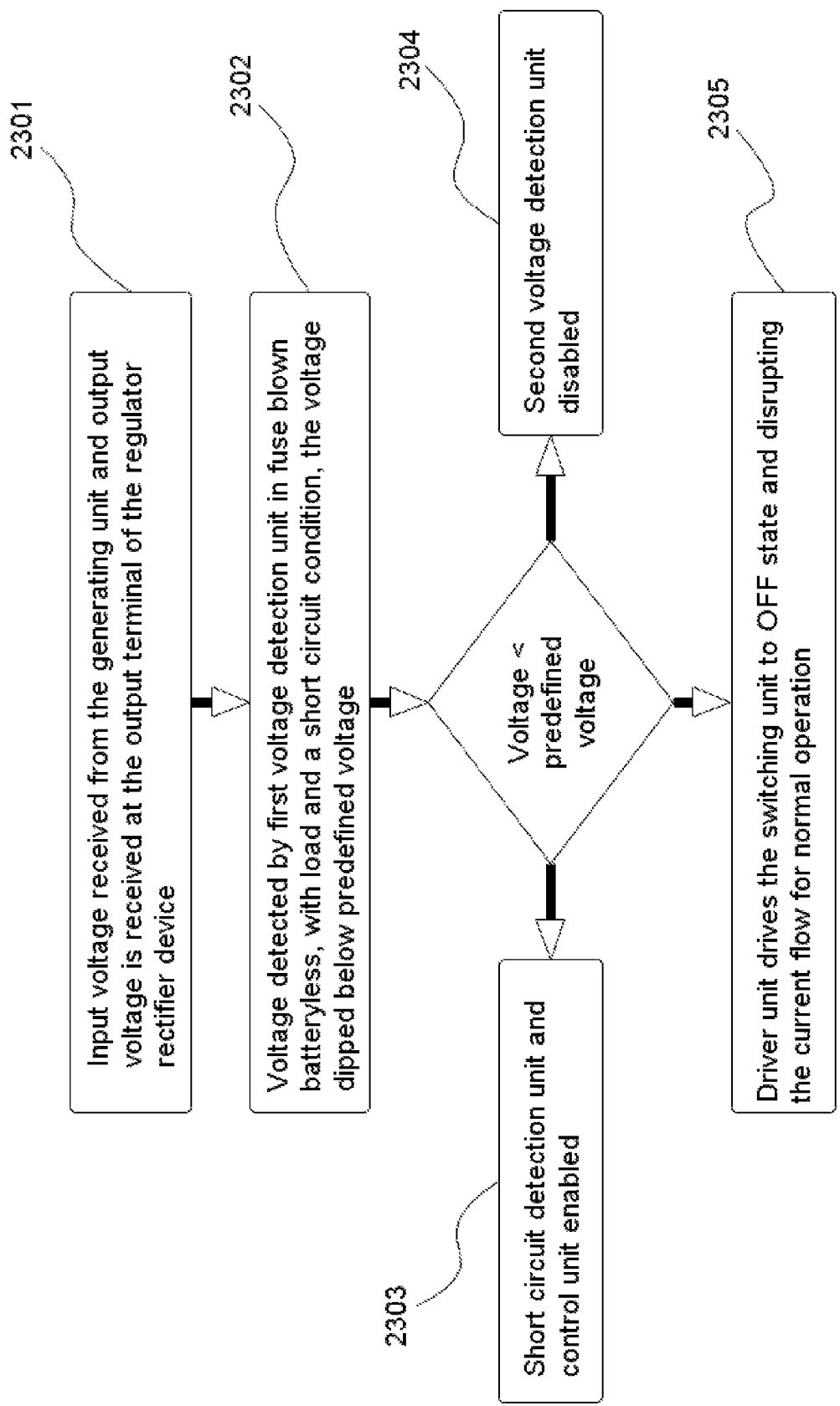
FIG. 23b shows an embodiment of the present invention depicting a flow diagram for a working of an example system in condition 5—with fuse blown condition same as battery-less and with load in short circuit condition at time when voltage goes below a predefined voltage.

FIG. 22c is a flow diagram illustrating a working of an example system (110) when the voltage at the output terminal (134) of the regulator rectifier device (130) is greater than a predefined voltage in with battery (battery connected), with load and short condition. As shown in FIG. 22c, the input voltage is received by the regulator rectifier device (130) connected with generating unit (120) and the output voltage is received at the output terminal (134) of the regulator rectifier device (130), as at (2201). The voltage across the output terminal (134) is detected by the first voltage detection unit (150) in with battery, with load and short circuit condition at time t=0, as at (2202). At this time, huge current will start flowing through the fuse (166) and the voltage is greater than the predefined voltage. The short circuit detection unit (152) and the control unit (148) will remain disabled as the voltage is greater than the predefined voltage, at (2203). The second voltage detection unit (154) will also remain disabled, at (2204). The driver unit (156) drives the switching unit (146) in ON state to complete the circuit for normal operation, as at (2205) in FIG. 22c. With the increase in the current flow through the fuse (166), the fuse will blow and disconnect the battery load (162) from the circuit, as shown in FIG. 23a. FIG. 23a shows another block diagram of an example system (110) depicting a detailed current flow within the protection device (140) and the load section (160) in short circuit condition when the fuse (166) blows. However, the current keeps on increasing due to the short (167). Further, with the increase in the current, the voltage across the bulk capacitor (114) starts decreasing. FIG. 23b is a flow diagram illustrating a working of another example system (110) in case of short circuit with battery load (162) when the voltage is dipped below a predefined voltage. Since the fuse (166) is already blown, the circuit will act as a battery-less circuit and the voltage will be received at the output terminal (134) due to the bulk capacitor (114) of the regulator rectifier device (130), as at (2301). The voltage across the bulk capacitor (114) i.e. output terminal (134) is detected by the first voltage detection unit (150) in fuse blown, battery-less, with load and short circuit condition, as at (2302). Since the voltage drops below the predefined voltage due to increase in the current in short circuit condition, as a result, the short circuit detection unit (152) and the control unit (148) are enabled, at (2303).

The second voltage detection unit (154) remains disabled, at (2304). The driver unit (156) drives the switching unit (146) from ON state to OFF state by the control unit (148), at (2305). This protects the regulator rectifier device (130) from getting damage due to excessive flow of current in the circuit by breaking the normal operation of the regulator rectifier device (130).

Figure 24A:
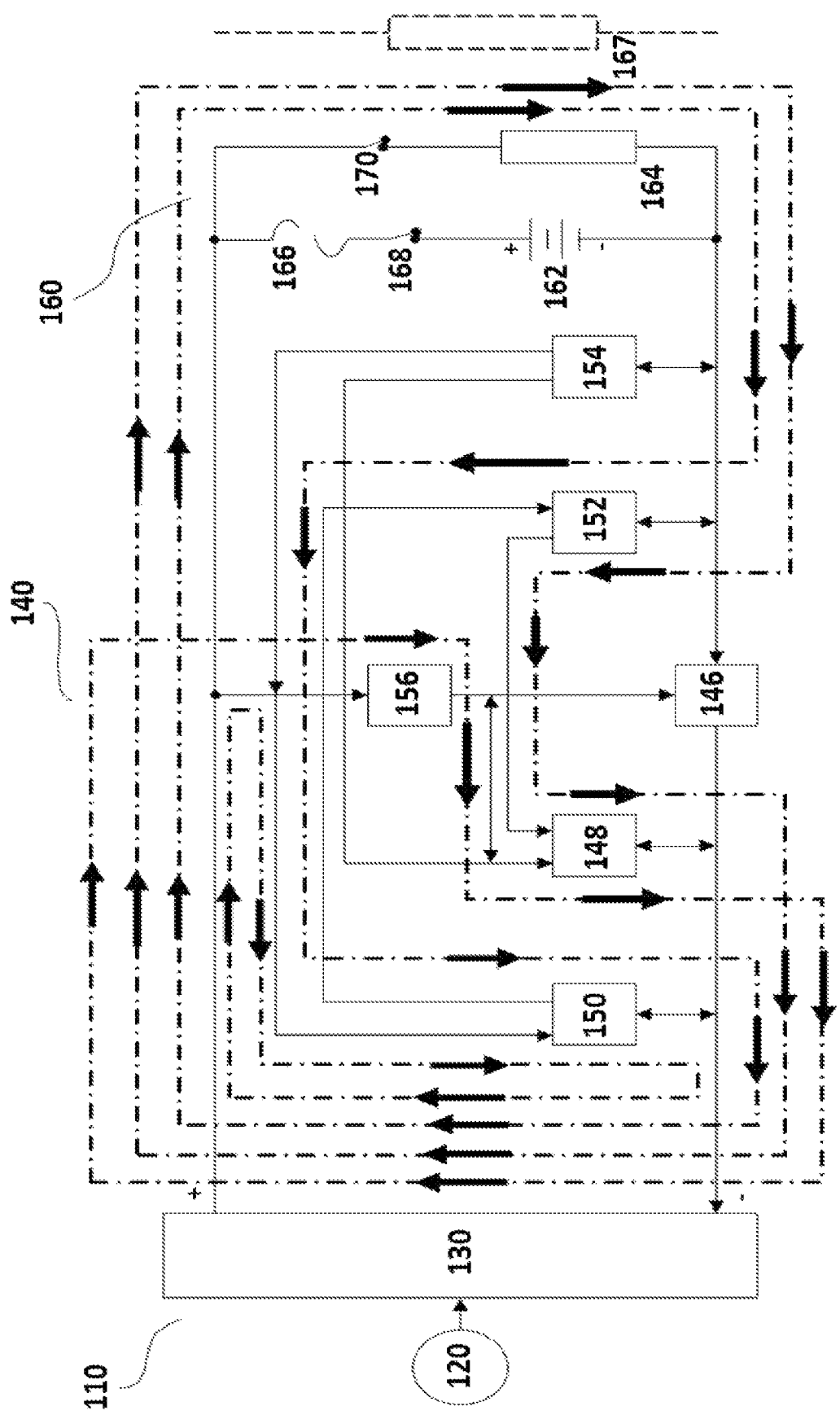
FIG. 24a shows an embodiment of the present invention depicting a block diagram showing a current flow in the protection device and the load section in condition 5—with fuse blown condition same as battery-less, with load and short circuit condition is removed but still the switching unit latches.
Figure 24B:
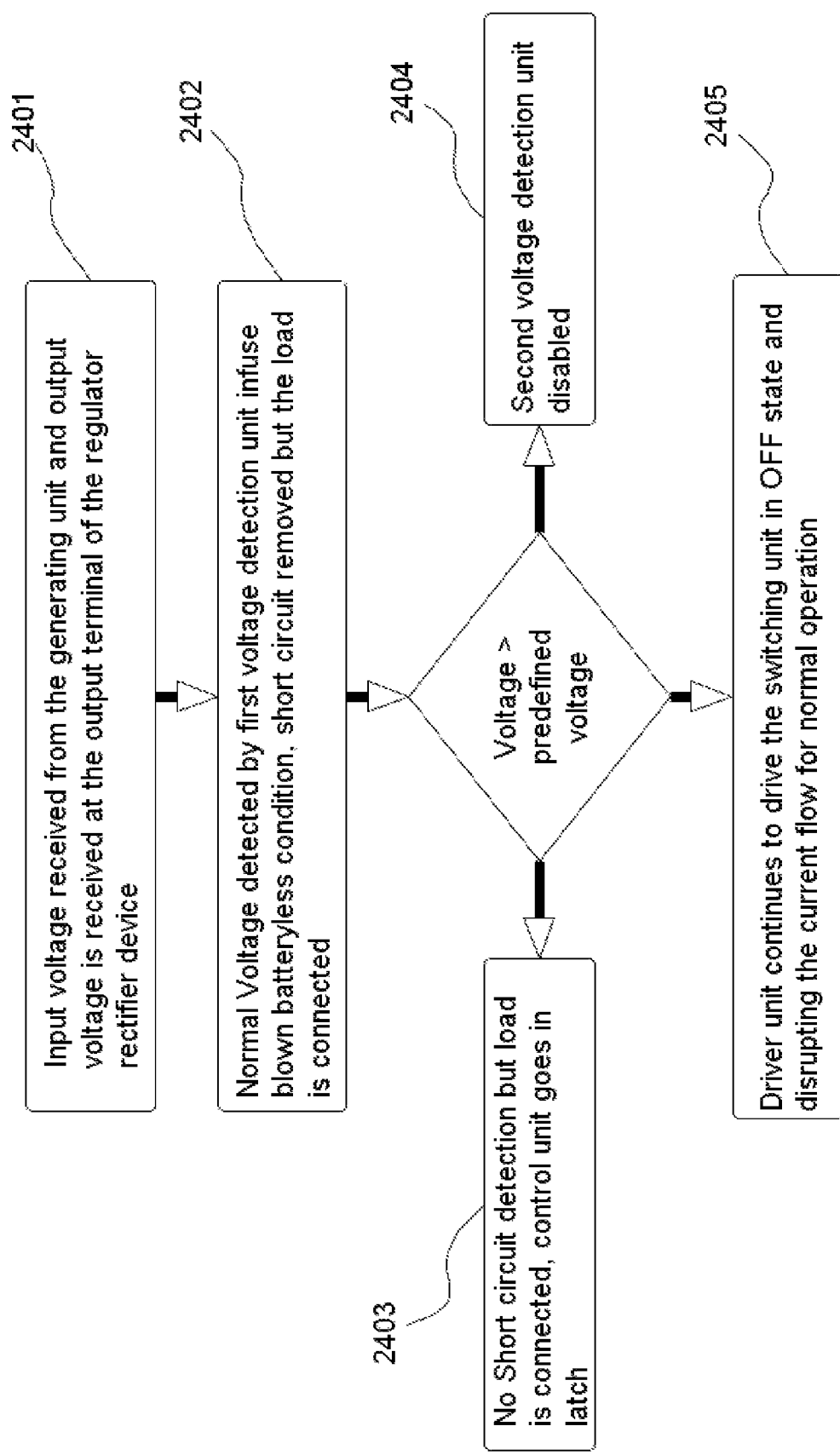
FIG. 24b shows an embodiment of the present invention depicting a flow diagram for a working of an example system in condition 5—with fuse blown condition same as battery-less, with load and short circuit condition is removed but still the switching unit latches.

Once the short (167) is removed, the voltage across the bulk capacitor (114) starts increasing and goes beyond a predefined voltage, however, the switching unit (146) remains in OFF state as the control unit (148) remains in latch as shown in FIG. 24a. FIG. 24a shows a block diagram of an example system (110) depicting a detailed current flow path within the protection device (140) and load section (160) when the short (167) is removed in battery-less and with load condition. FIG. 24b is a flow diagram illustrating a working of an example system (110) when the voltage at the output terminal (134) of the regulator rectifier device (130) is greater than a predefined voltage and the short (167) has been removed in a battery-less and with load condition. As shown in FIG. 24b, the short (167) is removed, therefore, the voltage will develop across the bulk capacitor (114) of the regulator rectifier device (130) as the battery load (162) is disconnected due to blown fuse, as at (2401). Normal voltage is detected across the output terminal (134) of the regulator rectifier device (130) in battery-less, with load and short removed condition (2402). When the voltage becomes greater the predefined voltage, the short circuit detection unit (152) gets disabled since the short is removed, but the control unit (148) continues in the enable condition i.e. goes into latch, as at (2403). The second voltage detection unit (154) remains disabled, as at (2404). The driver unit (156) continues to drive the switching unit in OFF state as controlled by the latched control unit (148), as at (2405). In order to initiate the normal operation of the circuit, the circuit is refreshed and the control unit (148) is de-latched. This can be achieved by switching OFF the power supply for some time and then switching ON the power supply, for example, generating unit (120) in this case.

Figure 25A:
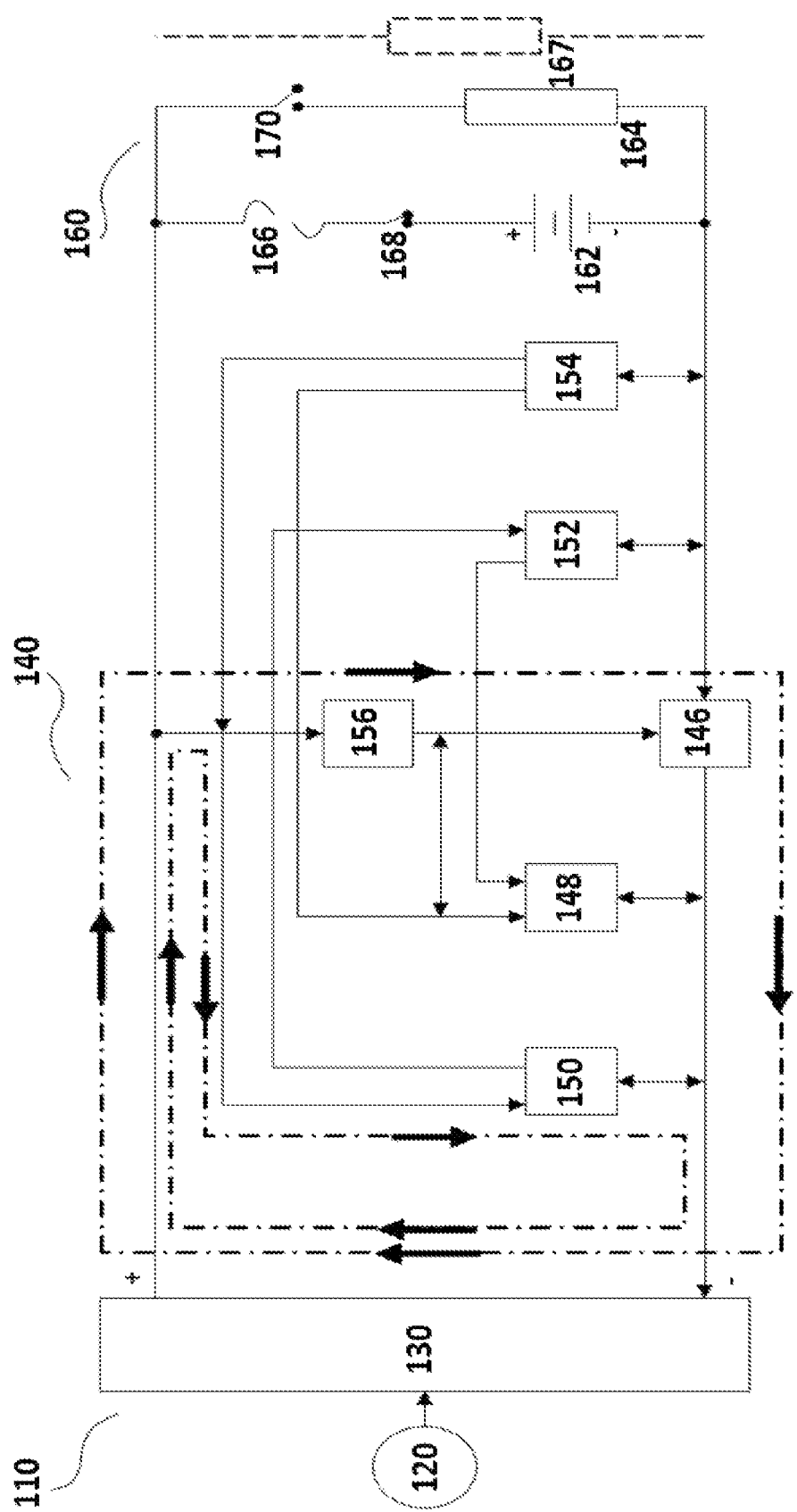
FIG. 25a shows an embodiment of the present invention depicting a block diagram showing a current flow in the protection device and the load section in condition 5—with fuse blown condition same as battery-less and short circuit condition is removed and the load is disconnected to disable the latch i.e. to enable the switching unit.
Figure 25B:
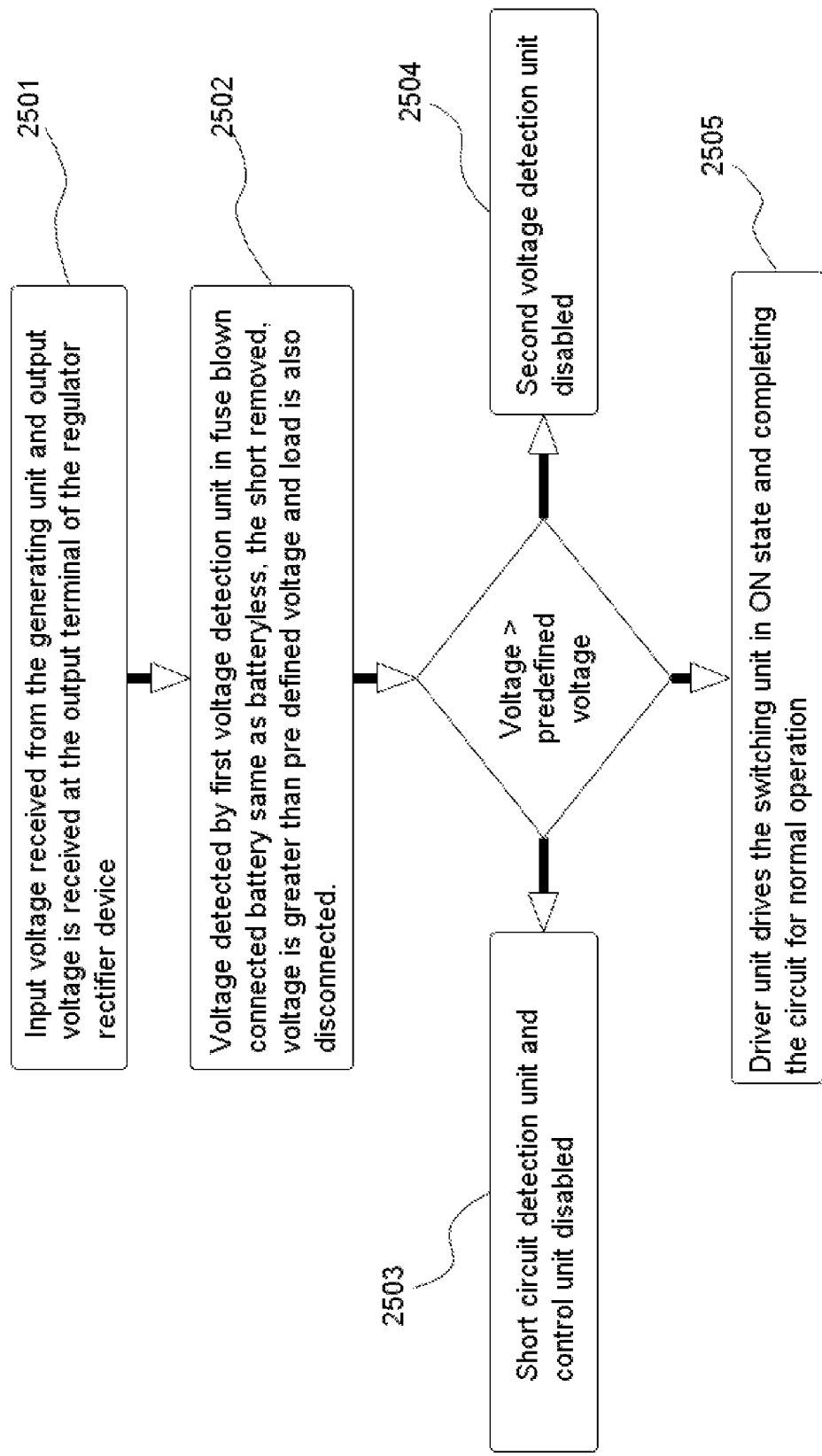
FIG. 25b shows an embodiment of the present invention depicting a flow diagram for a working of an example system in condition 5—with fuse blown condition same as battery-less and short circuit condition is removed and the load is disconnected to disable the latch i.e. to enable the switching unit.

FIG. 25a shows a block diagram of an example system (110) depicting a detailed current flow path in the protection device (140) after the de-latch. The driver unit (156) drives the switching unit (146) in ON state. The current flows through the driver unit (156) and the switching unit (146) for completing the circuit, as the load gets disconnected due to de-latching. FIG. 25b is a flow diagram illustrating a working of another example system (110) when the voltage at the output terminal (134) of the regulator rectifier device (130) is greater than a predefined voltage in battery-less, no-load and short removed condition, after the circuit is refreshed and de-latched. As shown in FIG. 25b, once the circuit is de-latched, the output voltage across output terminal (134) is received due to bulk capacitor (114), as at (2501). The first voltage detection unit (150) detects the voltage greater than predefined voltage in battery-less and no-load condition, at (2502). The short circuit detection unit (152) remains disabled and the control unit (148) gets disabled, as at (2503). The second voltage detection unit also remains disabled, at (2504). The driver unit (156) drives the switching unit (146)

in ON state and the current flows through the switching unit (146) as in normal condition, as shown at (1805) in FIG. 25*a*.

Figure 26A:
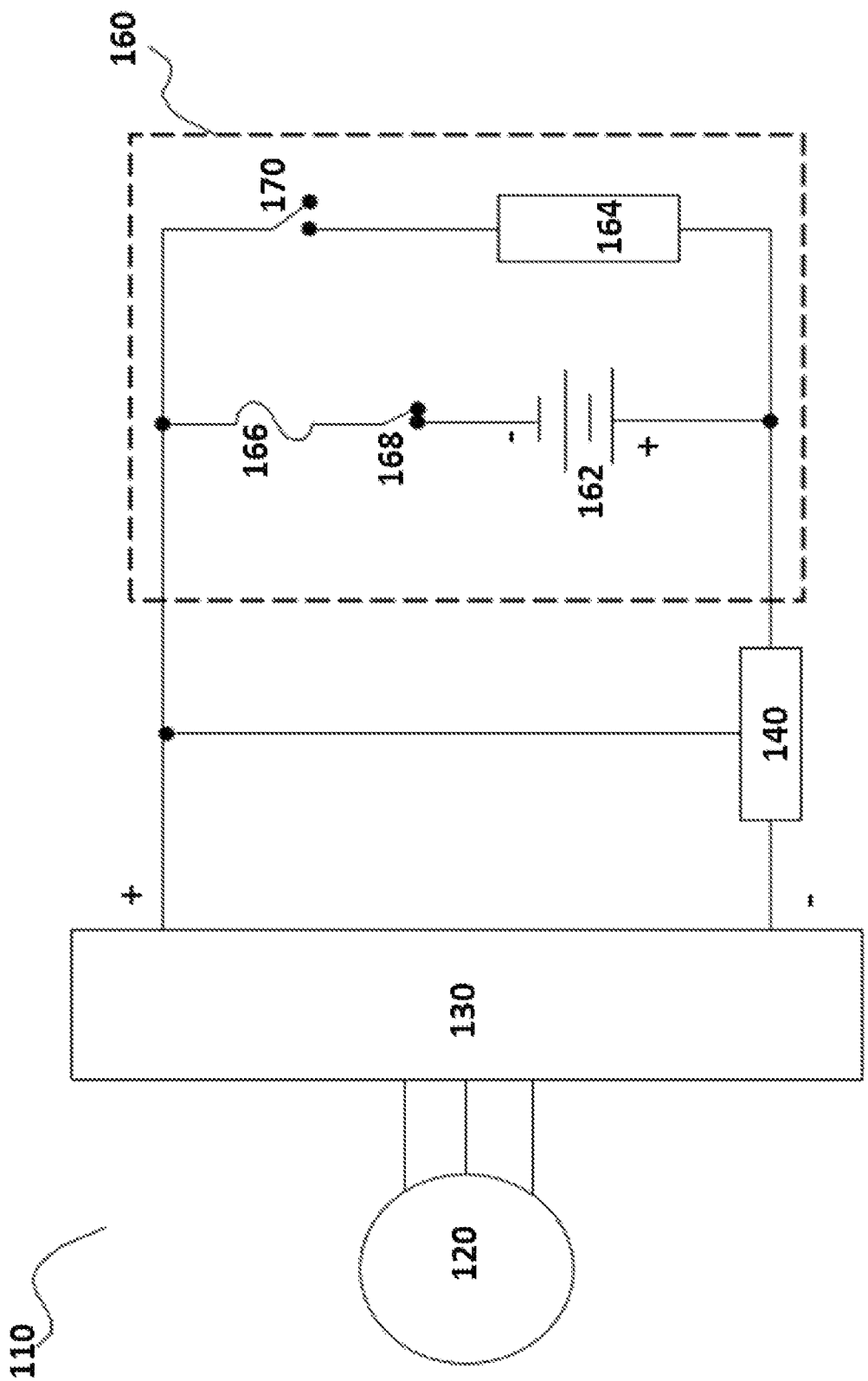
FIG. 26a shows an embodiment of the present invention depicting a block diagram of an example system with load section in condition 6—with reverse battery condition i.e. by connecting the battery in reverse condition.
Figure 26B:
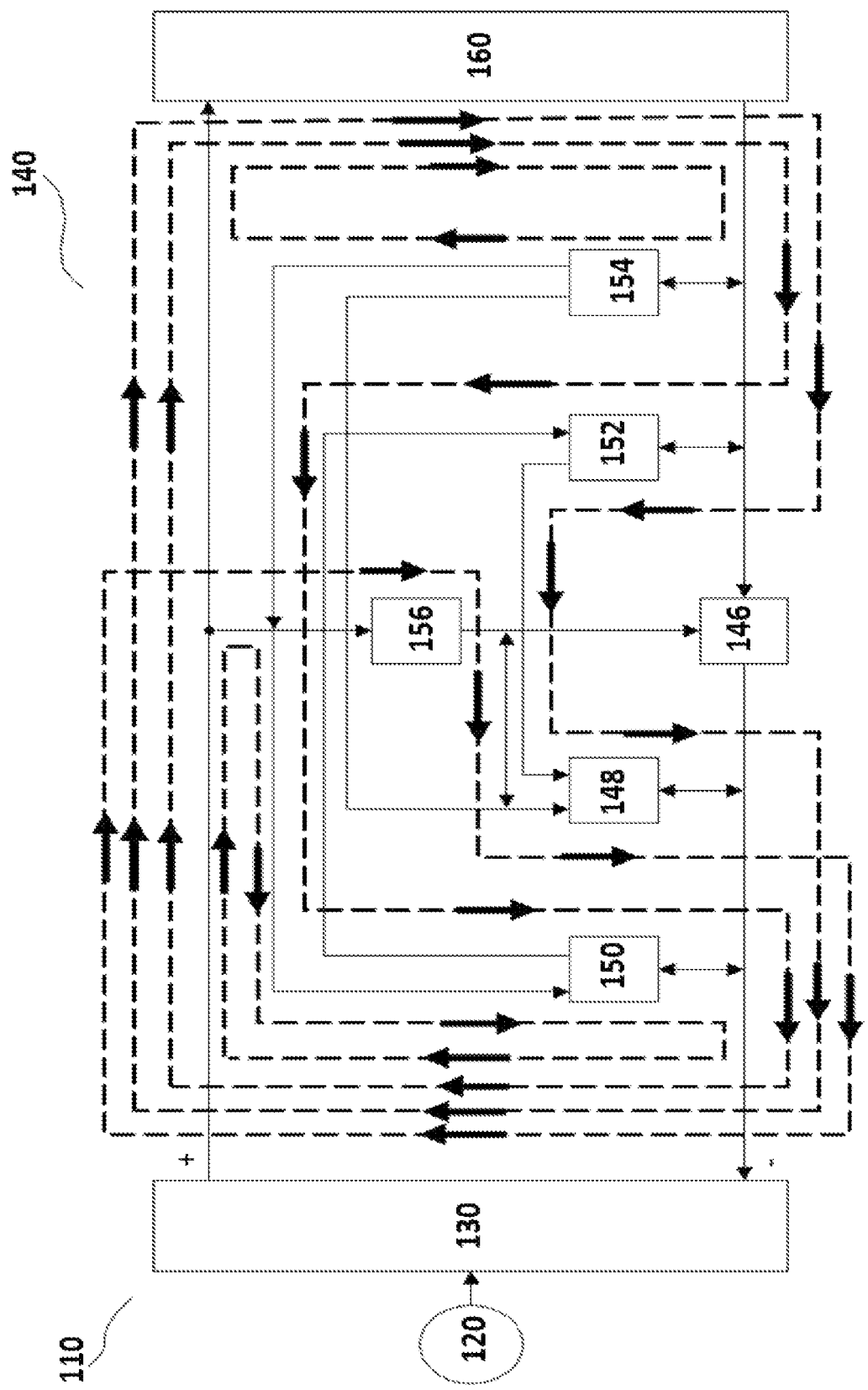
FIG. 26b shows an embodiment of the present invention depicting a block diagram showing a current flow in the protection device in condition 6—with reverse battery condition.
Figure 26C:
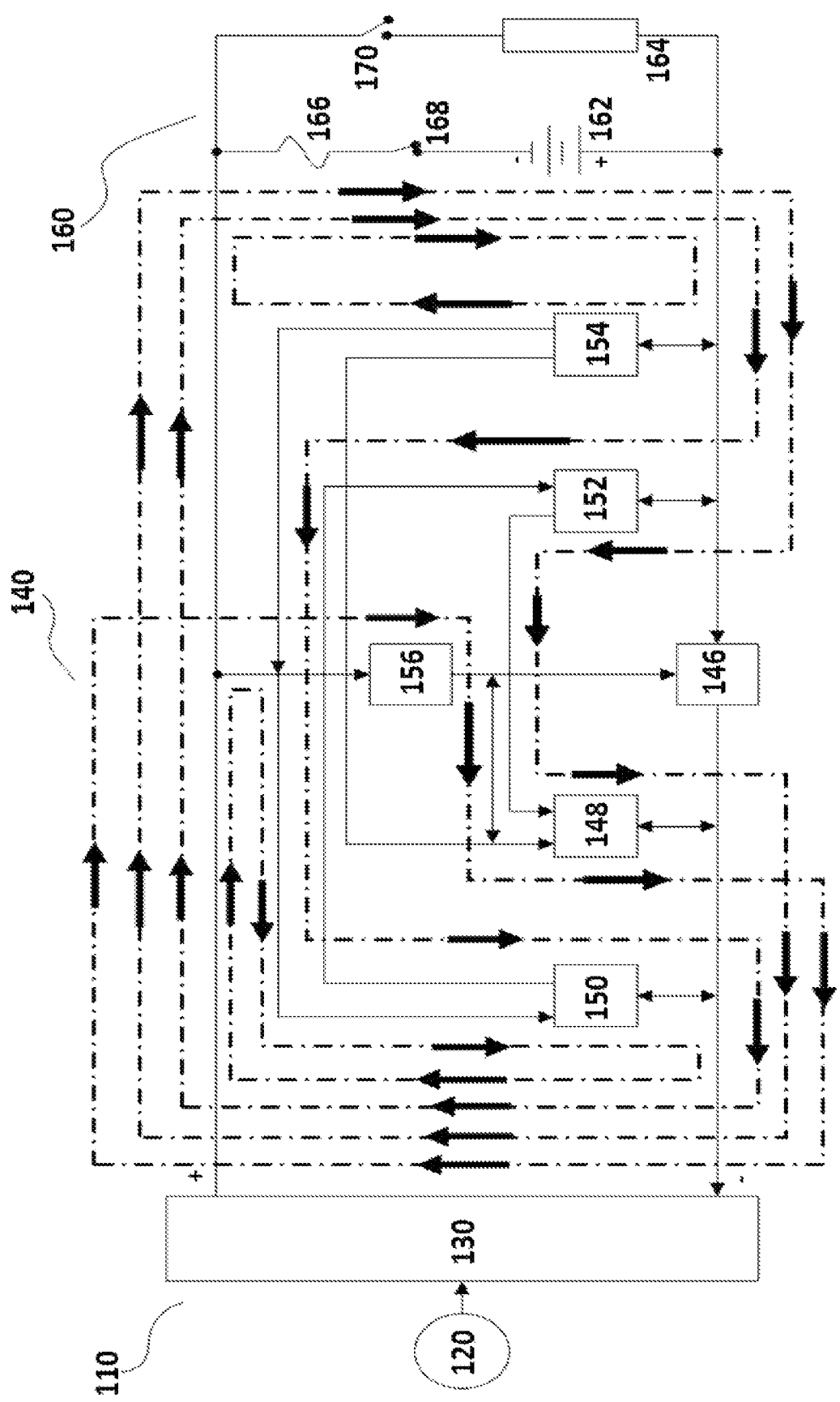
FIG. 26c shows an embodiment of the present invention depicting a block diagram showing a current flow in the protection device and the load section in condition 6—with reverse battery condition.

Condition 6—With reverse voltage condition: FIGS. 26*a*, 26*b*, 26*c* and 26*d* show a working of an example system (110), specifically, the regulator rectifier device (130) with the protection device (140) in reverse voltage condition. As an exemplary embodiment, the load section (160) includes a battery load (162) and no-load circuit. FIG. 26*a* shows a block diagram of an example system (110) with the load section (160) having with battery (battery connected) and no-load condition. The battery load (162) is connected by the first switch (168) along with the fuse (166) and the no-load is achieved by disconnecting the load (164) by second switch (170), as shown in FIG. 26*a*. FIG. 26*b* shows a block diagram of another example system (110) depicting a detailed current flow within the protection device (140). FIG. 26*c* shows a block diagram of another example system (110) depicting a detailed current flow within the protection device (140) and the load section (160). Since, no-load is connected, no current flows through the load (164). However, the current flows across the second voltage detection unit (154) forming another path of current flow in addition to the current flow from the regulator rectifier device (130), as shown in FIG. 26*c*. The regulator rectifier device (130) is connected with its associated parts like the generating unit (120) and the load section (160). The generating unit (120) like magneto is connected at the input terminal (132) of the regulator rectifier device (130), and the load section (160) connected at the output terminal (134) of the regulator rectifier device (130).

Figure 26D:
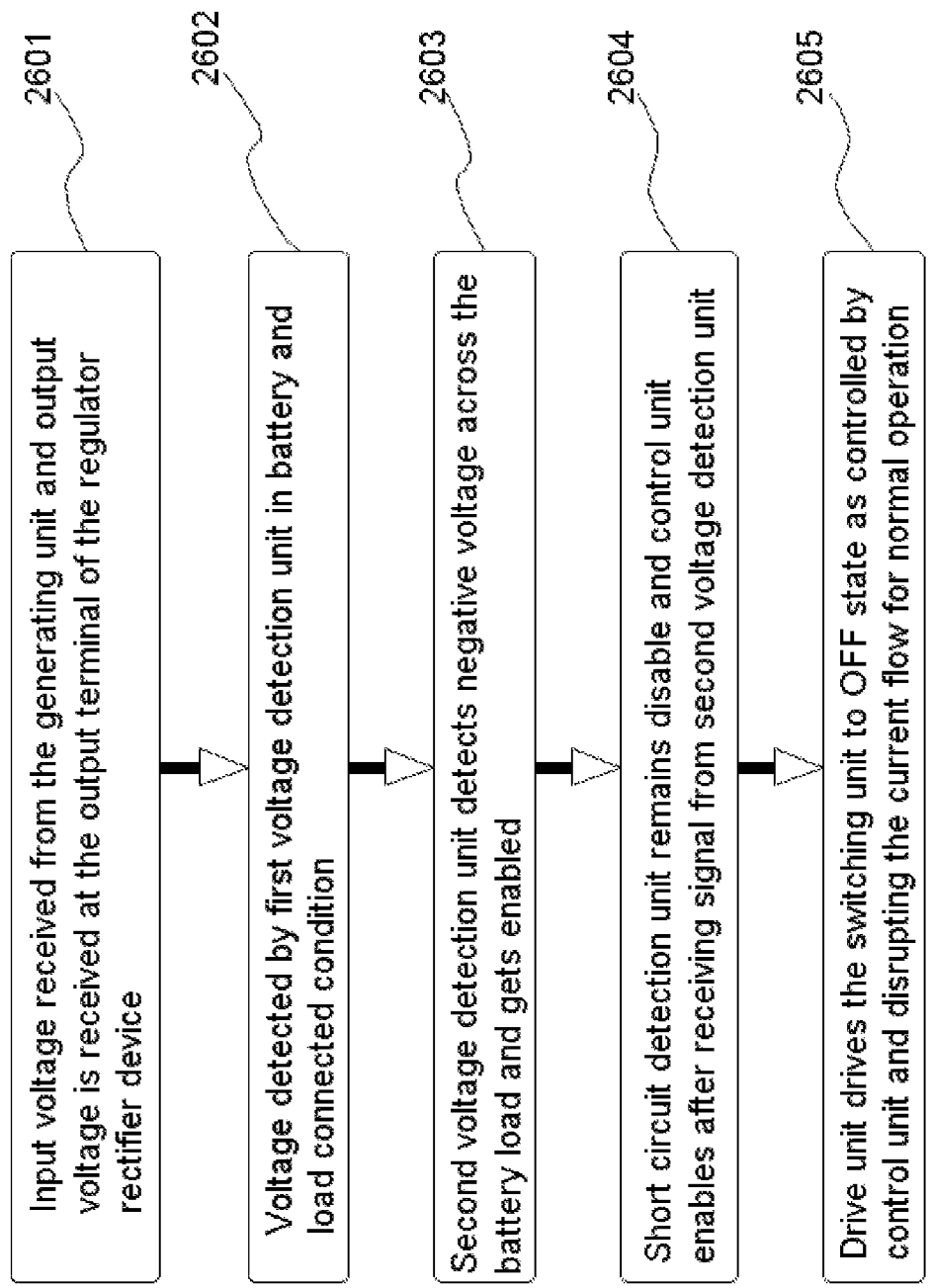
FIG. 26d shows an embodiment of the present invention depicting a flow diagram for a working of an example system in condition 6—with reverse battery condition.

FIG. 26*d* is a flow diagram illustrating a working of an example system (110) in condition 6—reverse voltage condition, when the voltage at the output terminal (134) of the regulator rectifier device (130) is greater than a predefined voltage. The output voltage is received at the output terminal (134) of the regulator rectifier device, as at (2601). The first voltage detection unit (150) detects the voltage across the output terminal (134) of the regulator rectifier device, as at (2602), which is greater than the predefined voltage. The second voltage detection unit (154) detects the voltage across the battery load (162). If the voltage across the battery load (162) is found negative or reverse polarized, the second voltage detection unit (154) gets enabled, as at (2603). The output from the second voltage detection unit (154) also enables the control unit (148), as at (2604). The driver unit (156) drives the switching unit (146) in OFF state as controlled by the control unit (148) to protect the device from the impact of reverse voltage condition. The reverse voltage condition can also include many other sub conditions including but not limiting to like with battery and with load or the like. However, the working of the second voltage detection unit (154) and the system (110) will remain the same.

Figure 27:
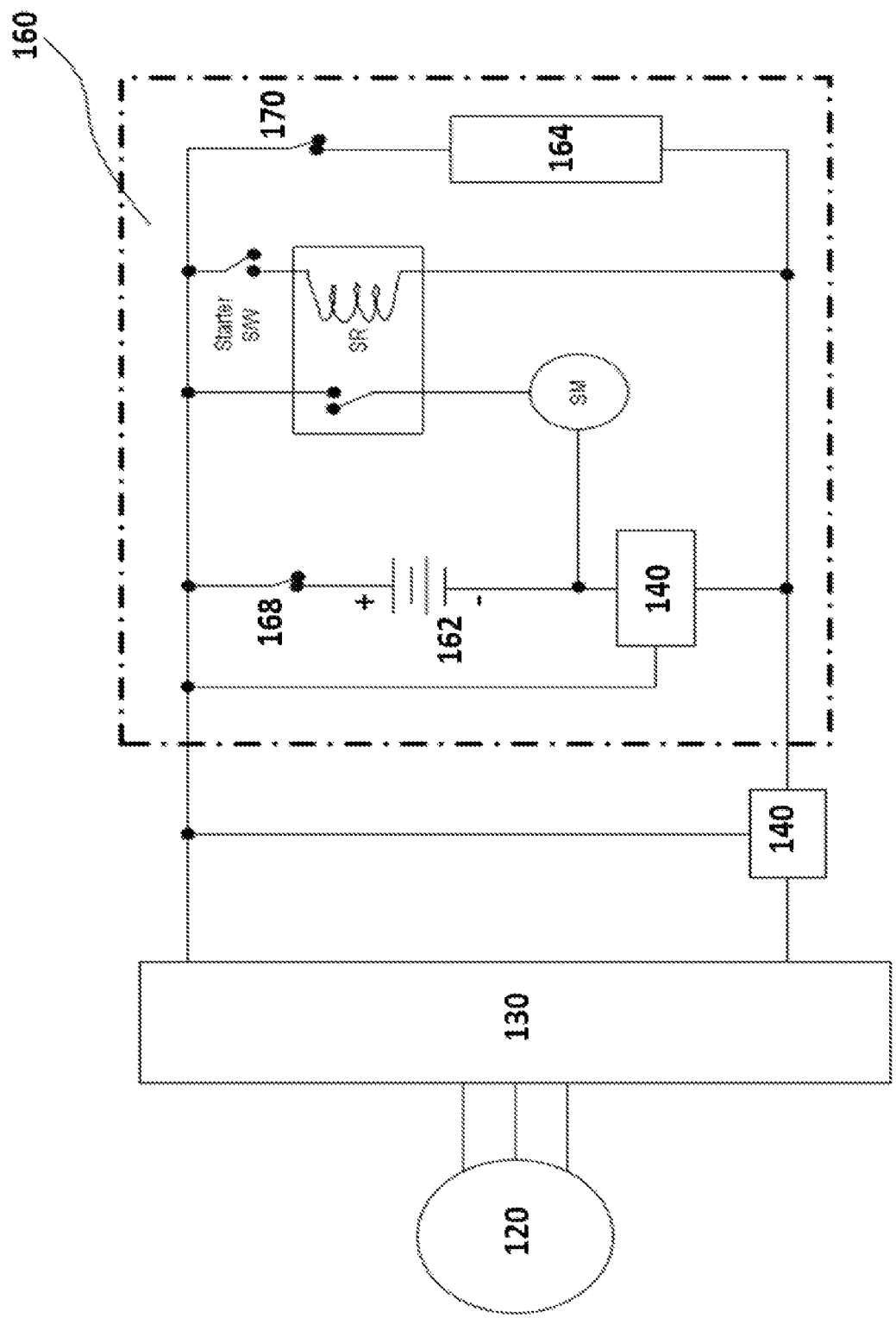
FIG. 27 shows an embodiment of the present invention depicting a block diagram showing the protection device working as an electronic resettable fuse in series with battery load in the load section.

In an alternate embodiment, the fuse (166) is replaced by the protection device (140) working as an electronic resettable fuse with the battery load (162) in the load section (160), as shown in FIG. 27. In this configuration, the fuse (166) which is usually connected in series to a positive terminal of the battery load (162) is removed and the positive terminal of the battery load (162) is directly connected to the positive terminal (136) of the regulator rectifier device (130). The protection device (140) is connected to a negative terminal of the battery load (162), which is usually connected to a chassis ground terminal. The working of the regulator rectifier device (130) with the protection device (140) will remain the same in all the conditions as detailed above including short circuit condition and reverse battery condition or the like. In this configuration, the added advantage is that the fuse (166) which usually blows in short circuit condition will not happen, instead the switching unit (146) of the protection device (140) will switch OFF or will switch to OFF state allowing no current to flow through the circuit, as per the short circuit condition and will reconnect once the short circuit condition is removed as explained earlier. The working of protection device (140) as a resettable fuse with battery (battery connected) and with load condition is explained herewith. The battery load (162) is connected to the circuit by the first switch (168) along with the additional protection device (140) working as a resettable fuse as explained above and the load (164) is achieved by connecting the load (164) to the circuit by the second switch (170), as shown in FIG. 27. The generating unit (120) like magneto is connected at the input terminal (132) of the regulator rectifier device (130), and the load section (160) is connected at output terminal (134) of the regulator rectifier device (130). The voltage is developed at the output terminal (134) of the regulator rectifier device (130). The first voltage detection unit (150) detects the voltage across the output terminal (134) of the regulator rectifier device (130), which is greater than a predefined voltage and similarly if the conditions are OK at the second protection device (140) i.e. working as a resettable fuse along with the battery load (162), then the driver unit (156) of both protection device (140) will drive on their respective switching units (146) into ON state and this will be normal operation as explained earlier with normal fuse (166) connected.

Figure 28:
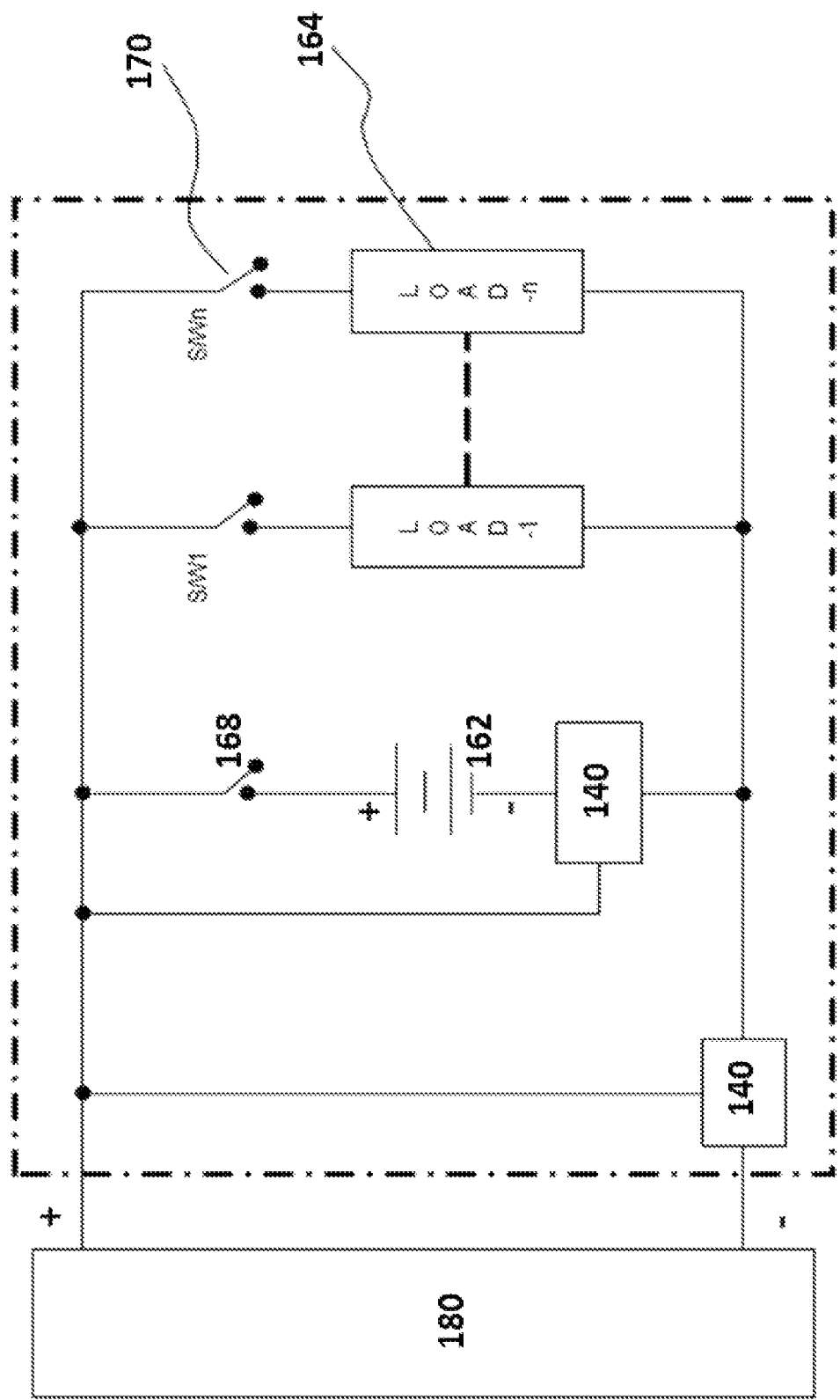
FIG. 28 shows an embodiment of the present invention depicting a block diagram showing a power source or a DC-DC convertor protected by the protection device working as an electronic resettable fuse in series with battery load in the load section.

In an alternate embodiment, the protection device (140) can also work with any power source (180) including but not limiting the generating unit (120), the regulator rectifier device (130) or can be connected to a DC-DC convertor of an electric vehicle basically to charge an auxiliary battery with the load section (160) to protect the power source or DC-DC from reverse voltage condition and the short circuit condition, as shown in FIG. 28. A first terminal (142) of the protection device (140) is connected to said power source (180), and a second terminal (144) is connected to the load section (160). Herein the switching unit (146) is defined between the first terminal (142) and the second terminal (144) to function in an ON state and an OFF state. The switching unit (146) completes the circuit between the first terminal (142) and the second terminal (144) in ON state and breaks the circuit in OFF state. The first voltage detection unit (150) detects the voltage between the first terminal (142) and second terminal (144) of the protection device (140). The first terminal (142) and the second terminal (144) connects with the positive terminal and the negative terminal of the power source (180), respectively. In this configuration, the fuse (166) which is usually connected in series to the positive terminal of the battery load (162) is removed and the positive terminal of the battery load (162) is directly connected to the positive terminal of the DC power supply (180) or the like. As a replacement of the fuse (166), the protection device (140) is connected to the negative terminal of the battery load (162). The working of the protection device (140) will remain the same in all conditions including general conditions, short circuit and reverse battery condition. In this configuration, the added advantage is that the fuse (166) which usually blows in short circuit condition will not happen, and instead the switching unit (146) of the protection device (140) will switch to OFF state allowing no current to flow through the circuit as per the short circuit condition and will reconnects once the short circuit condition is removed. The working of the protection device (140)

as a resettable fuse with battery load (162) and with load condition is explained herewith. The battery load (162) is connected by the first switch (168) along with the additional protection device (140) as a resettable fuse as explained above and the load is achieved by connecting the load (164) by second switch (170), as already shown as shown in FIG. 27. In this configuration, in place of the generating unit (120) like magneto and regulator rectifier device (130) any battery charger or the DC-DC convertor of electric vehicle can be connected as a DC power source (180) and the load (164) is connected at the output terminal of the power supply (180). The first voltage detection unit (150) of both the protection device (140) detects the voltage across the output terminal of DC Power source (180), which is greater than a predefined voltage and similarly if the conditions are OK then the driver unit (156) of both the protection devices (140) drives their respective switching units (146) in ON state and this will be normal operation as explained earlier with normal fuse connected.

I claim:

1. A system for protecting a regulator rectifier device comprising:
    the regulator rectifier device including an input terminal and an output terminal, said input terminal receives an input voltage from a generating unit, and said output terminal is configured to output DC voltage between a positive terminal and a negative terminal; and
    a protection device coupled with said regulator rectifier device and connected between said positive terminal and said negative terminal of said regulator rectifier device, said protection device includes:
        a first voltage detection unit connected between said positive terminal and said negative terminal of said output terminal of said regulator rectifier device, said first voltage detection unit is configured to detect voltage between said positive terminal and said negative terminal and compare with a predefined voltage,
        a short circuit detection unit configured to receive a signal from said first voltage detection unit,
        a switching unit defined to switch between an ON state and an OFF state, wherein said switching unit completes a circuit between said positive terminal and said negative terminal of said regulator rectifier device in said ON state and breaks said circuit in said OFF state; and
        a control unit coupled with said switching unit, configured to detect at least one of a short circuit condition or a reverse battery condition or a combination thereof, based on an input received by said control unit from said circuit,
    wherein said control unit is configured to receive an input from a second voltage detection unit defined in said circuit,
    wherein said control unit is configured to receive an input from a driver unit defined in said circuit to drive said switching unit in said ON state,
    wherein said control unit switches said switching unit from said ON state to said OFF state when at least one of said short circuit condition or said reverse battery condition or a combination thereof, is detected by said control unit, thereby breaking said circuit to protect said regulator rectifier device,
    wherein said control unit latches to continue said switching unit in said OFF state when said short circuit condition is detected in presence of a load in a load section,
    wherein said switching unit continues to remain in said OFF state when said short circuit condition ceases to exist in presence of the load in the load section, and
    wherein said switching unit continues to remain in said OFF state until at least one of said generating unit or said load or a combination thereof, is disconnected and reconnected.

2. The system as claimed in claim 1, wherein said short circuit detection unit receives said signal from said first voltage detection unit when the voltage detected by said first voltage detection unit is lower than said predefined voltage.

3. The system as claimed in claim 1, wherein said control unit is configured to receive an input from said short circuit detection unit and confirm said short circuit condition when drop in voltage is detected by said first voltage detection unit below said predefined voltage, thereby switching said switching unit to said OFF state.

4. The system as claimed in claim 1, wherein said second voltage detection unit is coupled with said load section across a battery load to detect said reverse battery condition.

5. The system as claimed in claim 4, wherein said control unit switches said switching unit from said ON state to said OFF state when said second voltage detection unit detects a reverse voltage across said battery load, thereby confirming said reverse battery condition across the battery load.

6. The system as claimed in claim 1, wherein said control unit switches said switching unit from said ON state to said OFF state when said input is received from said driver unit along with at least one input from said second voltage detection unit or said short circuit detection unit or a combination thereof.

7. A method for protecting a regulator rectifying device, the method comprising the steps of:
    a. receiving an input voltage by an input terminal of the regulator rectifier device from a generating unit and rectifying DC voltage at an output terminal between a positive terminal and a negative terminal of said regulator rectifier device;
    b. switching a switching unit of a protection device between an ON state and an OFF state, wherein said switching unit completes a circuit between said positive terminal and said negative terminal of said regulator rectifier device in said ON state and breaks said circuit in said OFF state;
    c. detecting, by a first voltage detection unit, voltage between said positive terminal and said negative terminal of the output terminal of said regulator rectifier device, and comparing detected voltage with a predefined voltage;
    d. receiving, by a short circuit detection unit, a signal from said first voltage detection unit;
    e. controlling said switching unit by a control unit coupled with said switching unit to detect at least one of a short circuit condition or a reverse battery condition or a combination thereof, based on an input received by said control unit from said circuit;
    f. receiving, by said control unit, an input from a second voltage detection unit defined in said circuit;
    g. receiving, by said control unit, an input from a driver unit defined in said circuit to drive said switching unit in said ON state;
    h. protecting said regulator rectifier device by breaking said circuit by switching said switching unit from said ON state to said OFF state by said control unit when at least one of said short circuit condition or said reverse battery condition or a combination thereof, is detected by said control unit; and i. latching said control unit to continue said switching unit in said OFF state when said short circuit condition is detected in presence of a load in a load section, wherein said switching unit continues in said OFF state when said short circuit condition ceases to exist in presence of said load in said load section, and wherein said switching unit continues to remain in said OFF state until at least one of said generating unit or said load or a combination thereof, is disconnected and reconnected.

8. The method as claimed in claim 7, wherein said signal is received by said short circuit detection unit from said first voltage detection unit when voltage detected by said first voltage detection unit is lower than said predefined voltage.

9. The method as claimed in claim 7, wherein controlling said switching unit by said control unit includes receiving an input from said short circuit detection unit and confirming said short circuit condition when drop in said voltage is detected by said first voltage detection unit below said predefined voltage, thereby switching said switching unit (146) into said OFF state.

10. The method as claimed in claim 7, wherein said second voltage detection unit is coupled with said load section across a battery load to detect said reverse battery condition.

11. The method as claimed in claim 10, wherein controlling said switching unit by said control unit includes detecting reverse voltage across said battery load by said second voltage detection unit, thereby confirming said reverse battery condition across said battery load and switching said switching unit from said ON state to said OFF state.

12. The method as claimed in claim 7, wherein controlling said switching unit by said control unit includes receiving said input from said driver unit along with at least one input from said second voltage detection unit or said short circuit detection unit or a combination thereof, to switch said switching unit from said ON state to said OFF state.

13. A protection device comprising:
a first terminal electrically coupled to a power source, wherein said first terminal is electrically coupled with a first voltage detection unit to detect voltage across said first terminal with respect to a predefined voltage, and wherein said first voltage detection unit outputs a signal to a short circuit detection unit;
a second terminal electrically coupled to a load section to form a circuit;
a switching unit defined between said first terminal and said second terminal to function in an ON state and an OFF state, wherein said switching unit completes said circuit between said first terminal and said second terminal in said ON state and breaks said circuit in said OFF state; and
a control unit coupled with said switching unit, configured to detect at least one of a short circuit condition or a reverse battery condition or a combination thereof, based on an input received by said control unit from said circuit, wherein said control unit is configured to receive an input from a second voltage detection unit defined in said circuit, wherein said control unit is configured to receive said input from a driver unit, said driver unit is defined to drive said switching unit in said ON state, wherein said control unit switches said switching unit from said ON state to said OFF state when at least one of said short circuit condition or said reverse battery condition or a combination thereof, is detected by said control unit, thereby breaking said circuit to protect said power source, wherein said control unit latches to continue said switching unit in said OFF state when said short circuit condition is detected in presence of a load in said load section, wherein said switching unit continues to remain in said OFF state when said short circuit condition ceases to exist in presence of said load in said load section, and wherein said switching unit continues to remain in said OFF state until at least one of said generating unit or said load or a combination thereof, is disconnected and reconnected.

14. The device as claimed in claim 13, wherein said first voltage detection unit outputs said signal to said short circuit detection unit when voltage detected by said first voltage detection unit is lower than said predefined voltage.

15. The device as claimed in claim 13, wherein said control unit is configured to receive an input from said short circuit detection unit and confirm said short circuit condition when drop in said voltage is detected by said first voltage detection unit below said predefined voltage, thereby switching said switching unit to said OFF state.

16. The device as claimed in claim 13, wherein said second voltage detection unit is coupled with said load section across a battery load to detect said reverse battery condition.

17. The device as claimed in claim 16, wherein said control unit switches said switching unit from said ON state to said OFF state when said second voltage detection unit detects a reverse voltage across said battery load, thereby confirming said reverse battery condition across said battery load.

18. The device as claimed in claim 13, wherein said control unit switches said switching unit from said ON state to said OFF state when said input is received from said driver unit along with at least one input from said second voltage detection unit or said short circuit detection unit or a combination thereof.

* * * * *